US009854199B2

United States Patent
Barton et al.

(10) Patent No.: US 9,854,199 B2
(45) Date of Patent: *Dec. 26, 2017

(54) MULTIPLE OUTLET DIGITAL VIDEO RECORDING SYSTEM

(71) Applicant: TiVo Solutions Inc., San Carlos, CA (US)

(72) Inventors: James M. Barton, Los Gatos, CA (US); Roderick James McInnis, Milpitas, CA (US); Alan S. Moskowitz, Oakland, CA (US); Andrew Martin Goodman, Portola Valley, CA (US); Ching Tong Chow, Los Altos, CA (US); Jean Sway Kao, Cupertino, CA (US)

(73) Assignee: TiVo Solutions Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,336

(22) Filed: Feb. 3, 2015

(65) Prior Publication Data

US 2015/0147044 A1 May 28, 2015

Related U.S. Application Data

(63) Continuation of application No. 14/017,165, filed on Sep. 3, 2013, now Pat. No. 8,948,569, which is a
(Continued)

(51) Int. Cl.
*H04N 5/76* (2006.01)
*H04N 5/775* (2006.01)
(Continued)

(52) U.S. Cl.
CPC ........... *H04N 5/775* (2013.01); *G11B 27/002* (2013.01); *G11B 27/024* (2013.01);
(Continued)

(58) Field of Classification Search
CPC .......... H04N 5/76; H04N 5/775; H04N 5/783; H04N 21/4147; H04N 21/4263; H04N 21/4825
See application file for complete search history.

(56) References Cited

U.S. PATENT DOCUMENTS 2,865,990 A 12/1958 Towler
4,221,176 A 9/1980 Besore et al.
(Continued)

FOREIGN PATENT DOCUMENTS

DE 39 09 334 9/1990
DE 42 01 031 7/1993
(Continued)

OTHER PUBLICATIONS

Australian Patent Office, Application No. 2005306361, Claims dated Apr. 22, 2009.
(Continued)

*Primary Examiner* — Huy T Nguyen
(74) *Attorney, Agent, or Firm* — Haley Guiliano LLP

(57) ABSTRACT

A multimedia time warping system allows a user to store selected multimedia data streams while the user is simultaneously watching or reviewing other multimedia data. Data streams are converted to digital streams for internal transfer and manipulation. A parser and event buffer decouple the CPU from having to parse the digital stream. Video segments are stored on a storage device and when data is requested for display, its video segments are extracted from the storage device and sent to a decoder that converts them into display output signals and delivers the display output signals to a display.

33 Claims, 13 Drawing Sheets

Related U.S. Application Data continuation of application No. 12/430,024, filed on Apr. 24, 2009, now Pat. No. 8,526,781, which is a continuation of application No. 10/081,776, filed on Feb. 20, 2002, now Pat. No. 7,529,465, which is a continuation of application No. 09/827,029, filed on Apr. 5, 2001, now abandoned, which is a continuation of application No. 09/126,071, filed on Jul. 30, 1998, now Pat. No. 6,233,389.

(51) Int. Cl.

| | | |
|---|---|---|
| *G11B 27/00* | (2006.01) | |
| *G11B 27/024* | (2006.01) | |
| *G11B 27/032* | (2006.01) | |
| *G11B 27/034* | (2006.01) | |
| *G11B 27/10* | (2006.01) | |
| *G11B 27/30* | (2006.01) | |
| *H04N 5/44* | (2011.01) | |
| *H04N 5/781* | (2006.01) | |
| *H04N 5/782* | (2006.01) | |
| *H04N 5/783* | (2006.01) | |
| *H04N 9/79* | (2006.01) | |
| *H04N 9/804* | (2006.01) | |
| *H04N 9/806* | (2006.01) | |
| *H04N 21/4147* | (2011.01) | |
| *H04N 21/426* | (2011.01) | |
| *H04N 21/422* | (2011.01) | |
| *H04N 21/432* | (2011.01) | |
| *H04N 21/43* | (2011.01) | |
| *H04N 21/433* | (2011.01) | |
| *H04N 21/434* | (2011.01) | |
| *H04N 21/4402* | (2011.01) | |
| *H04N 21/454* | (2011.01) | |
| *H04N 21/45* | (2011.01) | |
| *H04N 21/472* | (2011.01) | |
| *H04N 21/488* | (2011.01) | |
| *H04N 21/845* | (2011.01) | |
| *H04N 21/8547* | (2011.01) | |

(52) U.S. Cl.
CPC .......... *G11B 27/032* (2013.01); *G11B 27/034* (2013.01); *G11B 27/105* (2013.01); *G11B 27/3027* (2013.01); *G11B 27/3054* (2013.01); *H04N 5/4401* (2013.01); *H04N 5/76* (2013.01); *H04N 5/781* (2013.01); *H04N 5/782* (2013.01); *H04N 5/783* (2013.01); *H04N 9/7921* (2013.01); *H04N 9/8042* (2013.01); *H04N 9/8063* (2013.01); *H04N 21/4147* (2013.01); *H04N 21/4263* (2013.01); *H04N 21/42204* (2013.01); *H04N 21/42615* (2013.01); *H04N 21/432* (2013.01); *H04N 21/4307* (2013.01); *H04N 21/4334* (2013.01); *H04N 21/4341* (2013.01); *H04N 21/4344* (2013.01); *H04N 21/4345* (2013.01); *H04N 21/4402* (2013.01); *H04N 21/440281* (2013.01); *H04N 21/454* (2013.01); *H04N 21/4532* (2013.01); *H04N 21/472* (2013.01); *H04N 21/47214* (2013.01); *H04N 21/4884* (2013.01); *H04N 21/8456* (2013.01); *H04N 21/8547* (2013.01); *G11B 2220/216* (2013.01); *G11B 2220/2562* (2013.01); *G11B 2220/2575* (2013.01); *G11B 2220/455* (2013.01); *G11B 2220/90* (2013.01)

(56) References Cited

U.S. PATENT DOCUMENTS

| | | |
|---|---|---|
| 4,233,628 A | 11/1980 | Ciciora |
| 4,306,250 A | 12/1981 | Summers et al. |
| 4,488,179 A | 12/1984 | Kruer et al. |
| 4,566,034 A | 1/1986 | Harger et al. |
| 4,697,209 A | 9/1987 | Kiewit et al. |
| 4,908,707 A | 3/1990 | Kinghorn |
| 4,930,158 A | 5/1990 | Vogel |
| 4,931,865 A | 6/1990 | Scarampi |
| RE33,535 E | 2/1991 | Cooper |
| 4,992,871 A | 2/1991 | Bensch et al. |
| 5,014,125 A | 5/1991 | Pocock et al. |
| 5,057,932 A | 10/1991 | Lang |
| 5,093,718 A | 3/1992 | Hoarty et al. |
| 5,109,281 A | 4/1992 | Kobori et al. |
| 5,113,294 A | 5/1992 | Kim |
| 5,118,105 A | 6/1992 | Brim et al. |
| 5,126,982 A | 6/1992 | Yifrach |
| 5,132,992 A | 7/1992 | Yurt et al. |
| 5,134,499 A | 7/1992 | Sata et al. |
| 5,164,839 A | 11/1992 | Lang |
| 5,210,611 A | 5/1993 | Yee et al. |
| 5,241,428 A | 8/1993 | Goldwasser et al. |
| 5,282,247 A | 1/1994 | McLean et al. |
| 5,287,182 A | 2/1994 | Haskell et al. |
| 5,307,173 A | 4/1994 | Yuen et al. |
| 5,329,320 A | 7/1994 | Yifrach |
| 5,361,261 A | 11/1994 | Edem et al. |
| 5,363,481 A | 11/1994 | Tilt |
| 5,371,551 A | 12/1994 | Logan et al. |
| 5,373,324 A | 12/1994 | Kuroda et al. |
| 5,375,160 A | 12/1994 | Guidon et al. |
| 5,377,051 A | 12/1994 | Lane et al. |
| 5,406,626 A | 4/1995 | Ryan |
| 5,412,416 A | 5/1995 | Nemirofsky |
| 5,414,455 A | 5/1995 | Hooper et al. |
| 5,428,731 A | 6/1995 | Powers |
| 5,438,423 A | 8/1995 | Lynch et al. |
| 5,440,334 A | 8/1995 | Walters et al. |
| 5,442,390 A | 8/1995 | Hooper et al. |
| 5,469,207 A | 11/1995 | Chambers |
| 5,473,744 A | 12/1995 | Allen et al. |
| 5,475,498 A | 12/1995 | Radice |
| 5,477,263 A | 12/1995 | O'Callaghan |
| 5,481,294 A | 1/1996 | Thomas et al. |
| 5,481,542 A | 1/1996 | Logston et al. |
| 5,485,611 A | 1/1996 | Astle |
| 5,488,433 A | 1/1996 | Washino et al. |
| 5,497,277 A | 3/1996 | Takahashi |
| 5,506,902 A | 4/1996 | Kubota |
| 5,508,746 A | 4/1996 | Lim |
| 5,510,858 A | 4/1996 | Shido et al. |
| 5,513,011 A | 4/1996 | Matsumoto et al. |
| 5,519,684 A | 5/1996 | Iizuka et al. |
| 5,519,780 A | 5/1996 | Woo et al. |
| 5,535,008 A | 7/1996 | Yamagishi et al. |
| 5,535,137 A | 7/1996 | Rossmere et al. |
| 5,546,103 A | 8/1996 | Rhodes et al. |
| 5,550,594 A | 8/1996 | Cooper et al. |
| 5,555,441 A | 9/1996 | Haddad |
| 5,557,724 A | 9/1996 | Sampat et al. |
| 5,559,999 A | 9/1996 | Maturi et al. |
| 5,574,662 A | 11/1996 | Windrem et al. |
| 5,584,006 A | 12/1996 | Reber et al. |
| 5,585,858 A | 12/1996 | Harper et al. |
| 5,590,195 A | 12/1996 | Ryan |
| 5,596,581 A | 1/1997 | Saeijs et al. |
| 5,598,352 A | 1/1997 | Rosenau et al. |
| 5,598,542 A | 1/1997 | Leung |
| 5,600,379 A | 2/1997 | Wagner |
| 5,600,775 A | 2/1997 | King et al. |
| 5,614,940 A | 3/1997 | Cobbley et al. |
| 5,619,337 A | 4/1997 | Naimpally |
| 5,631,743 A | 5/1997 | Inoue |
| 5,644,362 A | 7/1997 | Cornelis |
| 5,659,368 A | 8/1997 | Landis |

(56) References Cited

U.S. PATENT DOCUMENTS

| | | |
|---|---|---|
| 5,659,539 A | 8/1997 | Porter et al. |
| 5,659,653 A | 8/1997 | Diehl et al. |
| 5,661,665 A | 8/1997 | Glass et al. |
| 5,671,412 A | 9/1997 | Christiano |
| 5,677,979 A | 10/1997 | Squicciarini et al. |
| 5,684,804 A | 11/1997 | Baronetti et al. |
| 5,696,866 A | 12/1997 | Iggulden et al. |
| 5,696,868 A | 12/1997 | Kim et al. |
| 5,701,383 A | 12/1997 | Russo et al. |
| 5,703,655 A | 12/1997 | Corey et al. |
| 5,706,388 A | 1/1998 | Isaka |
| 5,708,787 A | 1/1998 | Nakano et al. |
| 5,708,819 A | 1/1998 | Dunnihoo |
| 5,710,895 A | 1/1998 | Gerber et al. |
| 5,715,356 A | 2/1998 | Hirayama et al. |
| 5,719,786 A | 2/1998 | Nelson et al. |
| 5,719,982 A | 2/1998 | Kawamura et al. |
| 5,721,815 A | 2/1998 | Ottesen et al. |
| 5,721,878 A | 2/1998 | Ottesen et al. |
| 5,721,933 A | 2/1998 | Walsh et al. |
| 5,729,280 A | 3/1998 | Inoue et al. |
| 5,729,516 A | 3/1998 | Tozaki et al. |
| 5,742,768 A | 4/1998 | Gennaro et al. |
| 5,751,806 A | 5/1998 | Ryan |
| 5,758,068 A | 5/1998 | Brandt |
| 5,765,152 A | 6/1998 | Erickson |
| 5,767,913 A | 6/1998 | Kassatly |
| 5,774,186 A | 6/1998 | Brodsky et al. |
| 5,778,142 A | 7/1998 | Taira et al. |
| 5,790,664 A | 8/1998 | Coley et al. |
| 5,796,695 A | 8/1998 | Tsutsui |
| 5,801,785 A | 9/1998 | Crump et al. |
| 5,805,763 A | 9/1998 | Lawler et al. |
| 5,805,804 A | 9/1998 | Laursen et al. |
| 5,808,702 A | 9/1998 | Yoshinobu et al. |
| 5,809,538 A | 9/1998 | Pollmann |
| 5,812,732 A | 9/1998 | Dettmer et al. |
| 5,812,930 A | 9/1998 | Zavrel |
| 5,812,976 A | 9/1998 | Ryan |
| 5,815,671 A | 9/1998 | Morrison |
| 5,815,689 A | 9/1998 | Shaw et al. |
| 5,818,935 A | 10/1998 | Maa |
| 5,822,493 A | 10/1998 | Uehara et al. |
| 5,828,848 A | 10/1998 | MacCormack et al. |
| 5,832,085 A | 11/1998 | Inoue et al. |
| 5,844,478 A | 12/1998 | Blatter et al. |
| 5,862,342 A | 1/1999 | Winter et al. |
| 5,864,582 A | 1/1999 | Ander et al. |
| 5,867,229 A | 2/1999 | Stevens |
| 5,870,710 A | 2/1999 | Ozawa et al. |
| 5,889,949 A | 3/1999 | Charles |
| 5,892,536 A | 4/1999 | Logan |
| 5,898,695 A | 4/1999 | Fujii et al. |
| 5,909,257 A | 6/1999 | Ohishi et al. |
| 5,909,559 A | 6/1999 | So |
| 5,911,029 A | 6/1999 | Sakaguchi et al. |
| 5,913,038 A | 6/1999 | Griffiths |
| 5,929,849 A | 7/1999 | Kikinis |
| 5,930,444 A | 7/1999 | Camhi et al. |
| 5,937,138 A | 8/1999 | Fukuda et al. |
| 5,940,074 A | 8/1999 | Britt, Jr. et al. |
| 5,940,504 A | 8/1999 | Griswold |
| 5,949,948 A | 9/1999 | Krause et al. |
| 5,956,716 A | 9/1999 | Kenner et al. |
| 5,957,695 A | 9/1999 | Redford et al. |
| 5,963,202 A | 10/1999 | Polish |
| 5,970,220 A | 10/1999 | Bolash et al. |
| 5,973,679 A | 10/1999 | Abbott et al. |
| 5,978,855 A | 11/1999 | Metz et al. |
| 5,987,210 A | 11/1999 | Iggulden et al. |
| 5,987,509 A | 11/1999 | Portuesi |
| 5,990,875 A | 11/1999 | Bi et al. |
| 5,990,881 A | 11/1999 | Inoue et al. |
| 5,991,496 A | 11/1999 | Kojima |
| 5,991,503 A | 11/1999 | Miyasaka et al. |
| 5,995,709 A | 11/1999 | Tsuge |
| 5,999,225 A | 12/1999 | Yagasaki et al. |
| 5,999,688 A | 12/1999 | Iggulden et al. |
| 5,999,691 A | 12/1999 | Takagi et al. |
| 5,999,698 A | 12/1999 | Nakai et al. |
| 6,002,832 A | 12/1999 | Yoneda |
| 6,005,562 A | 12/1999 | Shiga et al. |
| 6,005,564 A | 12/1999 | Ahmad et al. |
| 6,009,525 A | 12/1999 | Horstmann |
| 6,018,612 A | 1/2000 | Thomason et al. |
| 6,018,775 A | 1/2000 | Vossler |
| 6,028,599 A | 2/2000 | Yuen et al. |
| 6,052,554 A | 4/2000 | Hendricks et al. |
| 6,058,430 A | 5/2000 | Kaplan |
| 6,058,459 A | 5/2000 | Owen et al. |
| 6,061,692 A | 5/2000 | Thomas et al. |
| 6,064,792 A | 5/2000 | Fox et al. |
| 6,065,050 A | 5/2000 | DeMoney |
| 6,072,393 A | 6/2000 | Todd |
| 6,072,982 A | 6/2000 | Haddad |
| 6,075,550 A | 6/2000 | Lapierre |
| 6,081,750 A | 6/2000 | Hoffberg et al. |
| 6,094,234 A | 7/2000 | Nonomura et al. |
| RE36,801 E | 8/2000 | Logan et al. |
| 6,100,941 A | 8/2000 | Dimitrova et al. |
| 6,112,226 A | 8/2000 | Weaver et al. |
| 6,115,057 A | 9/2000 | Kwoh et al. |
| 6,134,638 A | 10/2000 | Olarig |
| 6,138,147 A | 10/2000 | Weaver et al. |
| 6,138,221 A | 10/2000 | Korst et al. |
| 6,141,385 A | 10/2000 | Yamaji et al. |
| 6,148,140 A | 11/2000 | Okada et al. |
| 6,151,059 A | 11/2000 | Schein et al. |
| 6,154,771 A | 11/2000 | Rangan et al. |
| 6,157,413 A | 12/2000 | Hanafee et al. |
| 6,163,644 A | 12/2000 | Owashi et al. |
| 6,163,646 A | 12/2000 | Tanaka et al. |
| 6,166,730 A | 12/2000 | Goode et al. |
| 6,167,083 A | 12/2000 | Sporer et al. |
| 6,169,842 B1 | 1/2001 | Pijnenburg et al. |
| 6,169,843 B1 | 1/2001 | Lenihan et al. |
| 6,169,844 B1 | 1/2001 | Arai |
| 6,169,976 B1 | 1/2001 | Colosso |
| 6,172,605 B1 | 1/2001 | Matsumoto et al. |
| 6,172,712 B1 | 1/2001 | Beard |
| 6,181,706 B1 | 1/2001 | Anderson et al. |
| 6,192,189 B1 | 2/2001 | Fujinami et al. |
| 6,198,877 B1 | 3/2001 | Kawamura et al. |
| 6,209,041 B1 | 3/2001 | Shaw et al. |
| 6,219,839 B1 | 4/2001 | Sampsell |
| 6,226,447 B1 | 5/2001 | Sasaki et al. |
| 6,226,624 B1 | 5/2001 | Watson et al. |
| 6,233,389 B1 | 5/2001 | Barton et al. |
| 6,249,641 B1 | 6/2001 | Yokota |
| 6,249,863 B1 | 6/2001 | Redford et al. |
| 6,253,375 B1 | 6/2001 | Gordon et al. |
| 6,256,704 B1 | 7/2001 | Hlava et al. |
| 6,262,951 B1 | 7/2001 | Shimizu et al. |
| 6,263,396 B1 | 7/2001 | Cottle et al. |
| 6,263,503 B1 | 7/2001 | Marguiles |
| 6,272,672 B1 | 8/2001 | Conway |
| 6,278,837 B1 | 8/2001 | Yasukohchi et al. |
| 6,282,045 B1 | 8/2001 | Glover |
| 6,282,209 B1 | 8/2001 | Kataoka et al. |
| 6,282,320 B1 | 8/2001 | Hasegawa et al. |
| 6,285,407 B1 | 9/2001 | Yasuki et al. |
| 6,285,746 B1 | 9/2001 | Duran et al. |
| 6,285,824 B1 | 9/2001 | Yanagihara et al. |
| 6,292,618 B1 | 9/2001 | Ohara et al. |
| 6,292,619 B1 | 9/2001 | Fujita et al. |
| 6,295,093 B1 | 9/2001 | Park et al. |
| 6,301,711 B1 | 10/2001 | Nusbickel |
| 6,304,714 B1 | 10/2001 | Krause et al. |
| 6,311,011 B1 | 10/2001 | Kuroda |
| 6,317,885 B1 | 11/2001 | Fries |
| 6,320,621 B1 | 11/2001 | Fu |
| 6,327,418 B1 | 12/2001 | Barton |
| 6,330,334 B1 | 12/2001 | Ryan |
| 6,330,675 B1 | 12/2001 | Wiser et al. |

(56) References Cited

U.S. PATENT DOCUMENTS

| | | |
|---|---|---|
| 6,334,022 B1 | 12/2001 | Ohba et al. |
| 6,341,195 B1 | 1/2002 | Mankovitz et al. |
| 6,349,410 B1 | 2/2002 | Lortz |
| 6,353,461 B1 | 3/2002 | Shore et al. |
| 6,356,708 B1 | 3/2002 | Krause et al. |
| 6,359,636 B1 | 3/2002 | Schindler |
| 6,363,212 B1 | 3/2002 | Fujinami et al. |
| 6,369,855 B1 | 4/2002 | Chauvel et al. |
| 6,370,323 B1 | 4/2002 | Adolph et al. |
| 6,380,978 B1 | 4/2002 | Adams et al. |
| 6,385,386 B1 | 5/2002 | Aotake |
| 6,385,711 B1 | 5/2002 | Colligan |
| 6,404,977 B1 | 6/2002 | Iggulden |
| 6,412,111 B1 | 6/2002 | Cato |
| 6,424,791 B1 | 7/2002 | Saib |
| 6,425,054 B1 | 7/2002 | Nguyen |
| 6,434,326 B1 | 8/2002 | Kondo et al. |
| 6,442,328 B1 | 8/2002 | Elliott et al. |
| 6,445,738 B1 | 9/2002 | Zdepski |
| 6,445,872 B1 | 9/2002 | Sano et al. |
| RE37,881 E | 10/2002 | Haines |
| 6,473,903 B2 | 10/2002 | Balakrishnan et al. |
| 6,477,123 B1 | 11/2002 | Hütter |
| 6,480,353 B1 | 11/2002 | Sacks et al. |
| 6,480,667 B1 | 11/2002 | O'Connor |
| 6,490,000 B1 | 12/2002 | Schaefer et al. |
| 6,496,981 B1 | 12/2002 | Wistendahl et al. |
| 6,498,894 B2 | 12/2002 | Ito et al. |
| 6,504,990 B1 | 1/2003 | Abecassis |
| 6,529,685 B2 | 3/2003 | Ottesen et al. |
| 6,535,465 B1 | 3/2003 | Shigetomi et al. |
| 6,553,178 B2 | 4/2003 | Abecassis |
| 6,564,996 B2 | 5/2003 | Hoffmann et al. |
| 6,611,803 B1 | 8/2003 | Furuyama et al. |
| 6,637,032 B1 | 10/2003 | Feinleib |
| 6,694,200 B1 | 2/2004 | Naim |
| 6,697,944 B1 | 2/2004 | Jones et al. |
| 6,748,539 B1 | 6/2004 | Lotspiech |
| 6,754,254 B2 | 6/2004 | Sendonaris |
| 6,788,882 B1 | 9/2004 | Geer et al. |
| 6,829,254 B1 | 12/2004 | Rajahalme et al. |
| 6,832,388 B1 | 12/2004 | Du Val |
| 6,839,851 B1 | 1/2005 | Saitoh et al. |
| 6,853,385 B1 | 2/2005 | MacInnis et al. |
| 6,865,431 B1 | 3/2005 | Hirota et al. |
| 6,895,166 B1 | 5/2005 | Schriebman |
| 6,895,169 B1 | 5/2005 | Sprague |
| 6,909,837 B1 | 6/2005 | Unger |
| 6,941,387 B1 | 9/2005 | Takihara |
| 6,944,185 B2 | 9/2005 | Patki et al. |
| 6,959,221 B1 | 10/2005 | Kataoka |
| 6,973,256 B1 | 12/2005 | Dagtas |
| 6,993,567 B1 | 1/2006 | Yodo et al. |
| 7,006,881 B1 | 2/2006 | Hoffberg et al. |
| 7,028,327 B1 | 4/2006 | Dougherty et al. |
| 7,032,177 B2 | 4/2006 | Novak et al. |
| 7,055,166 B1 | 5/2006 | Logan et al. |
| 7,065,778 B1 | 6/2006 | Lu |
| 7,103,908 B2 | 9/2006 | Tomsen |
| 7,107,608 B2 | 9/2006 | Wagner et al. |
| 7,110,658 B1 | 9/2006 | Iggulden et al. |
| 7,120,924 B1 | 10/2006 | Katcher et al. |
| 7,140,033 B1 | 11/2006 | Durden et al. |
| 7,155,451 B1 | 12/2006 | Torres |
| 7,159,232 B1 | 1/2007 | Blackketter et al. |
| 7,188,087 B1 | 3/2007 | Goldstein |
| 7,194,754 B2 | 3/2007 | Tomsen et al. |
| 7,213,005 B2 | 5/2007 | Mourad et |
| 7,225,142 B1 | 5/2007 | Apte |
| 7,269,330 B1 | 9/2007 | Iggulden |
| 7,272,298 B1 | 9/2007 | Lang et al. |
| 7,308,698 B1 | 12/2007 | Heughebaert et al. |
| 7,313,802 B1 | 12/2007 | Tomsen |
| 7,333,153 B2 | 2/2008 | Hartson et al. |
| 7,373,651 B2 | 5/2008 | Palazzo et al. |
| 7,395,546 B1 | 7/2008 | Asmussen |
| 7,404,148 B2 | 7/2008 | Lincke et al. |
| 7,457,511 B2 | 11/2008 | Putterman et al. |
| 7,529,465 B2 * | 5/2009 | Barton et al. ............. 386/278 |
| 7,558,472 B2 | 7/2009 | Locket et al. |
| 7,661,121 B2 | 2/2010 | Smith |
| 7,681,141 B2 | 3/2010 | Tu |
| 7,716,588 B2 | 5/2010 | Iwamura |
| 7,743,326 B2 | 6/2010 | Kanai |
| 7,814,511 B2 | 10/2010 | Macrae et al. |
| 7,818,763 B2 | 10/2010 | Sie et al. |
| 7,870,584 B2 | 1/2011 | Russ et al. |
| 7,877,765 B2 | 1/2011 | Bhogal et al. |
| 7,877,766 B1 | 1/2011 | Wu et al. |
| 7,886,337 B2 | 2/2011 | Williams et al. |
| 7,929,560 B2 | 4/2011 | Morioka |
| 8,046,803 B1 | 10/2011 | Lee |
| 8,122,236 B2 | 2/2012 | Hayward |
| 8,146,130 B2 | 3/2012 | Smith et al. |
| 8,161,412 B2 | 4/2012 | Weeks et al. |
| 8,214,422 B1 | 7/2012 | Woodward et al. |
| 8,296,792 B2 | 10/2012 | Sahota et al. |
| 8,453,193 B2 | 5/2013 | Barton et al. |
| 8,457,476 B2 | 6/2013 | Locket et al. |
| 8,526,781 B2 * | 9/2013 | Barton et al. ............. 386/235 |
| 8,528,032 B2 | 9/2013 | Ellis et al. |
| 8,601,507 B2 | 12/2013 | Billmaier et al. |
| 8,627,385 B2 | 1/2014 | Davies et al. |
| 8,824,865 B2 | 9/2014 | Barton et al. |
| 8,893,180 B2 | 11/2014 | Barton et al. |
| 8,948,569 B2 * | 2/2015 | Barton et al. ............. 386/235 |
| 8,965,173 B2 | 2/2015 | Barton et al. |
| 9,002,173 B2 | 4/2015 | Barton et al. |
| 2001/0003554 A1 | 6/2001 | Mori et al. |
| 2001/0013120 A1 | 8/2001 | Tsukamoto |
| 2001/0014206 A1 | 8/2001 | Artigalas et al. |
| 2001/0016884 A1 | 8/2001 | Sato et al. |
| 2001/0029583 A1 | 10/2001 | Palatov et al. |
| 2001/0042246 A1 | 11/2001 | Yuen et al. |
| 2001/0049648 A1 | 12/2001 | Naylor et al. |
| 2002/0002523 A1 | 1/2002 | Kossovsky et al. |
| 2002/0003949 A1 | 1/2002 | Mamiya et al. |
| 2002/0012531 A1 | 1/2002 | Flannery |
| 2002/0013950 A1 | 1/2002 | Tomsen |
| 2002/0016965 A1 | 2/2002 | Tomsen |
| 2002/0017558 A1 | 2/2002 | Graves |
| 2002/0028063 A1 | 3/2002 | Haneda et al. |
| 2002/0032906 A1 | 3/2002 | Grossman |
| 2002/0032907 A1 | 3/2002 | Daniels |
| 2002/0048349 A1 | 4/2002 | Bixler et al. |
| 2002/0054091 A1 | 5/2002 | Tomsen et al. |
| 2002/0056118 A1 | 5/2002 | Hunter et al. |
| 2002/0057892 A1 | 5/2002 | Mano et al. |
| 2002/0057893 A1 | 5/2002 | Wood et al. |
| 2002/0057895 A1 | 5/2002 | Oku et al. |
| 2002/0078456 A1 | 6/2002 | Hudson et al. |
| 2002/0082973 A1 | 6/2002 | Marbach et al. |
| 2002/0104086 A1 | 8/2002 | Tomsen et al. |
| 2002/0120925 A1 | 8/2002 | Logan |
| 2002/0124250 A1 | 9/2002 | Proehl et al. |
| 2002/0157002 A1 | 10/2002 | Messerges et al. |
| 2002/0163532 A1 | 11/2002 | Thomas et al. |
| 2002/0164156 A1 | 11/2002 | Bilbrey |
| 2002/0176690 A1 | 11/2002 | Nagasawa |
| 2002/0178368 A1 | 11/2002 | Yin et al. |
| 2002/0199043 A1 | 12/2002 | Yin |
| 2003/0005463 A1 | 1/2003 | Macrae et al. |
| 2003/0014754 A1 | 1/2003 | Chang |
| 2003/0053540 A1 | 3/2003 | Wang et al. |
| 2003/0093790 A1 | 5/2003 | Logan et al. |
| 2003/0095791 A1 | 5/2003 | Barton et al. |
| 2003/0110503 A1 | 6/2003 | Perkes |
| 2003/0118014 A1 | 6/2003 | Iyer et al. |
| 2003/0120942 A1 | 6/2003 | Yoshida et al. |
| 2003/0149988 A1 | 8/2003 | Ellis et al. |
| 2003/0158958 A1 | 8/2003 | Chiu |
| 2003/0174549 A1 | 9/2003 | Yaguchi et al. |
| 2003/0192060 A1 | 10/2003 | Levy |
| 2003/0204613 A1 | 10/2003 | Hudson et al. |

(56) References Cited

U.S. PATENT DOCUMENTS

| | | |
|---|---|---|
| 2003/0215211 A1 | 11/2003 | Coffin |
| 2003/0229893 A1 | 12/2003 | Sgaraglino |
| 2004/0003079 A1 | 1/2004 | Aiu et al. |
| 2004/0008289 A1 | 1/2004 | Hwang et al. |
| 2004/0086263 A1 | 5/2004 | Arora |
| 2004/0117483 A1 | 6/2004 | Singer et al. |
| 2004/0122746 A1 | 6/2004 | Charlier et al. |
| 2004/0123129 A1 | 6/2004 | Ginter et al. |
| 2004/0125761 A1 | 7/2004 | Yamaguchi et al. |
| 2004/0187158 A1 | 9/2004 | Fellenstein et al. |
| 2004/0193900 A1 | 9/2004 | Nair |
| 2004/0237100 A1 | 11/2004 | Pinder et al. |
| 2004/0237104 A1 | 11/2004 | Cooper et al. |
| 2004/0250291 A1 | 12/2004 | Rao et al. |
| 2004/0261093 A1 | 12/2004 | Rebaud et al. |
| 2005/0022251 A1 | 1/2005 | Ohnuma et al. |
| 2005/0025469 A1 | 2/2005 | Geer et al. |
| 2005/0028208 A1 | 2/2005 | Ellis et al. |
| 2005/0055640 A1 | 3/2005 | Alten |
| 2005/0066362 A1 | 3/2005 | Rambo |
| 2005/0076359 A1 | 4/2005 | Pierson et al. |
| 2005/0086705 A1 | 4/2005 | Jarman et al. |
| 2005/0120386 A1 | 6/2005 | Stone |
| 2005/0122335 A1 | 6/2005 | MacInnis et al. |
| 2005/0132418 A1 | 6/2005 | Barton et al. |
| 2005/0177853 A1 | 8/2005 | Williams et al. |
| 2005/0226601 A1 | 10/2005 | Cohen et al. |
| 2005/0226604 A1 | 10/2005 | Kawamura et al. |
| 2006/0013556 A1 | 1/2006 | Poslinski |
| 2006/0045470 A1 | 3/2006 | Poslinski |
| 2006/0089843 A1 | 4/2006 | Flather |
| 2006/0095472 A1 | 5/2006 | Krikorian et al. |
| 2006/0127039 A1 | 6/2006 | Van Stam |
| 2006/0184961 A1 | 8/2006 | Lee et al. |
| 2007/0157237 A1 | 7/2007 | Cordray et al. |
| 2007/0166001 A1 | 7/2007 | Barton et al. |
| 2007/0230921 A1 | 10/2007 | Barton et al. |
| 2007/0262571 A1 | 11/2007 | Mansfield et al. |
| 2008/0010130 A1 | 1/2008 | Pyhalammi et al. |
| 2008/0066127 A1 | 3/2008 | Schechinger et al. |
| 2008/0092168 A1 | 4/2008 | Logan et al. |
| 2008/0104199 A1 | 5/2008 | Kalaboukis |
| 2008/0104202 A1 | 5/2008 | Barrett et al. |
| 2008/0212949 A1 | 9/2008 | Wachtfogel |
| 2009/0009605 A1 | 1/2009 | Ortiz |
| 2009/0136215 A1 | 5/2009 | Barton et al. |
| 2009/0208185 A1 | 8/2009 | Barton |
| 2009/0241158 A1 | 9/2009 | Campagna et al. |
| 2009/0269024 A1 | 10/2009 | Locket et al. |
| 2009/0320056 A1 | 12/2009 | Wu et al. |
| 2010/0080529 A1 | 4/2010 | Barton et al. |
| 2010/0192175 A1 | 7/2010 | Bachet et al. |
| 2010/0226627 A1 | 9/2010 | Barton et al. |
| 2010/0280876 A1 | 11/2010 | Bowra |
| 2011/0041146 A1 | 2/2011 | Lewis |
| 2011/0116766 A1 | 5/2011 | Sie et al. |
| 2011/0126107 A1 | 5/2011 | Barton et al. |
| 2011/0135271 A1 | 6/2011 | Van Hoff et al. |
| 2012/0027383 A1 | 2/2012 | Barton et al. |
| 2013/0163954 A1 | 6/2013 | Barton et al. |
| 2013/0243393 A1 | 9/2013 | Barton et al. |
| 2013/0247092 A1 | 9/2013 | Barton et al. |
| 2013/0315569 A1 | 11/2013 | Ellis et al. |
| 2014/0003791 A1 | 1/2014 | Barton et al. |
| 2014/0016912 A1 | 1/2014 | Lockett |
| 2014/0056572 A1 | 2/2014 | Barton et al. |
| 2014/0059593 A1 | 2/2014 | Smith et al. |
| 2015/0074719 A1 | 3/2015 | Barton et al. |
| 2015/0181280 A1 | 6/2015 | Barton et al. |
| 2015/0215572 A1 | 7/2015 | Barton et al. |

FOREIGN PATENT DOCUMENTS

| | | |
|---|---|---|
| EP | 0 594 241 A1 | 4/1994 |
| EP | 0 692 909 A2 | 1/1996 |
| EP | 0 744 866 A2 | 11/1996 |
| EP | 0 784 400 | 7/1997 |
| EP | 0 785 675 A2 | 7/1997 |
| EP | 0 810 789 | 12/1997 |
| EP | 0762756 | 6/1998 |
| EP | 0847001 | 6/1998 |
| EP | 0 933 891 A2 | 8/1999 |
| EP | 1376449 | 3/2005 |
| GB | 375923 A | 7/1932 |
| GB | 2 320 637 | 6/1998 |
| GB | 2 333 017 | 7/1999 |
| GB | 2 375 923 | 7/2001 |
| JP | H02-071633 | 3/1990 |
| JP | H05-114194 | 5/1993 |
| JP | H05-182294 | 7/1993 |
| JP | H06-245182 | 9/1994 |
| JP | H07-30839 | 1/1995 |
| JP | H07-44907 | 2/1995 |
| JP | H07-212331 | 8/1995 |
| JP | H08-289240 | 11/1996 |
| JP | H09-65267 | 3/1997 |
| JP | H09-135391 | 5/1997 |
| JP | H10-164521 | 6/1998 |
| JP | H10-208392 | 8/1998 |
| JP | H11-103452 | 4/1999 |
| JP | H11-187324 | 7/1999 |
| JP | 2000-013755 | 1/2000 |
| JP | 2001-126009 | 5/2001 |
| JP | 2001-160003 | 6/2001 |
| JP | 2001-338242 | 12/2001 |
| JP | 2004-193920 | 7/2004 |
| JP | 2006-506883 | 2/2006 |
| JP | 2001-325461 | 11/2011 |
| WO | WO 92/22938 | 12/1992 |
| WO | WO 92/22983 | 12/1992 |
| WO | WO 97/15143 | 4/1997 |
| WO | WO 98/07273 | 2/1998 |
| WO | WO 98/11723 | 3/1998 |
| WO | WO98/17064 | 4/1998 |
| WO | WO 98/17064 A1 | 4/1998 |
| WO | WO 98/31149 | 7/1998 |
| WO | WO 98/48566 | 10/1998 |
| WO | WO 98/58306 | 12/1998 |
| WO | WO99/17549 | 4/1999 |
| WO | WO 99/38321 | 7/1999 |
| WO | WO 00/07368 | 2/2000 |
| WO | WO 2000024192 | 4/2000 |
| WO | WO 00/36833 | 6/2000 |
| WO | WO 01/22729 | 3/2001 |
| WO | WO 01/48755 | 7/2001 |
| WO | WO 01/53963 A1 | 7/2001 |
| WO | WO 02/01330 | 1/2002 |
| WO | WO 03/019932 | 3/2003 |
| WO | WO 03/043326 | 5/2003 |
| WO | WO 2004/008289 | 1/2004 |
| WO | WO 2005/060659 | 7/2005 |
| WO | WO 2005/079499 | 9/2005 |
| WO | WO 2007/144728 | 12/2007 |
| WO | WO 2008/002309 | 1/2008 |
| WO | WO 2008/054802 | 5/2008 |
| WO | WO 2009/026411 | 2/2009 |

OTHER PUBLICATIONS

Australian Patent Office, Application No. 2005306361, Examination Report dated Apr. 22, 2009.
Australian Patent Office, Application No. 2005306362, Claims dated Jul. 2010, 3 pages.
Australian Patent Office, Application No. 2005306362, Examination Report dated Apr. 2011, 11 pages.
Australian Patent Office, Application No. 2005306362, Examiner's First Report dated Nov. 24, 2009, 17 pages.
Australian Patent Office, Application No. 2005306362, Examiner's Report No. 2 dated Jul. 9, 2010, 2 pages.
Australian Patent Office, Application No. 2010202449, Claims dated Jun. 2012, 3 pages.
Australian Patent Office, Application No. 2010202449, First Examination Report dated Jun. 28, 2012, 3 pages.

(56) References Cited

OTHER PUBLICATIONS

Australian Patent Office, Application No. 2010234678, Claims dated Apr. 4, 2013, 6 pages.
Australian Patent Office, Application No. 2010234678, First Examination Report dated Apr. 4, 2013, 3 pages.
Canadian Intellectual Property Office, Application No. 2,588,630, Claims dated Nov. 2009, 7 pages.
Canadian Intellectual Property Office, Application No. 2,588,630, Claims dated Nov. 3, 2009, 5 pages.
Canadian Intellectual Property Office, Application No. 2,757,469, Claims dated Oct. 2013, 6 pages.
Canadian Intellectual Property Office, Application No. 2,757,469, Office Action dated Oct. 1, 2013, 3 pages.
Chinese Patent Office, Application No. 200480033609.3, Claims dated Apr. 2014, 4 pages.
Chinese Patent Office, Application No. 200480033609.3, Claims dated Oct. 2013, 4 pages.
Chinese Patent Office, Application No. 200480033609.3, Claims dated Oct. 9, 2013, 13 pages.
Chinese Patent Office, Application No. 200480033609.3, Foreign Office Action dated Apr. 30, 2014.
Chinese Patent Office, Application No. 200580039507.7, "Notification of the First Office Action", dated Mar. 27, 2009, 8 pages.
Chinese Patent Office, Application No. 200580039507.7, Claims dated Mar. 27, 2009.
Chinese Patent Office, Application No. 200580041645.9, Claims on dated Nov. 2011, 11 pages.
Chinese Patent Office, Application No. 200580041645.9, Office Action dated Nov. 24, 2011, 9 pages.
Chinese Patent Office, Application No. 201080025573.X, Claims dated Dec. 24, 2013.
Chinese Patent Office, Application No. 201080025573.X, Foreign Office Action dated Dec. 24, 2013.
Chinese Patent Office, Application No. 201080025573.X, Foreign Office Action dated Nov. 2, 2014.
Chinese Patent Office, Application No. 201080025573.X, Pending Claims as of Nov. 2, 2014.
Chinese Patent Office, Application No. 201110306367.2, Foreign Office Action dated Oct. 24, 2014.
Chinese Patent Office, Application No. 201110306367.2, Pending Claims as of Oct. 24, 2014.
Chinese Patent Office, Application No. 201210083646.1, Foreign Office Action dated Oct. 17, 2014.
Chinese Patent Office, Application No. 201210083646.1, Pending Claims as of Oct. 17, 2014.
European Patent Office, Application No. 03710648.1, Claims dated May 27, 2008.
European Patent Office, Application No. 03710648.1, Office Action dated May 27, 2008.
European Patent Office, Application No. 05 851 949.7-1241, Claims dated Jul. 2012, 3 pages.
European Patent Office, Application No. 05 851 949.7-1241, Office Action dated Jul. 9, 2012, 6 pages.
European Patent Office, Application No. 05851948.9, Office Action dated Feb. 21, 2013.
European Patent Office, Application No. 05851948.9, Pending Claims as of Feb. 21, 2013.
European Patent Office, Application No. 07025136.8-1522, Claims dated Nov. 2011, 4 pages.
European Patent Office, Application No. 07025136.8-1522, Office Action dated Nov. 18, 2011, 5 pages.
European Patent Office, Application No. 10159416.6, Foreign Office Action dated Jul. 16, 2015.
European Patent Office, Application No. 10159416.6, Pending Claims as of Jul. 16, 2015.
European Patent Office, Application No. 10762268.0-1905, Claims dated Feb. 2014, 4 pages.
European Patent Office, Application No. 10762268.0-1905, Search Report dated Feb. 18, 2014, 8 pages.
European Patent Office, Application No. 11 195 319.6-1908, Claims dated Mar. 2014, 2 pages.
European Patent Office, Application No. 11 195 319.6-1908, Search Report dated Mar. 21, 2014, 7 pages.
European Patent Office, Application No. 11182065.0, Office Action dated Dec. 16, 2011.
European Patent Office, Application No. 11182065.0, Office Action dated Dec. 2011, 3 pages.
Iannella, R. "Open Digital Rights Language (ODRL): Version 0.9" Jun. 29, 2001, IPR Systems Pty Ltd. 2001 (46 pages).
Intellectual Property Library, "Sitrick Vs. Dreamworks LLC", (CAFC) 85 USPQ2d, 1826, revised Feb. 5, 2008, 9 pages.
Japanese Patent Office, Application No. 2007-543364, Office Action dated Nov. 15, 2011, 4 pages.
Japanese Patent Office, Application No. 2007-543364, Pending Claims as of Nov. 15, 2011.
Japanese Patent Office, Application No. 2010-101051, Claims dated May 21, 2013.
Japanese Patent Office, Application No. 2010-101051, Claims dated Jan. 2, 2011, 3 pages.
Japanese Patent Office, Application No. 2010-101051, Decision of Rejection dated Jan. 14, 2014, 4 pages.
Japanese Patent Office, Application No. 2010-101051, Office Action dated May 21, 2013.
Japanese Patent Office, Application No. 2010-10150, Foreign Office Action dated Nov. 25, 2014.
Japanese Patent Office, Application No. 2010-10150, Pending Claims as of Nov. 25, 2014.
Japanese Patent Office, Application No. 2011-253348, Foreign Office Action dated Oct. 7, 2014.
Japanese Patent Office, Application No. 2011-253348, Pending Claims as of Oct. 7, 2014.
Japanese Patent Office, Application No. 2011-253349, Appeal Decision dated Feb. 10, 2015.
Japanese Patent Office, Application No. 2011-253349, Pending Claims as of Oct. 2, 2015.
Japanese Patent Office, Application No. 2012-504753, Claims dated Mar. 19, 2013, 6 pages.
Japanese Patent Office, Application No. 2012-504753, Claims dated Oct. 2013, 6 pages.
Japanese Patent Office, Application No. 2012-504753, Foreign Office Action dated Oct. 21, 2014.
Japanese Patent Office, Application No. 2012-504753, Office Action dated Mar. 19, 2013, 2 pages.
Japanese Patent Office, Application No. 2012-504753, Office Action dated Oct. 15, 2013.
Japanese Patent Office, Application No. 2012-504753, Pending Claims as of Oct. 21, 2014.
Japanese Patent Office, Application No. 2013-156103, Foreign Office Action dated Jul. 8, 2014.
Japanese Patent Office, Application No. 2013-156103, Foreign Office Action dated Feb. 3, 2015.
Japanese Patent Office, Application No. 2013-156103, Pending Claims as of Jul. 8, 2014.
Japanese Patent Office, Application No. 2013-156103, Pending Claims as of Feb. 3, 2015.
Japanese Patent Office, Application No. 2014-004254, Foreign Office Action dated Jul. 8, 2014.
Japanese Patent Office, Application No. 2014-004254, Foreign Office Action dated Feb. 3, 2015.
Japanese Patent Office, Application No. 2014-004254, Pending Claims as of Jul. 8, 2014.
Japanese Patent Office, Application No. 2014-004254, Pending Claims as of Feb. 3, 2015.
Singapore Patent Office, Application No. 201107098-4, "Examination Report" dated Jan. 22, 2013, 12 pages.
Singapore Patent Office, Application No. 201107098-4, Claims dated Jan. 2013, 6 pages.
World Intellectual Property Organization, Application No. PCT/US2005/042191, "Search Report and Written Opinion" dated May 8, 2006, 11 pages.
World Intellectual Property Organization, Application No. PCT/US2005/042191, Claims dated May 2008, 7 pages.

(56) References Cited

OTHER PUBLICATIONS

World Intellectual Property Organization, Application No. PCT/US2005/042192, "Search Report and Written Opinion" dated Sep. 26, 2006, 21 pages.
World Intellectual Property Organization, Application No. PCT/US2005/042192, Claims dated Sep. 2006, 12 pages.
United States Patent and Trademark Office, U.S. Appl. No. 14/029,679, Notice of Allowance dated Feb. 16, 2016.
United States Patent and Trademark Office, U.S. Appl. No. 11/285,402, Non-Final Office Action dated Feb. 25, 2016.
United States Patent and Trademark Office, U.S. Appl. No. 14/681,079, Notice of Allowance dated Apr. 13, 2016.
United States Patent and Trademark Office, U.S. Appl. No. 11/725,909, Non-Final Office Action dated Apr. 22, 2016.
Cyril U. Orji, et al., "Design and Configuration Rationales for Digital Video Storage and Delivery Systems", Multimedia Tools and Applications, 9, 275-302 (1992), © 1992 Kluwer Academic Publishers, Boston (pp. 275-302).
D.J. Woodham, "HDTV Production: Today and Tomorrow: A Solid State "Action Relay" Recorder", Symposium Record Broadcast Sessions, System Session P-2, dated Jun. 17, 1989 (8 pgs.).
Decision on Petition of Patent Owner to Temporarily Suspend Ex Parte Reexamination Proceeding, U.S. Pat. No. 6,233,389, Control No. 90/009,329, dated Sep. 14, 2009.
Decision on Petition of Patent Owner to Temporarily Suspend Ex Parte Reexamination Proceeding, U.S. Pat. No. 6,233,389, Control No. 90/009,329, dated Aug. 21, 2009.
DiviCom, MP100 User Guide, DiviCom, Inc., © 1996 (97 pgs).
DMA, published in Embedded Systems Programming, 4 pages, Oct. 1994.
Douglas T. Anderson, "The Hard Disk Technical Guide", Tenth Revision S-D., Feb. 1994, © 1990, 1991, 1992, 1993, 1994 by Micro House International Inc., (70 pgs).
Dowden, John et al. "Oracle Video Server: Getting Started with Oracle Video Server Manager" release 3.0, Feb. 1998, part No. A55979-02, 48 pages.
Dowden, John et al. Oracle Video Server™: Quick Start, Release 3.0, Feb. 1998, part No. A53954-02, 28 pages.
Engst, Adam "Quick Time" article originally appeared in TidBITS on Jul. 22, 1991 at 12:00 p.m., the permanent URL for the article is: http://db.tidbits.com/article/3441, 5 pages.
Exhibit A1 to AT&T's and Microsoft Corporation's Invalidity Contentions: Claim Chart of U.S. Pat. No. 6,233,389 in view of U.S. Pat. No. 5,557,724 to Sampat, 23 pages.
Exhibit A2 to AT&T's and Microsoft Corporation's Invalidity Contentions: Claim Chart of U.S. Pat. No. 6,233,389 in view of U.S. Pat. No. 6,169,843, 6 pages.
Exhibit A3 to AT&T's and Microsoft Corporation's Invalidity Contentions: Claim Chart of U.S. Pat. No. 6,233,389 in view of U.S. Pat. No. 6,181,706, 5 pages.
Exhibit A4 to AT&T's and Microsoft Corporation's Invalidity Contentions: Claim Chart of U.S. Pat. No. 6,233,389 in view of U.S. Pat. No. 7,272,298 to Lang, 11 pages.
Exhibit A5 to AT&T's and Microsoft Corporation's Invalidity Contentions: Claim Chart of U.S. Pat. No. 6,233,389 in view of U.S. Pat. No. 6,209,041, 140 pages.
Exhibit A6 to AT&T's and Microsoft Corporation's Invalidity Contentions: Claim Chart of U.S. Pat. No. 6,233,389 in view of U.S. Pat. No. 6,172,712, 137 pages.
Exhibit A7 to AT&T's and Microsoft Corporation's Invalidity Contentions: Claim Chart of U.S. Pat. No. 6,233,389 in view of Graham Thomason, EP0594241, 136 pages.
Exhibit A8 to AT&T's and Microsoft Corporation's Invalidity Contentions: Claim Chart of U.S. Pat. No. 6,233,389 in view of U.S. Pat. No. 5,822,493, 161 pages.
Exhibit A9 to AT&T's and Microsoft Corporation's Invalidity Contentions: Claim Chart of U.S. Pat. No. 6,233,389 in view of U.S. Pat. No. 6,490,000, 134 pages.
Exhibit A10 to AT&T's and Microsoft Corporation's Invalidity Contentions: Claim Chart of U.S. Pat. No. 6,233,389 in view of C. Hanna et al., Demultiplexer IC for MPEG2 Transport Streams, 138 pages.
Exhibit A11 to AT&T's and Microsoft Corporation's Invalidity Contentions: Claim Chart of U.S. Pat. No. 6,233,389 in view of Robert Johnson, A Digital Television Sequence Store, 148 pages.
Exhibit A12 to AT&T's and Microsoft Corporation's Invalidity Contentions: Claim Chart of U.S. Pat. No. 6,233,389 in view of U.S. Pat. No. 5,721,815 to Ottesen, 18 pages.
Exhibit A13 to AT&T's and Microsoft Corporation's Invalidity Contentions: Claim Chart of U.S. Pat. No. 6,233,389 in view of U.S. Pat. No. 6,018,612 to Thomason, et al. and further in view of U.S. Pat. No. 5,949,948 to Krause et al., 7 pages.
Exhibit A14 to AT&T's and Microsoft Corporation's Invalidity Contentions: Claim Chart of U.S. Pat. No. 6,233,389 in view of U.S. Pat. No. 6,018612, and further in view of U.S. Pat. No. 5,477,263 and U.S. Pat. No. 6,169,843, 11 pages.
Exhibit A15 to AT&T's and Microsoft Corporation's Invalidity Contentions: Claim Chart of U.S. Pat. No. 6,233,389 in view of "StreamObjects: Dynamically-Segmented Scalable Media Over the Internet" by Steven Niemczyk, 17 pages.
Exhibit A16 to AT&T's and Microsoft Corporation's Invalidity Contentions: Claim Chart of U.S. Pat. No. 6,233,389 in view of "A Programming System for the Dynamic Manipulation of Temporally Sensitive Data" by Christopher J. Lindblad, 16 pages.
Exhibit A17 to AT&T's and Microsoft Corporation's Invalidity Contentions: Claim Chart of U.S. Pat. No. 6,233,389 in view of "An Architecture for Networked Multimedia" by Jonathan C. Soo, 12 pages.
Exhibit A18 to AT&T's and Microsoft Corporation's Invalidity Contentions: Claim Chart of U.S. Pat. No. 6,233,389 in view of "Design of a Storage and Retrieval Model for Multimedia Data" by Ruihong Wang, 11 pages.
Exhibit A19 to AT&T's and Microsoft Corporation's Invalidity Contentions: Claim Chart of U.S. Pat. No. 6,233,389 in view of U.S. Pat. No. 6,304,714 to Krause et al., 7 pages.
Exhibit A20 to AT&T's and Microsoft Corporation's Invalidity Contentions: Claim Chart of U.S. Pat. No. 6,233,389 in view of U.S. Pat. No. 5,990,881, 6 pages.
Exhibit A21 to AT&T's and Microsoft Corporation's Invalidity Contentions: Claim Chart of U.S. Pat. No. 6,233,389 in view of U.S. Pat. No. 5,898,695, 6 pages.
Exhibit A22 to AT&T's and Microsoft Corporation's Invalidity Contentions: Claim Chart of U.S. Pat. No. 6,233,389 in view of "Developing Object-Oriented Multimedia Software" by Phillip Ackermann, 9 pages.
Exhibit A23 to AT&T's and Microsoft Corporation's Invalidity Contentions: Claim Chart of U.S. Pat. No. 6,233,389 in view of U.S. DISHplayer 7100 System and U.S. Pat. No. 6,490,000, 21 pages.
Fuji et al., "Implementation of MPEG Transport Demultiplexer with a RISC-Based Microcontroller", IEEE, 1996.
Fung, Chi-Leung et al., "MOCS: an Object-Oriented Programming Model for Multimedia Object Communication and Synchronization", Department of Computer Science, The Hong Kong University of Science and Technology, Clear Water Bay, Kowloon, Hong Kong, 1994 IEEE.
Gibbs, Simon, "Composite Multimedia and Active Objects", Centre Universitaire d'informatique, Universitède Genève, Proc. OOPSLA '91.
Guide to VAX/VMS File Applications, Software Version VAX/VMS Version 4.0, Sep. 1984 (19 pgs).
H. Zhang et al., Video parsing, retrieval and browsing: an integrated and content-based solution, ACM Multimedia 95-Electronic Proceedings (Nov. 5-9, 1995, San Francisco, CA.
Hanjalic et al., "Automation of systems enabling search on stored video data," SPIE/IS&T Electronic Imaging '97, vol. 3022, pp. 427-438, Jan. 15, 1997.
Hanna, C. et al. "Demultiplexer IC for MPEG2 Transport Streams" IEEE Transactions on Consumer Electronics, vol. 41, No. 3, Aug. 1995, pp. 699-706.
Harrick M. Vin, et al., Designing A Multiuser HDTV Storage Server, IEEE Journal, vol. 11, No. 1, Jan. 1993 (pp. 153-164).

(56) References Cited

OTHER PUBLICATIONS

Hewlett Packard Laboratories Technical Report entitled "UNIX Disk Access Patterns", by Chris Ruemmler and John Wildes, HPL-92-152, dated Dec. 1992 (pp. 405-420), Hewlett-Packard Company, 1992.
Hewlett Packard® MPEGscope Startup Guide, Hewlett Packard Company © 1997-2000 (39 pgs).
Hewlett Packard® MPEGscope User's Guide, Hewlett Packard Company© 1997-2000 (282 pgs).
Hugh M. Sierra, "An Introduction to Direct Access Storage Devices", © 1990 by Academic Press, Inc., (269 pgs).
Freedman, et al., "Systems Aspects of COBE Science Data Compression", Cosmology Data Analysis Center, (pp. 85-97).
Inside MacIntosh "Files", Apple Technology Library by Apple Computer, Inc., © 1992 (published by Addison-Wesley Publishing Company) 532 pgs.
Inside MacIntosh "Memory", Apple Technology Library by Apple Computer, Inc., © 1992 (published by Addison-Wesley Publishing Company) 303 pgs.
Inside MacIntosh "Overview", Apple Technology Library by Apple Computer, Inc., © 1992 (published by Addison-Wesley Publishing Company) 251 pgs.
Inside MacIntosh "QuickTime Components", Apple Technology Library by Apple Computer, Inc., ©1993 (published by Addison-Wesley Publishing Company) 828 pgs.
Inside MacIntosh "QuickTime", Apple Technology Library by Apple Computer, Inc., © 1993 (published by Addison-Wesley Publishing Company) 719 pgs.
Intellectual Property Library, "*Sitrick*vs. *Dreamworks LLC*", (CAFC) 85 USPQ2d, 1826, revised Feb. 5, 2008, 9 pages.
International Standard ISO/IEC 11171-3:1993/Cor.1:1996(E), (Part 3: Audio), Downloaded Jun. 15, 2005 (159 pgs).
International Standard ISO/IEC 11172 (MPEG-1 Standard, Part 1: Systems).
International Standard ISO/IEC 11172-2:1993(E), (Part 2: Video), Downloaded Jun. 15, 2005 (136 pgs).
International Standard ISO/IEC 13818-1:2000(E) "Information Technology — Generic Coding of Moving Pictures and Associated Audio Information: Systems", © ISO/IEC 2000, Downloaded Jun. 30, 2005 (173 pgs).
International Standard ISO/IEC 13818-1:2000/Amd.2:2004(E) "Information Technology —Generic Coding of Moving Pictures and Associated Audio Information: Systems", Amendment 2: Support of Ipmp on Mpeg-2 Systems, © ISO/IEC 2004, Downloaded Jun. 30, 2005 (13 pgs).
International Standard ISO/IEC 13818-2:2000(E) "Information Technology — Generic Coding of Moving Pictures and Associated Audio Information: Video", © ISO/IEC 2000, Downloaded Jun. 30, 2005 (219 pgs).
International Standard ISO/IEC 13818-3:1998(E) "Information Technology — Generic Coding of Moving Pictures and Associated Audio Information: Audio", © ISO/IEC 1998 (125 pgs).
J. Meng et al., CVEPS-A Compressed Video Editing and Parsing System, ACM Multimedia '96, Boston MA, pp. 43-53 (ACM 0-89791-671-1/96/1).
J.M.Harker Et Al., "A Quarter Century of Disk File Innovation," IBM J. Res. Develop., vol. 25, No. 5, Sep. 1981, pp. 677-690.
Jim Stratigos et al., Media4 Press Release "Announces Multimedia Satellite Network for Personal Computers", Microsoft® and Windows® 95 (3 pgs).
Jim Stratigos et al., Media4 Press Release "Announces Reseller Agreement with AlphaStar Television Networks", Microsoft® and Windows® 95 (3 pgs).
K. Shen et al., A Fast Algorithm for Video Parsing Using MPEG Compressed Sequences, IEEE, pp. 252-255 (0-8185-7310-9/626/1995).
Kurioka, Tatsuya et al. "Television Homer Server for Integrated Services — Toward the Realization of ISDB 'Anytime' Services-" NHK Science and Technical Research Laboratories, Tokyo, Japan, Proceedings ISCE '97, IEEE International Symposium on consumer Electronics, pp. 250-253.
Leek, Matthew R., et al., "MPEG Q&A (Moving Pictures Expert Group Digital Video Compression Standard"), CD-ROM Professional, v7, n4, p41, Jul.-Aug. 1994.
Lindblad, Christopher "A Programming System for the Dynamic Manipulation of Temporally Sensitive Data" MIT Laboratory for Computer Science, Aug. 1994, 275 pages.
Linden, Brian et al. "Oracle Video Server™: Introducing Oracle Video Server" release 3.0, Feb. 1998, part No. A53956-02, 78 pages.
Loronix CCTVware Enterprise Product Brochure, 2 pages.
Loronix CCTVware Solo Product Brochure, 2 pages.
M. Hausdorfer, "Symposium Record Broadcast Sessions", HDTV Production: Today and Tomorrow, Jun. 17, 1989, (7 pgs).
Macweek News article entitled "Quick Time Ready for Prime Time", dated Dec. 10, 1991 (2 pages).
Mayer-Patel, Ketan et al., "Synchronized Continuous Media Playback Through the World Wide Web", U.C. Berkeley, Computer Science Division, Berkeley Multimedia Research Center, Published:1996, Berkeley, CA.
McKendrick, Martin "Adding Video to Applications with the Oracle Video Server" an Oracle White Paper, Mar. 1998, 30 pages.
McLarnon, Zed et al., "Digital Image Meets Digital Audio; Sync Problems Faced by Multimedia Producer Now", Advanced Imaging, v9, n1, p62, Jan. 1994.
Media Stream, "Satellite Receiver" Installation and Users Guide for Windows 95, Media4, Inc., © 1996 (33 pgs).
MediaStream by Media4, "Desktop Satellite Multimedia", "The MediaStream Receiver Card", "MediaStream Uplink System", by Media4, Inc. (2 pgs).
Minneman, Scott L. et al. "Where Were We: making and using near-synchronous, pre-narrative video" International Multimedia Conference, Proceedings of the first ACM International Conference on Multimedia 1993, pp. 207-214, (9 pages).
Nelson, Lee J. "The Latest in Compression Hardware & Software (Product Survey)", Advanced Imaging, v9, n1, p56, Jan. 1995.
Niemczyk, Steven "StreamObjects: Dynamically-Segmented Scalable Media Over the Internet" submitted to the Department of Electrical Engineering and Computer Science, Massachusetts Institute of Technology, May 27, 1996, 90 pages.
Non-final Office Action in Reexamination Proceeding, U.S. Pat. No. 6,233,389, Control No. 90/009,329, dated Aug. 3, 2009.
OEM Interface Specifications for DSAA-3xxx, 3.5-Inch Hard Disk Drive with ATA Interface, IBM Corporation, © 1994 (65 pgs).
Oracle Corporation "Oracle Video Server™: Installation Guide" Release 3.0 for Sun SPARC Solaris 2.x, Feb. 1998, part No. A59554-01, 82 pages.
Oracle Corporation "Oracle Video Server™: Release Notes" Realease 3.0.4 for Sun Sparc Solaris 2.x. May 1998, part No. A53951-03, 34 pages.
Oracle Corporation "Video-Enhanced Web Services: Delivering Interactive Television and Switched Video Broadcast Services" an Oracle, DIGITAL, Ericsson and Acorn White Paper, Mar. 1998, 11 pages.
Order Granting Request for Ex Parte Reexamination, U.S. Pat. No. 6,233,389, Control No. 90/009,329, dated Jan. 7, 2009.
Petition of Patent Owner to Temporarily Suspend Ex Parte Reexamination Proceeding, U.S. Pat. No. 6,233,389, Control No. 90/009,329, filed May 27, 2009.
Petition of Patent Owner to Vacate Order Granting Second Reexamination Request, U.S. Pat. No. 6,233,389, Control No. 90/009,329, filed May 27, 2009.
Peuker, Thomas, "An Object-Oriented Architecture for the Real-Time Transmission of Multimedia Data Streams", Institute for Mathematische Maschinen und Datenverarbeitung (Informatik) IV, Lehrstul für Betriebssyteme Universität Erlangen-NOrnberg, Erlangen, Mar. 17, 1997.

(56) References Cited

OTHER PUBLICATIONS

Phillip Ackermann, excerpts including: the cover, pp. 66-69 and pp. 190-193 from the book entitled "Developing Object-Oriented Multimedia Software" copyright 1996 by dpunkt, 5 pages.
Pugh, Jon "VideoSpigot Review" article originally appeared in TidBITS on Apr. 20,1992 at 12:00 p.m., the permanent URL for the article is: http://db.tidbits.com/article/3120, 3 pages.
Quantum 2000 Series Low-Cost 8' Fixed Disk Drives, "New DC Motor Option", Quantum Corporation (2 pgs).
Quantum Fireball 640/1280S Product Manual, Quantum®, Copyright @ 1995 by Quantum Corporation (190 pgs).
Quantum Q2080 Low-Cost, 85 Megabyte Fixed Disk Drive, "85 Mb capacity/40ms average access time", Quantum Corporation, © 1982 (2 pgs).
Quantum Q500 Series High Capacity 5 1/4 Fixed Disk Drive, Quantum Corporation, @ 1983 (2 pgs).
Johnston, et al., "A Digital Television Sequence Store", IEEE, (pp. 594-600) @ 1978.
Ramanathan et al., "Toward personalized multimedia dial-up services," Computer Networks and ISDN Systems Jul. 26, 1994, No. 10, Amsterdam NL.
Rosen, Daryl "Oracle Video Server System Technical Overview" An Oracle White Paper, Mar. 1998, 15 pages.
S. Berson, "Computer Science Department Technical Report", Staggered Striping in Multimedia Information System, Dec. 1993, Apr. 29, 1994, (24 pgs).
S. Berson, et al., "Design of a Scalable Multimedia Storage Manager", (pp. 1-30).
S. Smollar et al., Content-based Video Indexing and Retrieval, IEEE, Summer 1994, pp. 62-72.
SCSI Specification, 0663 and 0663 Enhanced Disk Drive, Release 4.0, (247 pgs).
Soo, Jonathan C. "An Architecture for Networked Multimedia" submitted to the Department of Electrical Engineering and Computer Science, Massachusetts Institute of Technology, May 30, 1995, 49 pages.
Tektronix PDR 100 Profile™ Video Disk Recorder 070-9042-02, User Manual, First printing: Feb. 1995, Revised: Aug. 1995, 156 pages.
U.S. Court of Appeals for the Federal Circuit, *TiVo Inc.*v. *Echostar*Communications Corp. et al., Decision, Case No. 2006-1574, Decided: Jan. 31, 2008.
U.S. District Court for the Eastern District of Texas, Marshall Division, AT&T's and Microsoft Corporation's Invalidity Contentions, *TiVo Inc.*vs. *At&T Inc.*and Microsoft Corporation, Case No. 2:09-CV-259-DF, 44 pages, May 21, 2010.
U.S. District Court for the Eastern District of Texas, Marshall Division, Complaint for Patent Infringement and Jury Demand, *Tivo Inc.*v. *AT&T Inc.*, Case No. 2:09-cv-259, Aug. 26, 2009.
U.S. District Court for the Eastern District of Texas, Marshall Division, Complaint for Patent Infringement and Jury Demand, *Tivo Inc.*v. *Verizon Communications, Inc.*, Case No. 2:09-cv-257, Aug. 26, 2009.
U.S. District Court for the Eastern District of Texas, Marshall Division, Claim Construction Order, *Tivo Inc.*v. *Echostar Communications Corp. et al.*, Case No. 2:04-CV-1-DF, Aug. 18, 2005.
U.S. District Court for the Eastern District of Texas, Marshall Division, Final Judgment and Permanent Injunction, *Tivo Inc.*v. *Echostar Communications Corp. et al.*, Case No. 2:04-Cv-1-Df, Aug. 17, 2006.
U.S. District Court for the Eastern District of Texas, Marshall Division, Amended Final Judgment and Permanent Injunction, *Tivo Inc.*v. *Echostar Communications Corp. et al.*, Case No. 2:04-CV-1-DF, Jun. 2, 2009.
U.S. District Court for the Eastern District of Texas, Marshall Division, Memorandum Opinion, *Tivo Inc.*v. *Echostar Communications Corp. et al.*, Case No. 2:04-CV-1-DF, Jun. 2, 2009.

U.S. District Court in the Eastern District of Texas, Marshall Division, Verizon Service Corp. And Verizon Corporation Resources Group LLC, Invalidity Contentions, *TiVo Inc.*v. *Verizon Communications, Inc.*, Case No. 2:09-cv-257, 44 pages.
U.S. Patent and Trademark Office, Ex Parte Reexamination Certificate, U.S. Pat. No. 6,233,389, C1, issued Nov. 11, 2008.
U.S. Patent and Trademark Office, Ex Parte Reexamination Communication Transmittal Form, Notice of Intent to Issue Reexamination Certificate, dated Nov. 28, 2007.
Wang, Ruihong "Design of a Storage and Retrieval Model for Multimedia Data" Thesis, submitted to the School of Graduate Studies and Research, Ottawa-Carleton Institute of Electrical Engineering, 1994, 116 pages.
Winston Hodge, et al., "Chapter 7, *True Video on Demand*vs. *Near Video on Demand*", delivered at National Cable Television Conference, May 24, 1994 (pp. 103-120).
United States Patent and Trademark Office, U.S. Appl. No. 11/051,347, Non-Final Office Action dated May 25, 2016.
United States Patent and Trademark Office, U.S. Appl. No. 14/630,610, Non-Final Office Action dated Jun. 10, 2016.
United States Patent and Trademark Office, U.S. Appl. No. 14/029,679, Notice of Allowance dated Nov. 7, 2016.
United States Patent and Trademark Office, U.S. Appl. No. 14/681,079, Notice of Allowance dated Jul. 29, 2016.
United States Patent and Trademark Office, U.S. Appl. No. 14/630,610, Notice of Allowance dated Oct. 11, 2016.
European Patent Office, Application No. 07021583.5, Pending Claims as ofJun. 20, 2016.
European Patent Office, Application No. 07021583.5, Summons to Oral Proceedings dated Jun. 20, 2016.
Adam et al., Experience with the VuNet: A Network Architecture for a Distributed Multimedia System, 1994.
Alexandrou et al., Multimedia Data Exchange Agent an Object Behavioral Pattern Multimedia Programming, 1997.
Almeroth et al., On the Use of Multicast Delivery to Provide Scalable and Interactive Video-on-Demand Service, Jan. 1996.
Almeroth et al., The Interactive Multimedia Jukebox (IMJ): A New Paradigm for On-Demand Delivery of Audio/Video, Feb. 1998.
Anderson et al., A File System for Continuous Media, Nov. 1992.
Anderson et al., Support for Continuous Media in the Dash System, Oct. 1989.
Asthana et al., Kaleido: A System for Dynamic Composition and Processing of Multimedia Flows, 1996.
Bacher et al., Content-based Indexing of Captioned Video on the ViewStation, Oct. 1995.
Bescós et al., From Multimedia Stream Models to GUI Generation, Mar. 1997.
Bove et al., Cheops: A Reconfigurable Data-Flow System for Video Processing, Apr. 1995.
Carter, ICs for Next Generation Set-top Boxes, 1997.
C-Cube Microsystems, AViA-DMX MPEG-2 Transport Demultiplexer AViA-GTX Graphics Transport I/O User's Manual, 1996.
C-Cube Microsystems, CL9100 Multimode Video Decoder User's Manual, Oct. 1994.
Chan, A Mobile System for Distributed Multimedia Applications, May 1996.
Chaterjee et al., Microsoft DirectShow: A New Media Architecture, Dec. 1997.
Clark et al., Aurora at MIT Final Report on MIT's Participation in the Aurora Gigabit Testbed, 1995.
Cline et al., DirectShowTM RTP Support for Adaptivity in Networked Multimedia Applications, 1998.
Coelho et al., DirectX®, RDX, RSX, and MMXTM Technology, Dec. 1997.
Coulson et al., Micro-kernel support for continuous media in distributed systems, Sep. 1994.
Crothers et al., Microoft Touts Need for Multimedia Bus, Mar. 1995.
Demura et al., A Single-Chip MPEG2 Video Decoder LSI, Feb. 1994.
Dutta, Architecture and Design of NX-2700: A Programmable Single-Chip HDTV All-Format-Decode-and-Display Processor, Apr. 2001.
Electronic News, Toshiba Readies One-Chip Decoder, Nov. 1996.

(56) References Cited

OTHER PUBLICATIONS

Ennis, Open Digital Media Solutions Using Windows NT, Sep. 1996.
ESS Technology, Inc., ES3301 A/V Transport Demultiplexer, Descrambler Product Brief, 1998.
ESS Technology, Inc., ESS3308 MPEG2 Audio Video Decoder Product Brief, 1998.
Gass, Architecture Trends of MPEG Decoders for Set-Top Box, Jan. 1997.
Gibbs et al., Audio Video Databases: An Object-Oriented Approach.
Hawes, The Design of an IVDS World Wide Web Browser Architecture, Dec. 1997.
Jeffay et al., Kernel support for live digital audio and video, 1992.
Kageyama et al., A Free Time Shift DVD Video Recorder, Aug. 1997.
Lee et al., Applying Multimedia to Medical Imaging, Apr. 1996.
Lee et al., MediaStation 5000: Integration Video and Audio, 1994.
Legault et al., Professional Video Under 32-Bit Windows Operating Systems, Dec. 1996.
Lindblad et al., the VuSystem: A Programming System for Computer-Intensive Multimedia, 1996.
LSI Logic, L64005 Enhanced MPEG-2 AudioNideo Decoder Technical Manual, May 1998.
LSI Logic, L64007 MPEG-2, DVB, JSAT Transport Demultiplexer Technical Manual, Jan. 1997.
LSI Logic, L64704 Satellite Decoder Technical Manual, May 1997.
Miller et al., An Integrated Input/Output System for Kernel Data Streaming, Jan. 1998.
Neuman et al., How to reduce memory in DVD systems, Aug. 1997.
Nguyen et al., Establish MSP as the Standard for Media Processing, Jul. 1996.
Owen et al., An Enhanced DSP Architecture for the Seven Multimedia Functions: The Mpact 2 Media Processor, May 1997.
Parsons, Digital video architecture for OS/2 2.1, Feb. 1994.
Philips, Tri-Media TM-1100 Programmable Media Processor, 1998.
PR Newswire, Samsung, Sanyo and Toshiba Select Teralogic's TL750 Processor for Enhanced Digital Set-Top Boxes, Nov. 1998.
Purcell, The Mpact 2 VLIW Media Processor Improves Multimedia Performance in PCs, Mar. 1998.
Ramakrishnan et al., Operating System Support for a Video-On-Demand File Service, Nov. 1993.
Rangan et al., Designing File Systems for Digital Video and Audio, Oct. 1991.
Ranthnam et al., An Architectural Overview Programmable Multimedia Processor, TM-1, 1996.
Ranthnam et al., Processing the New World of Inter Media, Mar. 1998.
ReplayTV, ReplayTV 4000 Series User Guide, 2001.
Rothermel et al., An adaptive protocol for synchronizing media streams, Sep. 1997.
Rowe et al., MPEG Video in Software: Representation, Transmission, and Playback, Feb. 1994.
Santoni, PC 98 spec pushes CPU speeds, moves away from ISA bus, Apr. 1997.
Sato et al., A Unified Hybrid Recorder: Combining Hard Disk Drives, Betacam SX, and Analog Betacam, 1996.
ST Microelectronics, SGS-Thomson Launches STi5500, After Delivering 10 Millionth MPEG Decoder, Apr. 1997.
ST Microelectronics, STi5500 Set Top Box / DVD Backend Decoder with Integrated Host Processor, Oct. 1998.
Texas Instruments, TMS320AV7110 Integrated Digital Set-top Box Decoder Functional Specification, Jul. 1998.
Toshiba, TC81220F MPEG2 Video Audio Decoder, Transport Stream Processor RISC 32-bit MIPS System CPU, 1998.
Watlington et al, Stream-Based Computing and Future Television, Apr. 1997.
Wetherall, an Interactive Programming System for Media Computation, Sep. 1994.
Wilson, DTV makes its big entrance, Feb. 1998.
Wolf, Resource Management for Distributed Multimedia Systems, 1996.
Yamada et al., A Flexible MPEG2 Decoder LSI with a Special Transport Stream RISC Processor, 1998.
Yoshida, Toshiba chip handles DVD, Nov. 1996.
*TiVo Inc.v. Cisco Systems, Inc.*in the U.S. District Court for the Eastern District of Texas under Case No. 2:11-cv-311 terminated U.S. Pat. No. 6,233,389 U.S. Pat. No. 7,529,465.
Complaint for Patent Infringement and Jury Demand dated Jun. 4, 2012, *TiVo Inc.v. Cisco Systems, Inc.* in the U.S. District Court of the Eastern District of Texas under Case No. 2:11-cv-311.
3:12-cv-02766-RS, *Cisco Systems, Inc.v. TiVo Inc.*, (1) Complaint for Declaratory Judgment filed May 30, 2012.
3:12-cv-02766-RS, *Cisco Systems, Inc.v. TiVo Inc.*, (30) Transcript of Proceedings filed Jul. 31, 2012.
2:12-cv-00434-JRG, *Cisco Systems, Inc.v. TiVo Inc.*, (1) Complaint for Declaratory Judgement filed May 30, 2012.
2:12-cv-00434-JRG, *Cisco Systems, Inc.v. TiVo Inc.*, (21) TiVo Inc.'s Notice of Motion and Motion to Dimiss or Transfer filed Jun. 21, 2012.
2:12-cv-00434-JRG, *Cisco Systems, Inc.v. TiVo Inc.*, (22) TiVo's Answer to Complaint for Declaratory Judgment filed Jun. 21, 2012.
2:12-cv-00311-JRG, *TiVo Inc.v. Cisco Systems, Inc.*, (1) Complaint for Patent Infringement and Jury Demand filed Jun. 4, 2012.
2:12-cv-00311-JRG, *TiVo Inc.v. Cisco Systems, Inc.*, (15) Cisco Systems, Inc.'s Answer to Complaint for Patent Infringement filed Jun. 29, 2012.
2:12-cv-00311-JRG, *TiVo Inc.v. Cisco Systems, Inc.*, (68) Defendant Cisco Systems, Inc.'s Motion for Leave to File Amended Answer and Counerclaims and Request for Expedited Briefing filed Apr. 23, 2013.
2:12-cv-00311-JRG, *TiVo Inc.v. Cisco Systems, Inc.*, (69) Defendant Cisco Systems, Inc.'s First Amended Answer, Affirmative Defenses and Counterclaims filed Apr. 23, 2013.
2:09-CV-00257-TJW, *TiVo Inc., v. Verizon Communications, Inc.*, (18) First Amended Complaint for Patent Infringement and Jury Demand filed Feb. 2, 2010.
2:09-CV-00257-TJW, *TiVo Inc., v. Verizon Communications, Inc.*, (48) TiVo Inc.'s Answer and Reply to Verizon's First Amended Counterclaims filed Mar. 30, 2010.
2:09-CV-00257-TJW, *TiVo Inc., v. Verizon Communications, Inc.*, (62) Amended Answer to First Amended Complaint and First Amended Counterclaims filed Apr. 13, 2010.
2:09-CV-00257-TJW, *TiVo Inc., v. Verizon Communications, Inc.*, (67) TiVo Inc.'s Answer and Reply to Verizon's First Amended Counterclaims filed Apr. 16, 2010.
2:09-CV-00257-TJW, *TiVo Inc., v. Verizon Communications, Inc.*, (73) Answer to TiVo's Counterclaims filed Apr. 26, 2010.
2:09-CV-00257-TJW, *TiVo Inc., v. Verizon Communications, Inc.*, (81) TiVo's Opposition to Verizon's Motion to Dismiss amd Strike TiVo's Claims for Inequitable Conduct filed May 13, 2010.
2:09-CV-00257-TJW, *TiVo Inc., v. Verizon Communications, Inc.*, (90) Defendants' Reply in Support of their Motion to Dismiss and Strike TiVo's Inequitable Conduct filed May 24, 2010.
2:09-CV-00257-TJW, *TiVo Inc., v. Verizon Communications, Inc.*, (92) TiVo's Sur-Reply to Verizon's Motion to Dismiss and Strike TiVo's Claims for Inequitable Conduct filed Jun. 4, 2010.
2:09-CV-00257-TJW, *TiVo Inc., v. Verizon Communications, Inc.*, (116) Order filed Oct. 28, 2010.
2:09-CV-00257-TJW, *TiVo Inc., v. Verizon Communications, Inc.*, (124) Defendants' Motion to Dimiss and Strike TiVo's Amended Claims for Inequitable Conduct filed Dec. 20, 2010.
2:09-CV-00257-TJW, *TiVo Inc., v. Verizon Communications, Inc.*, (125) Answer to TiVo's First Amended Counterclaims filed Dec. 20, 2010.
2:09-CV-00257-TJW, *TiVo Inc., v. Verizon Communications, Inc.*, (126) Order Granting Unopposed Motion for Entry of Joint Stipulation Regarding Discoverable Information Withheld for Privileged filed Dec. 27, 2010.
2:09-CV-00257-TJW, *TiVo Inc., v. Verizon Communications, Inc.*, (134) TiVo's Sur-Reply to Defendant's Motion to Dismiss and Strike TiVo's Amended Claims for Inequitable Conduct filed Jan. 28, 2011.

(56) References Cited

OTHER PUBLICATIONS

2:09-CV-00257-TJW, *TiVo Inc.*, v. *Verizon Communications, Inc.*, (138) Defendants' Opening Claim Construction Brief filed Feb. 17, 2011.
2:09-CV-00257-TJW, *TiVo Inc.*, v. *Verizon Communications, Inc.*, (162) Notice of Relevant Decision filed Apr. 19, 2011.
2:09-CV-00257-TJW, *TiVo Inc.*, v. *Verizon Communications, Inc.*, (187) Transcript of Tutorial and Claim Construction Hearing Before the Honorable Chief Judge Folsom filed Jun. 22, 2011.
2:09-CV-00257-TJW, *TiVo Inc.*, v. *Verizon Communications, Inc.*, (188) Transcript of Tutorial and Claim Construction Hearing filed Jun. 22, 2011.
2:09-CV-00257-TJW, *TiVo Inc.*, v. *Verizon Communications, Inc.*, (189) Notice of Relevant Decision Regardong Claim Construction for Verizon's Patents filed Jun. 27, 2011 (2 parts).
2:09-CV-00257-TJW, *TiVo Inc.*, v. *Verizon Communications, Inc.*, (191) TiVo Inc.'s Answer and Reply to Verizon's Construction Claims filed Jul. 5, 2011 (2 parts).
2:09-CV-00257-TJW, *TiVo Inc.*, v. *Verizon Communications, Inc.*, (192) TiVo's Motion for Judgment on the Pleadings Under Rules 12(c) filed Jul. 5, 2011.
2:09-CV-00257-TJW, *TiVo Inc.*, v. *Verizon Communications, Inc.*, (198) Answer to TiVo's Amended Counterclaims filed Jul. 18, 2011.
2:09-CV-00257-TJW, *TiVo Inc.*, v. *Verizon Communications, Inc.*, (201) Memorandum in Opposition to Plaintiff TiVo Inc.'s Motion for Judgment on the Pleadings Under Rule 12(c) filed Jul. 22, 2011 (3 parts).
2:09-CV-00257-TJW, *TiVo Inc.*, v. *Verizon Communications, Inc.*, (209) TiVo's Reply in support of its Motion for Summary Judgment on Pleadings filed Aug. 1, 2011.
2:09-CV-00257-TJW, *TiVo Inc.*, v. *Verizon Communications, Inc.*, (211) Notice of Relevant Decision Regarding TiVo's Motion for Judgment on the Pleadings filed Aug. 3, 2011.
2:09-CV-00257-TJW, *TiVo Inc.*, v. *Verizon Communications, Inc.*, (254) TiVo's Notice of Reduction in the No. Of Claim Terms for Construction in the Verizon Counterclaim Patents filed Feb. 7, 2012.
2:09-CV-00257-TJW, *TiVo Inc.*, v. *Verizon Communications, Inc.*, (268) Claim Construction Order filed Mar. 12, 2012.
2:09-CV-00257-TJW, *TiVo Inc.*, v. *Verizon Communications, Inc.*, (299) TiVo Inc.'s Motion to Strike Verizon's Untimely Amended Invalidity Contentions filed Jun. 8, 2012.
2:09-CV-00257-TJW, *TiVo Inc.*, v. *Verizon Communications, Inc.*, (303) Non-Party Cisco Systems, Inc.'s Motion to Intervene for the Purpose of Moving to Stay TiVo's Claims Against Cisco's Products filed Jun. 12, 2012.
2:09-CV-00257-TJW, *TiVo Inc.*, v. *Verizon Communications, Inc.*, (304) Non-Party Cisco Systems, Inc.'s Motion to Stay TiVo's Claims Against Cisco's Products filed Jun. 12, 2012.
2:09-CV-00257-TJW, *TiVo Inc.*, v. *Verizon Communications, Inc.*, (346) TiVo's Opposition to Verizon's Motion for Reconsideration of Order Granting TiVo Leave to Amend Infringement Contentions filed Jul. 12, 2012.
2:09-CV-00257-TJW, *TiVo Inc.*, v. *Verizon Communications, Inc.*, (426) Verizon's Motion to Exclude the Testimony of Joel Steckel filed Sep. 14, 2012.
2:09-CV-00257-TJW, *TiVo Inc.*, v. *Verizon Communications, Inc.*, (430) Verizon's Motion for Partial Summary Judgment on the Priority Date of TiVo's U.S. Pat. No. 7,493,015 filed Sep. 17, 2012.
2:09-CV-00257-TJW, *TiVo Inc.*, v. *Verizon Communications, Inc.*, (440) Stipluation and Joint Motion to Dismiss filed Sep. 28, 2012.
2:09-CV-00257-TJW, *TiVo Inc.*, v. *Verizon Communications, Inc.*, (441) Consent Judgment filed Sep. 28, 2012.
2:09-cv-00259 *TiVo Inc.*v. *AT&T Inc.*, (1) Complaint for Patent Infringement and Jury Demand filed Aug. 26, 2009.
2:09-cv-00259 *TiVo Inc.*v. *AT&T Inc.*, (19) At&T Inc.'s Answer to Plaintiffs Complaint and Jury Demand filed Oct. 21, 2009.
2:09-cv-00259 *TiVo Inc.*v. *AT&T Inc.*, (22) Microsoft Corporation's Motion to Intervene filed Jan. 15, 2010.
2:09-cv-00259 *TiVo Inc.*v. *AT&T Inc.*, (23) Microsoft Corporation's Complaint Intervention filed Jan. 15, 2010.

2:09-cv-00259 *TiVo Inc.*v. *AT&T Inc.*, (41) Order — Granting Motion to Intervene Mar. 31, 2010.
2:09-cv-00259 *TiVo Inc.*v. *AT&T Inc.*, (50) Plaintiff TiVo Inc.'s Motion to Dismiss the Mediaroom and Unidentified Customer Claims from Microsoft's Complaint in Intervention filed Apr. 21, 2010.
2:09-cv-00259 *TiVo Inc.*v. *AT&T Inc.*, (51) TiVo Inc.'s Answer to Intervenor Microsoft Corporation Complaint in Intervention filed Apr. 21, 2010.
2:09-cv-00259 *TiVo Inc.*v. *AT&T Inc.*, (52) TiVo Inc.'s Answer to Intervenor Microsoft Corporation's Complaint in Intervention filed Apr. 22, 2010.
2:09-cv-00259 *TiVo Inc.*v. *AT&T Inc.*, (60) Microsoft's Opposition to TiVo's Partial Motion to Dismiss filed May 10, 2010.
2:09-cv-00259 *TiVo Inc.*v. *AT&T Inc.*, (70) At&T Operations, Inc.'s Motion to Intervene filed May 28, 2010.
2:09-cv-00259 *TiVo Inc.*v. *AT&T Inc.*, (71) Motion of Microsoft Corp., AT&T Inc., and Pending-Intervenor AT&T Operations, Inc. to Sever and Stay filed May 28, 2010.
2:09-cv-00259 *TiVo Inc.*v. *AT&T Inc.*, (72) Motion of Microsoft Corp., AT&T Inc., and Pending-Intervenor AT&T Operations, Inc. to Sever and Stay filed May 28, 2010.
2:09-cv-00259 *TiVo Inc.*v. *AT&T Inc.*, (75) Motion by Microsoft and AT&T Operations to Transfer Venue to the Northern District of California Upon Severance filed May 28, 2010.
2:09-cv-00259 *TiVo Inc.*v. *AT&T Inc.*, (102) Reply of Microsoft and AT&T Operations in Support of Motion to Transfer Venue Upon Severance filed Jul. 12, 2010.
2:09-cv-00259 *TiVo Inc.*v. *AT&T Inc.*, (109) TiVo's Sur-Reply in Opposition to AT&T Operations and Microsoft's Motion to Transfer Venue to the Northern District of California Upon Severance filed Jul. 22, 2010.
2:09-cv-00259 *TiVo Inc.*v. *AT&T Inc.*, (110) AT&T Operations, Inc.'s Answer to Plaintiff's first Amended Complaint and Jury Demand and Counterclaims filed Jul. 30, 2010.
2:09-cv-00259 *TiVo Inc.*v. *AT&T Inc.*, (111) AT&T Services, Inc.'s Answer to Plaintiff's Amended Complaint and Jury Demand and Counterclaims filed Jul. 30, 2010.
2:09-cv-00259 *TiVo Inc.*v. *AT&T Inc.*, (112) AT&T Video Service, Inc.'s Answer to Plaintiff's Amended Complaint and Jury Demand and Counterclaims filed Jul. 30, 2010.
2:09-cv-00259 *TiVo Inc.*v. *AT&T Inc.*, (113) SBC Internet Services, Inc.,'s Answer to Plaintiffi's First Amended Complaint and Jury Demand and Counterclaims filed Jul. 30, 2010.
2:09-cv-00259 *TiVo Inc.*v. *AT&T Inc.*, (126) Plaintiff TiVo Inc.,'s Answer to Defendant AT&T Operations, Inc.'s Counterclaims filed Aug. 23, 2010.
2:09-cv-00259 *TiVo Inc.*v. *AT&T Inc.*, (128) Plaintiff TiVo Inc,'s Answer to Defendant SBC Internet Services, Inc.'s Counterclaims filed Aug. 23, 2010.
2:09-cv-00259 *TiVo Inc.*v. *AT&T Inc.*, (135) Order Sep. 17, 2010.
2:09-cv-00259 *TiVo Inc.*v. *AT&T Inc.*, (137) AT&T Inc.'s Amended Answer to Plaintiff's First Amended Complaint and Jury Demand filed Oct. 15, 2010.
2:09-cv-00259 *TiVo Inc.*v. *AT&T Inc.*, (143) Plaintiff's TiVo Inc.'s Answer to Defendant AT&T Inc.'s Counterclaims filed Nov. 02, 2010.
2:09-cv-00259 *TiVo Inc.*v. *AT&T Inc.*, (145) PR4-3 Joint Claim Construction and Prehearing Statement filed Dec. 17, 2010.
2:09-cv-00259 *TiVo Inc.*v. *AT&T Inc.*, (151) Combined Responsive Claim Construction Brief by AT&T Defendants and Microsoft Corporation filed Feb. 14, 2011 (2 parts).
2:09-cv-00259 *TiVo Inc.*v. *AT&T Inc.*, (163) Notice of Joint claim Construction Chart filed Mar. 11, 2011.
2:09-cv-00259 *TiVo Inc.*v. *AT&T Inc.*, (187) Defendants' Unopposed Motion to Correct the Combined Responsive Claim Construction Brief and to Include the Corresponding Exhibits filed Jun. 3, 2011.
2:09-cv-00259 *TiVo Inc.*v. *AT&T Inc.*, (191) Transcript of Tutorial and Claim Construction Hearing Before the Honorable Chief Judge David Folsom filed Jun. 22, 2011.
2:09-cv-00259 *TiVo Inc.*v. *AT&T Inc.*, (210) Claim Construction Order filed Oct. 13, 2011.

(56) References Cited

OTHER PUBLICATIONS

2:09-cv-00259 *TiVo Inc.v. AT&T Inc.*, (244) AT&T's Motion for Leave to File Amended Answers to Plaintiff's Amended Complaint Dec. 9, 2011.
2:09-cv-00259 *TiVo Inc.v. AT&T Inc.*, (245) AT&T Inc.'s Second Amended Answers to Plaintiff's First Amended Complaint and Jury Demand Dec. 9, 2011.
2:09-cv-00259 *TiVo Inc.v. AT&T Inc.*, (246) Southwestern Bell Telephone Co.'s Second Amended Answer to Plaintiff's First Amended Complaint and Jury Demand filed Dec. 9, 2011.
2:09-cv-00259 *TiVo Inc.v. AT&T Inc.*, (247) AT&T Operations, Inc.'s First Amended Answer to Plaintiff's First Amended Complaint and Jury Demand and Counterclaims filed Dec. 9, 2011.
2:09-cv-00259 *TiVo Inc.v. AT&T Inc.*, (248) AT&T Services, Inc.'s First Amended Answer to Plaintiff's First Amended Complaint and Jury Demand and Counterclaims filed Dec. 9, 2011.
2:09-cv-00259 *TiVo Inc.v. AT&T Inc.*, (250) SBC Internet Services, Inc.'s First Amended Answer to Plaintiff's First Amended Complaint and Jury Demand and Counterclaims filed Dec. 9, 2011.
2:09-cv-00259 *TiVo Inc.v. AT&T Inc.*, (280) TiVo's Sur-Reply in Opposition to AT&T Defendants and Microsoft's Motion to Strike TiVo's Infringement Contentions filed Dec. 19, 2011.
2:09-cv-00259 *TiVo Inc.v. AT&T Inc.*, (281) TiVo's Sur-Reply in Opposition to AT&T Defendants and Microsoft's Motion to Strike TiVo's Infringement Contentions and TiVo's Reply in Support of TiVo's Motion to Supplement Infringement Contentions in Accordance with P.R. 3-6(b) filed Dec. 19, 2011.
2:09-cv-00259 *TiVo Inc.v. AT&T Inc.*, (287) Notice of Compliance with Court's Motion Practice Order filed Dec. 21, 2011.
2:09-cv-00259 *TiVo Inc.v. AT&T Inc.*, (290) TiVo's Notice of Compliance with court's Motion Practice Order filed Dec. 21, 2011.
2:09-cv-00259 *TiVo Inc.v. AT&T Inc.*, (304) Notice of Compliance with Court's Motion Practice filed Dec. 23, 2011.
2:09-cv-00259 *TiVo Inc.v. AT&T Inc.*, (316) AT&T and Microsoft Motion in Limine filed Dec. 27, 2011.
2:09-cv-00259 *TiVo Inc.v. AT&T Inc.*, (324) TiVo's Opposition to AT&T Defendants and Microsoft's Cross-Motion in the Alternative for Leave to Amend Invalidity Contentions Under P.R. 3-7(B) filed Dec. 27, 2011.
2:09-cv-00259 *TiVo Inc.v. AT&T Inc.*, (325) Plaintiff's TiVo's Inc.'s Brief Opposition to Defendant AT&T's Motion for Leave to File Amended Answer Asserting Intervening Rights filed Dec. 27, 2011.
Re-exam — 90/007750 — File Wrapper of Re-exam Application No. 90/007750 (156 parts).
Re-exam — 90/009329 File Wrapper of Re-exam Application No. 90/009329 (4 parts).
IPR2016-01524 No. 2 Petition for Inter Partes.
IPR2016-01524 No. 6 Order — Conduct of the Proceeding.
IPR2016-01524 No. 7 Conduct of the Proceeding.
IPR2016-01524 No. 8 Joint Motion to Dismiss Petition.
IPR2016-01524 Exh 1002 Prosecution History of 389 patent.
IPR2016-01524 Exh 1003 Strawn Declaration.
IPR2016-01524 Exh 1006 Sould Blaster Pro User Reference Manual (3 Parts).
IPR2016-01524 Exh 1007 Programmer Guide Microsoft Video for Windows Development Kit.
IPR2016-01524 Exh 1009 Concise Oxford Dictionary of Current English (1990).
IPR2016-01524 Exh 1010 Webster's New World Dictionary of Computer Terms (1998).
IPR2016-01524 Exh 1011 Claim Construction Order, *TiVo Inc.v. Echostar Comm Corp.*
IPR2016-01524 Exh 1012 Claim Construction Order *TiVo Inc.v. ATT.*
IPR2016-01524 Exh 1013 Claim Construction Order *TiVov. Verizon.*
IPR2016-01524 Exh 1014 Memo Opinion and Order *Motorolav. TiVo Inc..*
IPR2016-01524 Exh 1015 Preliminary Infringement Claim Chart U.S. Pat. No. 6233389.
IPR2016-01524 Exh 1018 Bescos Jesus et al From Multimedia Stream Models to GUI Generation.
IPR2016-01524 Exh 1019 Amazon com listing for Sound Blaster Pro User Reference Manual.
IPR2016-01524 Exh 1020 Musser John A Multimedia Glass Library for Windows Dr Bob Journal.
IPR2016-01524 Exh 1021 Adams Eric High Noon Big Players Ready for Video Showdown MacWeek.
IPR2016-01552 No. 2 Petition for Inter Parties Review.
IPR2016-01552 No. 6 Order — Conduct for the Proceeding.
IPR2016-01552 No. 7 Conduct of the Proceeding.
IPR2016-01552 No. 8 Joint Motion to Dismiss Petition.
IPR2016-01552 Exh 1002 File History of U.S. Pat. No. 7558472 (3 Parts).
IPR2016-01552 Exh 1003 Rodriguez Declaration (101 pages).
IPR2016-01552 Exh 1007 TiVo PR 4-2 Disclosures.
IPR2016-01552 Exh 1008 TiVos 4th Supp Response to Samsungs 1st Interrogatories.
IPR2016-01553 No. 2 Petition for inter Parties Review.
IPR2016-01553 No. 6 Order — Conduct for the Proceeding.
IPR2016-01553 No. 7 Conduct of the Proceeding.
IPR2016-01553 No. 8 Joint Motion to Dismiss Petition.
IPR2016-01553 Exh 1003 Rodriguez Declaration (131 pages).
IPR2016-01553 Exh 1005 File History of U.S. Provisional Application No. 60/226856.
IPR2016-01553 Exh 1010 IEEE Standard Dictory of electrical and Electronics Terms (Sixth Edition) 1996.
IPR2016-01553 Exh 1011 TiVos 4th Supp Objections and Responses to Samsung 1st Interrogatories filed Jul. 21, 2016.
IPR2016-01554 No. 2 Petition for inter Parties Review.
IPR2016-01554 No. 6 Order — Conduct for the Proceeding.
IPR2016-01554 No. 7 Conduct of the Proceeding.
IPR2016-01554 No. 8 Joint Motion to Dismiss Petition.
IPR2016-01554 Exh 1002 Fh 8457476 (12 Parts).
IPR2016-01554 Exh 1003 Rodriguez Declaration (91 pages).
IPR2016-01555 No. 2 Petition for inter Parties Review filed Aug. 2, 2016.
IPR2016-01555 No. 6 Order — Conduct for the Proceeding.
IPR2016-01555 No. 7 Conduct of the Proceeding.
IPR2016-01555 No. 8 Joint Motion to Dismiss Petition.
IPR2016-01555 No. 9 Joint Request to Treat Settlement Agreement.
IPR2016-01712 No. 2 Petition for Inter Partes.
IPR2016-01712 No. 6 Order — Conduct of the Proceeding.
IPR2016-01712 No. 7 Order — Conduct of the Proceeding.
IPR2016-01712 No. 8 Joint Motion to Dismiss Petition.
IPR2016-01712 No. 11 Termination Settlement Before Institution entered Jan. 10, 2017.
IPR2016-01712 Exh 1003 Declaration John Strawn.
IPR2016-01712 Exh 1004 Excerpts Microsoft Platform Software Development Kit (51 parts).
IPR2016-01712 Exh 1005 Disk Image Microsoft Developer Network Platform SDK.
IPR2016-01712 Exh 1007 Giant Stakes in Cable Cnet.
IPR2016-01712 Exh 1008 Microsoft Releases DirectShow SDK.
IPR2016-01712 Exh 1009 Declaration of Rohan Coelho Regarding Public Availability of Microsoft Platform SDK.
IPR2016-01712 Exh 1010 DirectX, RDX, RSX and MMX™ Technology (5 parts).
IPR2016-01712 Exh 1011 Claim Construction Order Aug. 18, 2005.
IPR2016-01712 Exh 1012 Claim Construction Order Oct. 13, 2011.
IPR2016-01712 Exh 1013 Claim Construction Order Mar. 12, 2012.
IPR2016-01712 Exh 1014 Memo Opinion Markman Order.
IPR2016-01712 Exh 1015 Preliminary Infringement Claim Set.
IPR2016-01712 Exh 1018 From Multimedia Stream Models to GUI generation.
IPR2016-01712 Exh 1019 Claim Chart.
IPR2016-01712 Exh 1020 Broadcast Enabled Computer Hardware Requirements.
IPR2016-01712 Exh 1021 Introduction Broadcast Architecture.
IPR2016-01712 Exh 1022 MSBDN Receiver Board Implementation.

(56) References Cited

OTHER PUBLICATIONS

IPR2016-01712 Exh 1023 Innovating Broadcasting Media.
2:04-cv-00001 *TiVo Inc.v. EchoStar Communications Corporation et al.*, (1) Complaint for Patent Infringement filed Jan. 5, 2004.
2:04-cv-00001 *TiVo Inc.v. EchoStar Communications Corporation et al.*, (18) Defendants Echostar Technologies Corporation and Echosphere Limited Liability Company's Answer to Amended Complaint for Patent Infringement and Counterclaims for Declaratory Relief of Invalidity, Non-Infringement and Unenforceability filed Mar. 4, 2004.
2:04-cv-00001 *TiVo Inc.v. EchoStar Communications Corporation et al.*, (19) Defendants' Motion to Dismiss and Transfer filed Mar. 1, 2004.
2:04-cv-00001 *TiVo Inc.v. EchoStar Communications Corporation et al.*, (20) Plaintiff Tivo Inc.'S Reply to Counterclaims filed Mar. 5, 2004.
2:04-cv-00001 *TiVo Inc.v. EchoStar Communications Corporation et al.*, (55) Echostar Technologies Corporation and Echosphere Limited Liability Company's Motion to Compel Interrogatory Response filed Mar. 2, 2005.
2:04-cv-00001 *TiVo Inc.v. EchoStar Communications Corporation et al.*, (57) Order on Defendants' Motion to Dismiss and Transfer filed Mar. 9, 2005.
2:04-cv-00001 *TiVo Inc.v. EchoStar Communications Corporation et al.*, (65) Defendants Echostar Communications Corporation and Echostar Dbs Corporation's Answer to Amended Complaint for Patent Infringement; Defendant Echostar Communications Corporation's Counterclaims for Declaratory Relief of Invalidity, Non-Infringement and Nenforceability filed Mar. 21, 2005.
2:04-cv-00001 *TiVo Inc.v. EchoStar Communications Corporation et al.*, (67) Reply Memorandum of Points and Authorities in Support of Echostar Echnologies Corporation's and Echosphere Limited Liability Company's Motion to Compel Interrogatory Response filed Mar. 23, 2005.
2:04-cv-00001 *TiVo Inc.v. EchoStar Communications Corporation et al.*, (70) Defendants' Opposition to Tivo's Motion to Compel Echostar's Production of Documents, Interrogatory Responses, and Attendance At Deposition filed Mar. 29, 2005.
2:04-cv-00001 *TiVo Inc.v. EchoStar Communications Corporation et al.*, (79) Echostar's Opening Claim Construction Brief filed Apr. 11, 2005.
2:04-cv-00001 *TiVo Inc.v. EchoStar Communications Corporation et al.*, (80) TiVo Inc.'s Opening Brief on Claim Construction filed Apr. 11, 2005.
2:04-cv-00001 *TiVo Inc.v. EchoStar Communications Corporation et al.*, (97) TiVo Inc.'s Opposition Brief on Claim Construction filed May 12, 2005.
2:04-Cv-00001 *TiVo Inc.v. EchoStar Communications Corporation et al.*, (103) TiVo's Opposition to Echostar's Expedited Motion to Continue May 23, 2005 Claim Construction Hearing filed May 18, 2005.
2:04-cv-00001 *TiVo Inc.v. EchoStar Communications Corporation et al.*, (114) Plaintiff Tivo Inc.'S Reply to Defendant Echostar Communications Corporation's First Amended Counterclaims for Declaratory Relief of Invalidity, Non-Infringement and Unenforceability filed Jun. 1, 2005.
2:04-cv-00001 *TiVo Inc.v. EchoStar Communications Corporation et al.*, (115) Plaintiff Tivo Inc.'S Reply to Defendants Echostar Technologies Corporation and Echosphere Limited Liability Company's First Amended Counterclaims for Declaratory Relief of Invalidity, Non-Infringement and Unenforceability filed Jun. 1, 2005.
2:04-cv-00001 *TiVo Inc.v. EchoStar Communications Corporation et al.*, (116) Markman Hearing filed Jun. 2, 2005.
2:04-cv-00001 *TiVo Inc.v. EchoStar Communications Corporation et al.*, (119) Pretrial Hearing filed Jun. 3, 2005.
2:04-cv-00001 *TiVo Inc.v. EchoStar Communications Corporation et al.*, (120) Joint Claim Construction Chart filed Jun. 7, 2005.

2:04-cv-00001 *TiVo Inc.v. EchoStar Communications Corporation et al.*, (136) Memorandum in Support of Motion for Partial Summary Judgment of Noninfringement: (1) No Infringement by Echostar's 7100/7200 Devices; and (2) No Infringement Under the Doctrine of Equivalents filed Jul. 15, 2005.
2:04-cv-00001 *TiVo Inc.v. EchoStar Communications Corporation et al.*, (149) TiVo Inc.'s Opposition to Echostar's Motion for Partial Summary Judgment of Non-Infringement: (1) No Infringement by Echostar's 7100/7200 Devices; and (2) No Infringement Under the Doctrine of Equivalents filed Jul. 27, 2005.
2:04-cv-00001 *TiVo Inc.v. EchoStar Communications Corporation et al.*, (156) Motion Hearing filed Aug. 1, 2005.
2:04-cv-00001 *TiVo Inc.v. EchoStar Communications Corporation et al.*, (157) Echostar's Reply Brief in Support of Motion for Partial Summary Judgment of Non-Infringement: (1) No Infringement by Echostar's 7100/7200 Devices; and (2) No Infringement Under the Doctrine of Equivalents filed Aug. 3, 2005.
2:04-cv-00001 *TiVo Inc.v. EchoStar Communications Corporation et al.*, (162) Defendants' Opposition to Tivo's Second Motion to Compel filed Aug. 9, 2005.
2:04-cv-00001 *TiVo Inc.v. EchoStar Communications Corporation et al.*, (171) Exhibit filed Under Sealed — Confidential Videotape Depsotion of Kerry Philip Langloys Miller — Jul. 6, 2005 filed Aug. 11, 2005.
2:04-cv-00001 *TiVo Inc.v. EchoStar Communications Corporation et al.*, (306) Tivo's Reply Motion Re: Motion in Limine #2 : Echostar's Inequitable Conduct Defense Should Be Tried by the Court and Precluded From the Jury Phase of Trial filed Sep. 14, 2005.
2:04-cv-00001 *TiVo Inc.v. EchoStar Communications Corporation et al.*, (308) TiVo Inc.'S Sur-Reply to Echostar's Motion for Partial Summary Judgment of Invalidity Due to Indefiniteness filed Sep. 14, 2005.
2:04-cv-00001 *TiVo Inc.v. EchoStar Communications Corporation et al.*, (309) TiVo's Reply to Its Motions in Limine Nos. 3A-3C filed Sep. 14, 2005.
2:04-cv-00001 *TiVo Inc.v. EchoStar Communications Corporation et al.*, (355) Echostar's 35 U.S.C. Section 282 Supplemental Disclosure filed Sep. 23, 2005.
2:04-cv-00001 *TiVo Inc.v. EchoStar Communications Corporation et al.*, (362) Reply in Support of Echostar's Motion to Strike Tivo's Late Cross Motion for Partial Summary Judgment of Infringement of Claims 31 and 61 filed Sep. 28, 2005.
2:04-cv-00001 *TiVo Inc.v. EchoStar Communications Corporation et al.*, (377) Tivo Inc.'S Surreply in Further Opposition to Echostar's Motion to Strike Tivo Inc.'S Cross Motion Re: Partial Summary Judgment of Infringement of Clais 31 and 61 filed Oct. 5, 2005.
2:04-cv-00001 *TiVo Inc.v. EchoStar Communications Corporation et al.*, (379) Motio in Limine filed Oct. 6, 2005.
2:04-cv-00001 *TiVo Inc.v. EchoStar Communications Corporation et al.*, (382) Stipulation Mooting Tivo's Motion in Limine No. 2 filed Oct. 6, 2005.
2:04-cv-00001 *TiVo Inc.v. EchoStar Communications Corporation et al.*, (390) Pretrial Hearing filed Oct. 11, 2005.
2:04-cv-00001 *TiVo Inc.v. EchoStar Communications Corporation et al.*, (400) Pretrial Hearing filed Oct. 18, 2005.
2:04-cv-00001 *TiVo Inc.v. EchoStar Communications Corporation et al.*, (420) Second Amended Complaint for Patent Infringement filed Jan. 24, 2006.
2:04-cv-00001 *TiVo Inc.v. EchoStar Communications Corporation et al.*, (422) Order filed Jan. 26, 2006.
2:04-cv-00001 *TiVo Inc.v. EchoStar Communications Corporation et al.*, (427) Defendants' Submission Regarding Evidentiary Objections to Be Heard by the Magistrate Judge filed Jan. 30, 2006.
2:04-cv-00001 *TiVo Inc.v. EchoStar Communications Corporation et al.*, (432) Order filed Feb. 2, 2006.
2:04-cv-00001 *TiVo Inc.v. EchoStar Communications Corporation et al.*, (460) Defendants Echostar Communications Corporation and Echostar Dbs Corporation's Second Amended Answer to Second Amended Complaint for Patent Infringement; Defendant Echostar Communications Corporation's Counterclaims for Declaratory Relief of Invalidity, Non-Infringement and Unenforceability filed Feb. 9, 2006.

(56) References Cited

OTHER PUBLICATIONS

2:04-cv-00001 *TiVo Inc.v. EchoStar Communications Corporation et al.*, (461) Defendants Echostar Technologies Corporation, Echosphere Limited Liability Company, and Echostar Satellite Llc's Second Amended Answer to Second Amended Complaint for Patent Infringement and Counterclaims for Declaratory Relief of Invalidity, Non-Infringement and Unenforceability filed Feb. 9, 2006.

2:04-cv-00001 *TiVo Inc.v. EchoStar Communications Corporation et al.*, (474) TiVo's Brief in Opposition to Remaining Disputes Re: Echostar Objections to Tivo's Trial Exhibits filed Feb. 16, 2006.

2:04-cv-00001 *TiVo Inc.v. EchoStar Communications Corporation et al.*, (481) Summary Judgment Motions filed Feb. 16, 2006.

2:04-cv-00001 *TiVo Inc.v. EchoStar Communications Corporation et al.*, (482) Pretrial Hearing Deposition Designations and Exhibit Objections filed Feb. 16, 2006.

2:04-cv-00001 *TiVo Inc.v. EchoStar Communications Corporation et al.*, (488) TiVo's Brief on Claim Construction of the Preamble filed Feb. 22, 2006.

2:04-cv-00001 *TiVo Inc.v. EchoStar Communications Corporation et al.*, (490) TiVo's Motion for Reconsideration of Magistrate Judge's Ruling on Tivo Trial Exhibits 1514, 1515, 1683, 1703, 1705, and 1709 filed Feb. 22, 2006.

2:04-cv-00001 *TiVo Inc.v. EchoStar Communications Corporation et al.*, (496) Plaintiff Tivo Inc.'S Reply to Defendant Echostar Communications Corporation's Second Amended Counterclaims for Declaratory Relief of Invalidity, Non-Infringement and Unenforceability filed Feb. 24, 2006.

2:04-cv-00001 *TiVo Inc.v. EchoStar Communications Corporation et al.*, (497) Plaintiff Tivo Inc.'S Reply to Defendants Echostar Technologies Corporation, Echosphere Limited Liability Company and Echostar Satellite Lies Second Amended Counterclaims for Declaratory Relief of Invalidity, Non-Infringement and Unenforceability filed Feb. 24, 2006.

2:04-cv-00001 *TiVo Inc.v. EchoStar Communications Corporation et al.*, (515) Transcript of Motion Hearing filed Mar. 9, 2006.

2:04-cv-00001 *TiVo Inc.v. EchoStar Communications Corporation et al.*, (520) Order filed Mar. 13, 2006.

2:04-cv-00001 *TiVo Inc.v. EchoStar Communications Corporation et al.*, (550) TiVo's Brief on Claim Construction of Claims 5 and 36 filed Mar. 20, 2006.

2:04-cv-00001 *TiVo Inc.v. EchoStar Communications Corporation et al.*, (553) TiVo's Motion for Reconsideration of Magistrate Judge's Ruling on Admissibility of Exhibits on Tivo's Products filed Mar. 20, 2006.

2:04-cv-00001 *TiVo Inc.v. EchoStar Communications Corporation et al.*, (576) Amended Proposed Joint Final Pre-Trial Order filed Mar. 23, 2006.

2:04-cv-00001 *TiVo Inc.v. EchoStar Communications Corporation et al.*, (577) Order filed Mar. 24, 2006.

2:04-cv-00001 *TiVo Inc.v. EchoStar Communications Corporation et al.*, (579) Amended Proposed Joint Final Pre-Trial Order filed Mar. 24, 2006.

2:04-cv-00001 *TiVo Inc.v. EchoStar Communications Corporation et al.*, (583) Supplemental Claim Construction Order filed Mar. 24, 2006.

2:04-cv-00001 *TiVo Inc.v. EchoStar Communications Corporation et al.*, (585) Echostar's Unopposed Motion to Correct Exhibits B and D to the Joint Final Pretrial Order filed Mar. 26, 2006.

2:04-cv-00001 *TiVo Inc.v. EchoStar Communications Corporation et al.*, (601) Notice Regarding Echostar Trial Exhibit Nos. 3490 and 3497 filed Mar. 27, 2006.

2:04-cv-00001 *TiVo Inc.v. EchoStar Communications Corporation et al.*, (635) Echostar's Reply to Tivo's Response to Echostar's Objections Re Demonstrative Exhibits to Be Used With Dr. Ugone filed Apr. 2, 2006.

2:04-cv-00001 *TiVo Inc.v. EchoStar Communications Corporation et al.*, (641) TiVo's Revised Proposed Final Jury Instructions (As Amended Apr. 3, 2006) filed Apr. 03, 2006.

2:04-cv-00001 *TiVo Inc.v. EchoStar Communications Corporation et al.*, (653) Echostar's Offer of Proof Related to Claim Construction Order filed Apr. 3, 2006.

2:04-cv-00001 *TiVo Inc.v. EchoStar Communications Corporation et al.*, (657) filed TiVo's Offer of Proof Regarding Excluded Tivo Product Demonstration filed Apr. 5, 2006.

2:04-cv-00001 *TiVo Inc.v. EchoStar Communications Corporation et al.*, (662) TiVo's Brief in Support of Its Request for a Curative Instruction Regarding Improper Claim Construction Testimony by Echostar Witnesses filed Apr. 7, 2006.

2:04-cv-00001 *TiVo Inc.v. EchoStar Communications Corporation et al.*, (669) Echostar's Response in Opposition to Tivo's Brief in Support of Its Request for a Curative Instruction Regarding Improper Claim Construction Testimony by Echostar Witnesses filed Apr. 9, 2006.

2:04-cv-00001 *TiVo Inc.v. EchoStar Communications Corporation et al.*, (674) Echostar's Offer of Proof Regarding Excluded Testimony of Dr. Nathaniel Polish, Ph.D. filed Apr. 10, 2006.

2:04-cv-00001 *TiVo Inc.v. EchoStar Communications Corporation et al.*, (675) Echostar's Offer of Proof Regarding Echostar Exhibits 3554 and 3562 (Request for Reexamination and Pto Order Granting) filed Apr. 10, 2006.

2:04-cv-00001 *TiVo Inc.v. EchoStar Communications Corporation et al.*, (676) TiVo's Brief on Demonstratives Re: Claims 5 and 36 filed Apr. 10, 2006.

2:04-cv-00001 *TiVo Inc.v. EchoStar Communications Corporation et al.*, (677) Echostar's Amended Offer of Proof Regarding Excluded Testimony of Dr. Nathaniel Polish, Ph.D. filed Apr. 11, 2006.

2:04-cv-00001 *TiVo Inc.v. EchoStar Communications Corporation et al.*, (680) Echostar's Supplemental Submission Regarding Verdict Form filed Apr. 11, 2006.

2:04-cv-00001 *TiVo Inc.v. EchoStar Communications Corporation et al.*, (681) Echostar's Motion for Judgment As a Matter of Law filed Apr. 11, 2006.

2:04-cv-00001 *TiVo Inc.v. EchoStar Communications Corporation et al.*, (690) Verdict Form filed Apr. 13, 2006.

2:04-cv-00001 *TiVo Inc.v. EchoStar Communications Corporation et al.*, (692) Jury Trial filed Apr. 13, 2006.

2:04-cv-00001 *TiVo Inc.v. EchoStar Communications Corporation et al.*, (697) Trial Transcript filed Apr. 18, 2006.

2:04-cv-00001 *TiVo Inc.v. EchoStar Communications Corporation et al.*, (699) Trial Transcript filed Apr. 18, 2006.

2:04-cv-00001 *TiVo Inc.v. EchoStar Communications Corporation et al.*, (701) Trial Transcript filed Apr. 18, 2006.

2:04-cv-00001 *TiVo Inc.v. EchoStar Communications Corporation et al.*, (702) Trial Transcript filed Apr. 18, 2006.

2:04-cv-00001 *TiVo Inc.v. EchoStar Communications Corporation et al.*, (704) Trial Transcript filed Apr. 18, 2006.

2:04-cv-00001 *TiVo Inc.v. EchoStar Communications Corporation et al.*, (706) Trial Transcript filed Apr. 18, 2006.

2:04-cv-00001 *TiVo Inc.v. EchoStar Communications Corporation et al.*, (707) Trial Transcript filed Apr. 20, 2006.

2:04-cv-00001 *TiVo Inc.v. EchoStar Communications Corporation et al.*, (709) Trial Transcript filed Apr. 20, 2006.

2:04-cv-00001 *TiVo Inc.v. EchoStar Communications Corporation et al.*, (712) Trial Transcript filed Apr. 20, 2006.

2:04-cv-00001 *TiVo Inc.v. EchoStar Communications Corporation et al.*, (713) Trial Transcript filed Apr. 20, 2006.

2:04-cv-00001 *TiVo Inc.v. EchoStar Communications Corporation et al.*, (714) Trial Transcript filed Apr. 20, 2006.

2:04-cv-00001 *TiVo Inc.v. EchoStar Communications Corporation et al.*, (715) Echostar's Offer of Proof Regarding Cross-Examination of Dr. Storer filed Apr. 20, 2006.

2:04-cv-00001 *TiVo Inc.v. EchoStar Communications Corporation et al.*, (716) Trial Transcript filed Apr. 21, 2006.

2:04-cv-00001 *TiVo Inc.v. EchoStar Communications Corporation et al.*, (717) Trial Transcript filed Apr. 21, 2006.

2:04-cv-00001 *TiVo Inc.v. EchoStar Communications Corporation et al.*, (719) Trial Transcript filed Apr. 21, 2006.

2:04-cv-00001 *TiVo Inc.v. EchoStar Communications Corporation et al.*, (720) Trial Transcript filed Apr. 21, 2006.

(56) References Cited

OTHER PUBLICATIONS

2:04-cv-00001 *TiVo Inc.v. EchoStar Communications Corporation et al.*, (722) Trial Transcript filed Apr. 21, 2006.
2:04-cv-00001 *TiVo Inc.v. EchoStar Communications Corporation et al.*, (723) Trial Transcript filed Apr. 21, 2006.
2:04-cv-00001 *TiVo Inc.v. EchoStar Communications Corporation et al.*, (724) Trial Transcript filed Apr. 21, 2006.
2:04-cv-00001 *TiVo Inc.v. EchoStar Communications Corporation et al.*, (727) Jury Charge Conference filed May 1, 2006.
2:04-cv-00001 *TiVo Inc.v. EchoStar Communications Corporation et al.*, (734) TiVo's Motion for Treble Damages and for a Determination That This Is an "Exceptional Case" Entitling Tivo to Recover Attorneys' Fees filed May 25, 2006 (2 parts).
2:04-cv-00001 *TiVo Inc.v. EchoStar Communications Corporation et al.*, (755) Bench Trial and Motion Hearing filed Jun. 26, 2006.
2:04-cv-00001 *TiVo Inc.v. EchoStar Communications Corporation et al.*, (756) Bench Trial and Motion filed Jun. 28, 2006.
2:04-cv-00001 *TiVo Inc.v. EchoStar Communications Corporation et al.*, (760) TiVo's Proposed Findings of Fact and Conclusions of Law Following Bench Trial on Echostar's Equitable Defenses of Equitable Estoppel, Laches, and Inequitable Conduct filed Jul. 7, 2006.
2:04-cv-00001 *TiVo Inc.v. EchoStar Communications Corporation et al.*, (763) Notice of Letter Brief filed Jul. 20, 2006.
2:04-cv-00001 *TiVo Inc.v. EchoStar Communications Corporation et al.*, (772) Findings of Fact and Conclusions of Law filed Aug. 17, 2006.
2:04-cv-00001 *TiVo Inc.v. EchoStar Communications Corporation et al.*, (773) Order filed Aug. 17, 2006.
2:04-cv-00001 *TiVo Inc.v. EchoStar Communications Corporation et al.*, (775) Order filed Aug. 17, 2006.
2:04-cv-00001 *TiVo Inc.v. EchoStar Communications Corporation et al.*, (776) Final Judgment and Permanent Injunction filed Aug. 17, 2006.
2:04-cv-00001 *TiVo Inc.v. EchoStar Communications Corporation et al.*, (779) Notice of Appeal filed Aug. 17, 2006.
2:04-cv-00001 *TiVo Inc.v. EchoStar Communications Corporation et al.*, (790) Hearing on TiVo's Objections to Defendants' Trail Exhibits and Defendants' Evidentiary Objections filed Aug. 29, 2006.
2:04-cv-00001 *TiVo Inc.v. EchoStar Communications Corporation et al.*, (793) Transcript filed Aug. 30, 2006.
2:04-cv-00001 *TiVo Inc.v. EchoStar Communications Corporation et al.*, (794) Transcript filed Aug. 30, 2006.
2:04-cv-00001 *TiVo Inc.v. EchoStar Communications Corporation et al.*, (795) Transcript filed Aug. 30, 2006.
2:04-cv-00001 *TiVo Inc.v. EchoStar Communications Corporation et al.*, (800) Joint Motion Re: Amended Final Judgment filed Aug. 31, 2006.
2:04-cv-00001 *TiVo Inc.v. EchoStar Communications Corporation et al.*, (806) Amended Final Judgment and Permanent Injunction filed Sep. 8, 2006.
2:04-cv-00001 *TiVo Inc.v. EchoStar Communications Corporation et al.*, (816) Order filed Nov. 27, 2006.
2:04-cv-00001 *TiVo Inc.v. EchoStar Communications Corporation et al.*, (820) Opinion Annoucing Judgment of the court filed Feb. 4, 2008.
2:04-cv-00001 *TiVo Inc.v. EchoStar Communications Corporation et al.*, (821) Judgment filed Apr. 21, 2008.
2:04-cv-00001 *TiVo Inc.v. EchoStar Communications Corporation et al.*, (824) Letter to Judge Folsom dated May 16, 2008.
2:04-cv-00001 *TiVo Inc.v. EchoStar Communications Corporation et al.*, (825) Letter to Judge Folsom dated May 16, 2008.
2:04-cv-00001 *TiVo Inc.v. EchoStar Communications Corporation et al.*, (826) Letter to Judge Folsom dated May 23, 2008.
2:04-cv-00001 *TiVo Inc.v. EchoStar Communications Corporation et al.*, (832) TiVo's Motion for Echostar to Be Held in Contempt for Violation of This Court's Permanent Injunction filed Jun. 13, 2008.
2:04-cv-00001 *TiVo Inc.v. EchoStar Communications Corporation et al.*, (840) TiVo's Opposition to the Echostar Defendants' Motion for Interpretation of the Permanent Injunction filed Jun. 30, 2008.
2:04-cv-00001 *TiVo Inc.v. EchoStar Communications Corporation et al.*, (859) Injunction Hearing filed Sep. 4, 2000.
2:04-cv-00001 *TiVo Inc.v. EchoStar Communications Corporation et al.*, (860) Motion Hearing filed Sep. 16, 2008.
2:04-cv-00001 *TiVo Inc.v. EchoStar Communications Corporation et al.*, (890) Joint Stipulation Regarding Discovery Issues filed Feb. 2, 2009.
2:04-cv-00001 *TiVo Inc.v. EchoStar Communications Corporation et al.*, (932) Amended Final Judgment and Permanent Injunction filed Jun. 2, 2009.
2:04-cv-00001 *TiVo Inc.v. EchoStar Communications Corporation et al.*, (939) Letter to Judge Folsom dated Jun. 15, 2009.
2:04-cv-00001 *TiVo Inc.v. EchoStar Communications Corporation et al.*, (944) TiVo's Motion for Interest on Stay Period Damages filed Jun. 22, 2009.
2:04-cv-00001 *TiVo Inc.v. EchoStar Communications Corporation et al.*, (945) Echostar's Unopposed Motion for Approval of Supersedeas Bond filed Jun. 26, 2009.
2:04-cv-00001 *TiVo Inc.v. EchoStar Communications Corporation et al.*, (955) Echostar's Opposition to Tivo's Motion for Interest on Stay Period Damages filed Jul. 2, 2009.
2:04-cv-00001 *TiVo Inc.v. EchoStar Communications Corporation et al.*, (962) TiVo's Opposition to Echostar's Motion to Suspend Proceedings on Sanctions filed Jul. 10, 2009.
2:04-cv-00001 *TiVo Inc.v. EchoStar Communications Corporation et al.*, (967) Letter to Judge Folsom dated Jul. 17, 2009.
2:04-cv-00001 *TiVo Inc.v. EchoStar Communications Corporation et al.*, (982) Letter to Judge Folsom dated Aug. 4, 2009.
2:04-cv-00001 *TiVo Inc.v. EchoStar Communications Corporation et al.*, (986) Notice of Compliance With Judge Folsom's Standing Order Entered on Jul. 22, 2009 filed Aug. 12, 2009.
2:04-cv-00001 *TiVo Inc.v. EchoStar Communications Corporation et al.*, (1026) Decided: Mar. 4, 2010 filed Mar. 9, 2010.
2:04-cv-00001 *TiVo Inc.v. EchoStar Communications Corporation et al.*, (1036) Echostar's Response to Tivo's Motion for Extension of Time to File a Response to Echostar's Motion for Preapproval filed Mar. 29, 2010.
2:04-cv-00001 *TiVo Inc.v. EchoStar Communications Corporation et al.*, (1042) Notice of Entry of Judgment Accompanying by Opinion filed Apr. 25, 2011.
5:11-cv-00053 *Motorola Mobility Inc. et al.v. TiVo Inc.*, (1) Complaint for Patent Nfringement and Declaratory Judgment filed Feb. 25, 2011.
5:11-cv-00053 *Motorola Mobility Inc. et al.v. TiVo Inc.*, (2) Additional Attachments to Main Document filed Feb. 5, 2011.
5:11-cv-00053 *Motorola Mobility Inc. et al.v. TiVo Inc.*, (14) Defendant Tivo Inc.'S 1) Answer to Plaintiffs' Complaint and 2) Counterclaims filed Apr. 18, 2011.
5:11-cv-00053 *Motorola Mobility Inc. et al.v. TiVo Inc.*, (22) TiVo's Motion to Stay filed Jun. 10, 2011.
5:11-cv-00053 *Motorola Mobility Inc. et al.v. TiVo Inc.*, (29) Plaintiffs' Opposition to Tivo's Motion to Stay filed Jun. 20, 2011.
5:11-cv-00053 *Motorola Mobility Inc. et al.v. TiVo Inc.*, (32) Transcript of Rule 16 Management Conference filed Jul. 4, 2011.
5:11-cv-00053 *Motorola Mobility Inc. et al.v. TiVo Inc.*, (34) Order filed Jul. 6, 2011.
5:11-cv-00053 *Motorola Mobility Inc. et al.v. TiVo Inc.*, (39) Reply in Support of Plaintiffs' Objection to Magistrate Judge Craven's Order Granting Defendant's Motion to Stay filed Aug. 18, 2011.
5:11-cv-00053 *Motorola Mobility Inc. et al.v. TiVo Inc.*, (40) Surreply in Opposition to Plaintiffs' Objection to Magistrate Judge Craven's Order Granting Defendant's Motion to Stay filed Aug. 29, 2011.
5:11-cv-00053 *Motorola Mobility Inc. et al.v. TiVo Inc.*, (44) Order filed Nov. 14, 2011.
5:11-cv-00053 *Motorola Mobility Inc. et al.v. TiVo Inc.*, (52) Transcript of Status Conference filed Jan. 23, 2012.
5:11-cv-00053 *Motorola Mobility Inc. et al.v. TiVo Inc.*, (73) Defendant TiVo Inc.'S 1) Answer to Plaintiffs' Complaint and 2) Amended Counterclaims filed Mar. 26, 2012.

(56) References Cited

OTHER PUBLICATIONS

5:11-cv-00053 *Motorola Mobility Inc. et al.v. TiVo Inc.*, (85) Tivo's Opposition to Motorola's Motion to Strike or Dismiss Portions of Tivo's Fourth, Fifth and Sixth Counterclaims filed Apr. 30, 2012.
5:11-cv-00053 *Motorola Mobility Inc. et al.v. TiVo Inc.*, (86) Amended Complaint for Patent Infringement and Declaratory Judgment filed Apr. 30, 2012.
5:11-cv-00053 *Motorola Mobility Inc. et al.v. TiVo Inc.*, (87) Plaintiffs' Reply Brief in Support of Their Motion to Strike Tivo's Portions of TiVo's Fourth, Fifth and Sixth Counterclaims filed May 11, 2012.
5:11-cv-00053 *Motorola Mobility Inc. et al.v. TiVo Inc.*, (88) Tivo's Motion to Dismiss and Strike Motorola's Fourth, Fifth, Eighth, and Ninth Causes of Action May 17, 2012.
5:11-cv-00053 *Motorola Mobility Inc. et al.v. TiVo Inc.*, (92) Pr 4-3 Joint Claim Construction and Prehearing Statement filed May 18, 2012.
5:11-cv-00053 *Motorola Mobility Inc. et al.v. TiVo Inc.*, (93) TiVo's Sur-Reply in Pposition to Motorola's Motion to Strike or Dismiss Portions of Tivo's Fourth, Fifth and Sixth Counterclaims filed May 21, 2012.
5:11-cv-00053 *Motorola Mobility Inc. et al.v. TiVo Inc.*, (101) Tivo's Opposition to Time Warner Cable Inc.'S and Time Warner Cable Llc's Motion to Dismiss Tivo's Claims for Patent Infringement filed Jun. 1, 2012.
5:11-cv-00053 *Motorola Mobility Inc. et al.v. TiVo Inc.*, (108) TiVo's Reply in Support of Its Motion to Dismiss and Strike Plaintiffs' Fourth, Fifth, Eighth, and Ninth Causes of Action filed Jun. 15, 2012.
5:11-cv-00053 *Motorola Mobility Inc. et al.v. TiVo Inc.*, (110) Counterclaim Defendants Time Warner Cable Inc.'S and Time Warner Cable Llc's Motion to Sever and Stay Tivo's Claims Against Time Warner Cable filed Jun. 20, 2012.
5:11-cv-00053 *Motorola Mobility Inc. et al.v. TiVo Inc.*, (112) Tivo Inc.'S Emergency Motion to Extend Claim Construction Deadlines filed Jun. 26, 2012.
5:11-cv-00053 *Motorola Mobility Inc. et al.v. TiVo Inc.*, (113) Motorola's Opposition to Defendant Tivo Inc.'S Emergency Motion to Extend Claim Construction Deadlines filed Jun. 26, 2012.
5:11-cv-00053 *Motorola Mobility Inc. et al.v. TiVo Inc.*, (148) Reply in Support of Motorola's Motion to Compel TiVo's Production of Expert Reports and Deposition Transcripts From Other Litigations and Related Interrogatory Responses filed Sep. 4, 2012.
5:11-cv-00053 *Motorola Mobility Inc. et al.v. TiVo Inc.*, (152) TiVo's Motion to Consolidate Cases for Pretrial Purposes Andrequest for a Joint Status Conference filed Sep. 19, 2012.
5:11-cv-00053 *Motorola Mobility Inc. et al.v. TiVo Inc.*, (153) Non-Party Microsoft Corporation's Motion to Intervene to Protect Confidential Information filed Sep. 19, 2012.
5:11-cv-00053 *Motorola Mobility Inc. et al.v. TiVo Inc.*, (156) Plaintiffs' PR 4-3 Claim Construction and Prehearing Statement filed Oct. 3, 2012.
5:11-cv-00053 *Motorola Mobility Inc. et al.v. TiVo Inc.*, (157) Opposition to Tivo's Motion to Continue Claim Construction Deadlines and Request for Status Conference filed Oct. 5, 2012.
5:11-cv-00053 *Motorola Mobility Inc. et al.v. TiVo Inc.*, (159) Motorola's Opposition to Tivo's Motion to Consolidate for Pretrial Purposes and Request for a Joint Status Conference.
5:11-cv-00053 *Motorola Mobility Inc. et al.v. TiVo Inc.*, (162) Plaintiffs' Revised PR 4-3 Claim Construction and Prehearing Statement filed Oct. 10, 2012.
5:11-cv-00053 *Motorola Mobility Inc. et al.v. TiVo Inc.*, (166) Plaintiffs' Second Revised PR 4-3 Claim Construction and Prehearing Statement filed Oct. 15, 2012.
5:11-cv-00053 *Motorola Mobility Inc. et al.v. TiVo Inc.*, (167) Joint PR 4-3 Claim Construction and Prehearing Statement filed Oct. 17, 2012.
5:11-cv-00053 *Motorola Mobility Inc. et al.v. TiVo Inc.*, (172) Motorola Mobility, Inc. And General Instrument Corporation's Notice of Submission of Technical Tutorial filed Oct. 23, 2012.

5:11-cv-00053 *Motorola Mobility Inc. et al.v. TiVo Inc.*, (173) Motorola Mobility, Inc. And General Instrument Corporation's Opening Claim Construction Brief filed Oct. 23, 2012 (2 parts).
5:11-cv-00053 *Motorola Mobility Inc. et al.v. TiVo Inc.*, (177) Tivo'S P.R. 4-5(a) Opening Claim Construction Brief filed Oct. 24, 2012 (2 parts).
5:11-cv-00053 *Motorola Mobility Inc. et al.v. TiVo Inc.*, (182) TiVo Inc.'S P.R. 4-5(B) Responsive Claim Construction Brief filed Nov. 6, 2012 (2 parts).
5:11-cv-00053 *Motorola Mobility Inc. et al.v. TiVo Inc.*, (188) Order filed Nov. 13, 2012.
5:11-cv-00053 *Motorola Mobility Inc. et al.v. TiVo Inc.*, (189) Motorola Mobility, Inc. And General Instrument Corporation's Reply Claim Construction Brief filed Nov. 13, 2012.
5:11-cv-00053 *Motorola Mobility Inc. et al.v. TiVo Inc.*, (192) Joint Claim Chart filed Nov. 14, 2012.
5:11-cv-00053 *Motorola Mobility Inc. et al.v. TiVo Inc.*, (202) Plaintiffs and Counterclaim Defendants' Motion for Leave to File Surreply to Tivo Inc.'S Reply Claim Construction Brief filed Nov. 21, 2012.
5:11-cv-00053 *Motorola Mobility Inc. et al.v. TiVo Inc.*, (209) Plaintiffs' Reply and Counterclaims to Tivo Inc.'S Amended Counterclaims filed Nov. 27, 2012.
5:11-cv-00053 *Motorola Mobility Inc. et al.v. TiVo Inc.*, (210) Motions Hearing filed Nov. 28, 2012.
5:11-cv-00053 *Motorola Mobility Inc. et al.v. TiVo Inc.*, (212) Markman Hearing filed Nov. 19, 2012.
5:11-cv-00053 *Motorola Mobility Inc. et al.v. TiVo Inc.*, (216) Order filed Nov. 30, 2012.
5:11-cv-00053 *Motorola Mobility Inc. et al.v. TiVo Inc.*, (219) Transcript — Claim Construction Hearing filed Dec. 4, 2012.
5:11-cv-00053 *Motorola Mobility Inc. et al.v. TiVo Inc.*, (232) TiVo's Notice of Supplemental Authority to Tivo's Motion for Sanctions Against Motorola Under Rule 11 of the Federal Rules of Civil Procedure filed Jan. 4, 2013.
5:11-cv-00053 *Motorola Mobility Inc. et al.v. TiVo Inc.*, (238) TiVo Inc.'S Answer to Counterclaims of Motorola Mobility, Inc. And General Instrument Corporation filed Jan. 16, 2013.
5:11-cv-00053 *Motorola Mobility Inc. et al.v. TiVo Inc.*, (246) Memorandum Opinion and Order filed Jan. 25, 2013.
5:11-cv-00053 *Motorola Mobility Inc. et al.v. TiVo Inc.*, (273) TiVo's Notice of Compliance With Motion Practice Order Re Letter Brief Requesting Permission to File Motion for Summary Judgment of Invalidity of U.S. Pat. No. 6,304,714 filed Feb. 11, 2013.
5:11-cv-00053 *Motorola Mobility Inc. et al.v. TiVo Inc.*, (274) TiVo's Notice of Compliance With Motion Practice Order Re Letter Brief Requesting Permission to File Motion for Summary Judgment of Invalidity of U.S. Pat. No. 5,949,948 and 6,356,708 filed Feb. 11, 2013.
5:11-cv-00053 *Motorola Mobility Inc. et al.v. TiVo Inc.*, (330) Tivo's Answer to Amended Complaint of Motorola Mobility, Inc. And General Instrument Corporation filed Mar. 7, 2013.
5:11-cv-00053 *Motorola Mobility Inc. et al.v. TiVo Inc.*, (338) Motorola and Time Warner Cable's Motion to Exclude the Testimony of Robert Spar Regarding Patent Office Practice and Procedure filed Mar. 11, 2013.
5:11-cv-00053 *Motorola Mobility Inc. et al.v. TiVo Inc.*, (377) Transcript of Hearing filed Mar. 20, 2013.
5:11-cv-00053 *Motorola Mobility Inc. et al.v. TiVo Inc.*, (388) Transcript of Telephonic Hearing filed Mar. 31, 2013.
5:11-cv-00053 *Motorola Mobility Inc. et al.v. TiVo Inc.*, (392) TiVo's Opposition to Motorola and Time Warner Cable's Motion to Exclude the Testimony of Robert Spar Regarding Patent Office Practice and Procedure filed Apr. 1, 2013.
5:11-cv-00053 *Motorola Mobility Inc. et al.v. TiVo Inc.*, (415) Reply in Support of Motorola's Motion for Summary Judgment on the Appropriate Time Period for Tivo's Damages Counterclaim on the '389 Patent filed Apr. 12, 2013.
5:11-cv-00053 *Motorola Mobility Inc. et al.v. TiVo Inc.*, (419) Reply to Tivo's Opposition to Motorola and Time Warner Cable's Motion to Exclude the Testimony of Robert Spar Regarding Patent Office Practice and Procedure filed Apr. 12, 2013.

(56) References Cited

OTHER PUBLICATIONS

5:11-cv-00053 *Motorola Mobility Inc. et al.v. TiVo Inc.*, (431) Joint [Proposed] Final Pre-Trial Order filed Apr. 15, 2013.
5:11-cv-00053 *Motorola Mobility Inc. et al.v. TiVo Inc.*, (435) Notice of Corrected Exhibits filed Apr. 16, 2013.
5:11-cv-00053 *Motorola Mobility Inc. et al.v. TiVo Inc.*, (483) Joint Notice of Filing of Trial Exhibit Objections and Explanations filed Jun. 4, 2013.
5:11-cv-00053 *Motorola Mobility Inc. et al.v. TiVo Inc.*, (484) Motorola and Time Warner Cable's Additional Objections to Tivo's Exhibits filed Jun. 4, 2013.
5:11-cv-00053 *Motorola Mobility Inc. et al.v. TiVo Inc.*, (490) TiVo's Notice of Filing of Responses to Motorla's and Time Warner Cable's Additoinal Trial Exhibit Objections filed Jun. 5, 2013.
5:11-cv-00053 *Motorola Mobility Inc. et al.v. TiVo Inc.*, (502) Stipulation and Joint Motion to Dismiss Pursuant to Rule 41 of the Federal Rules of Civil Procedure filed Jul. 25, 2013.
5:11-cv-00053 *Motorola Mobility Inc. et al.v. TiVo Inc.*, (503) Order on Stipulation and Joint Motion to Dismiss Pursuant to Rule 41 of the Federal Rules of Civil Procedure filed Jul. 25, 2013.
1:08-cv-000327 *Dish Network Corporation et al v. TiVo Inc.*, (1) Complaint for Declaratory Relief filed May 30, 2008.
1:08-cv-000327 *Dish Network Corporation et al v. TiVo Inc.*, (12) Defendant TiVo's Motion to Dismiss Declaratory Suit filed Jul. 7, 2008.
1:08-cv-000327 *Dish Network Corporation et al v. TiVo Inc.*, (13) Opening Brief in Support of Tivo's Motion to Dismiss filed Jul. 7, 2008.
1:08-cv-000327 *Dish Network Corporation et al v. TiVo Inc.*, (19) Redaction Public Version -Echostar's Answering Brief in Opposition to Tivo's Motion to Dismiss filed Aug. 11, 2008.
1:08-cv-000327 *Dish Network Corporation et al v. TiVo Inc.*, (20) Redaction Public Version Declaration of Rachel Krev Ans in Support of Echostar's Opposition to Tivo's Motion to Dismiss Aug. 11, 2008.
1:08-cv-000327 *Dish Network Corporation et al v. TiVo Inc.*, (21) Redaction Public Version Declaration of Dan Minnick in Support of Echostar's Opposition to Tivo's Motion to Dismiss filed Aug. 11, 2008.
1:08-cv-000327 *Dish Network Corporation et al v. TiVo Inc.*, (22) Reply Brief in Support of TiVo's Motion to Dismiss filed Aug. 25, 2008.
2:09-cv-00171 *Dish Network Corporation et al v. TiVo Inc.*, (1) Complaint for Declaratory Relief filed May 30, 2008.
2:09-cv-00171 *Dish Network Corporation et al v. TiVo Inc.*, (13) Opening Brief in Support of Tivo's Motion to Dismiss filed Jul. 7, 2008.
2:09-cv-00171 *Dish Network Corporation et al v. TiVo Inc.*, (14) Declaration of William D. Bowen in Support of Two's Motion to Dismiss filed Jul. 7, 2008 (2 parts).
2:09-cv-00171 *Dish Network Corporation et al v. TiVo Inc.*, (20) Redaction Public Version Declaration of Rachel Krev Ans in Support of Echostar's Opposition to Tivo's Motion to Dismiss filed Aug. 11, 2008.
2:09-cv-00171 *Dish Network Corporation et al v. TiVo Inc.*, (21) Redaction Public Version Declaration of Dan Minnick in Support of Echostar's Opposition to Tivo's Motion to Dismiss filed Aug. 11, 2008.
2:09-cv-00171 *Dish Network Corporation et al v. TiVo Inc.*, (22) Redaction Public Version Reply Brief in Support of TiVo's Motion to Dismiss filed Aug. 25, 2008.
2:09-cv-00171 *Dish Network Corporation et al v. TiVo Inc.*, (25) Redaction Public Version Exhibit a to Reply Brief in Support of Tivo's Motion to Dismiss filed Sep. 2, 2008.
2:09-cv-00171 *Dish Network Corporation et al v. TiVo Inc.*, (27) Memorandum Opinion filed Mar. 31, 2009.
2:09-cv-00171 *Dish Network Corporation et al v. TiVo Inc.*, (29) Echostar's Submission Regarding Potential Transfer of This Action to the Eastern District of Texas filed filed Apr. 13, 2009.

2:15-cv-01503 *TiVo Inc.v. Samsung Electronics Co., Ltd. et al.*, (1) Complaint for Patent Infringement and Demand for Jury Trial filed Sep. 8, 2015.
2:15-cv-01503 *TiVo Inc.v. Samsung Electronics Co., Ltd. et al.*, (24) Samsung's Answer, Affimative Defenses, and Counterclaims to Tivo Inc.'S First Amended Complaint for Patent Infringement filed Dec. 4, 2015.
2:15-cv-01503 *TiVo Inc.v. Samsung Electronics Co., Ltd. et al.*, (25) TiVo Inc.'S Answer to Counterclaims of Samsung Electronics Co., Ltd. And Samsung Electronics America, Inc. filed Dec. 10, 2015.
2:15-cv-01503 *TiVo Inc.v. Samsung Electronics Co., Ltd. et al.*, (30) Samsung's Unopposed Motion for Leave to File Second Amended Answer, Affirmative Defenses, and Counterclaims to Tivo Inc.'S First Amended Complaint for Patent Infringement filed Feb. 8, 2016.
2:15-cv-01503 *TiVo Inc.v. Samsung Electronics Co., Ltd. et al.*, (34) Samsung's Second Amended Answer, Affirmative Defenses, and Counterclaims to Tivo Inc.'S First Amended Complaint for Patent Infringement filed Feb. 11, 2016.
2:15-cv-01503 *TiVo Inc.v. Samsung Electronics Co., Ltd. et al.*, (37) TiVo Inc.'S Answer to Samsung's Counterclaims and TiVo's Counterclaims filed Feb. 29, 2016.
2:15-cv-01503 *TiVo Inc.v. Samsung Electronics Co., Ltd. et al.*, (46) Joint Motion for Entry of Proposed Discovery Order With Disputed Provisions for Resolution by the Court filed Mar. 14, 2016.
2:15-cv-01503 *TiVo Inc.v. Samsung Electronics Co., Ltd. et al.*, (51) Samsung's Motion to Compel Tivo's Infringement Contentions filed Apr. 12, 2016 (3 parts).
2:15-cv-01503 *TiVo Inc.v. Samsung Electronics Co., Ltd. et al.*, (72) Samsung's Opposed Motion for Leave to Amend Its First Amended Invalidity Contentions filed Jun. 7, 2016 (4 parts).
2:15-cv-01503 *TiVo Inc.v. Samsung Electronics Co., Ltd. et al.*, (75) Emergency Motion to Clarify Discovery Obligations in Light of Prior Protective Orders filed Jun. 17, 2016 (3 parts).
2:15-cv-01503 *TiVo Inc.v. Samsung Electronics Co., Ltd. et al.*, (76) Samsung's Opposed Motion for Leave to Amend Its Second Amended Invalidity Contentions Jun. 20, 2016.
2:15-cv-01503 *TiVo Inc.v. Samsung Electronics Co., Ltd. et al.*, (82) TiVo Inc.'S Motion for Judgment on the Pleadings That Claim 1 of U.S. Pat. No. 5,978,043 and Claims 1, 2, 7, and 19 of U.S. Pat. No. 6,181,333 Do Not Claim Patent-Eligible Subject Matter and Are Invalid filed Jun. 24, 2016.
2:15-cv-01503 *TiVo Inc.v. Samsung Electronics Co., Ltd. et al.*, (87) Order filed Jul. 01, 2016.
2:15-cv-01503 *TiVo Inc.v. Samsung Electronics Co., Ltd. et al.*, (94) Broadcom's Pposition to Tivo's "Emergency" Motion to Clarify Discovery Obligations in Light of Prior Protective Order filed Jul. 5, 2016.
2:15-cv-01503 *TiVo Inc.v. Samsung Electronics Co., Ltd. et al.*, (95) Joint Notice in Compliance With Standing Order Regarding Motions filed Jul. 5, 2016.
2:15-cv-01503 *TiVo Inc.v. Samsung Electronics Co., Ltd. et al.*, (103) TiVo Inc.'S Opposition to Samsung's Motion for Leave to Amend Its Second Amended Invalidity Contentions Filed Jul. 8, 2016.
2:15-cv-01503 *TiVo Inc.v. Samsung Electronics Co., Ltd. et al.*, (106) Joint Report of Results of Meet and Confer Regarding Motions Set for Hearing filed Jul. 8, 2016.
2:15-cv-01503 *TiVo Inc.v. Samsung Electronics Co., Ltd. et al.*, (109) Samsung's Opposition to Tivo's Motion for Judgment on the Pleadings for Invalidity filed Jul. 11, 2016.
2:15-cv-01503 *TiVo Inc.v. Samsung Electronics Co., Ltd. et al.*, (122) Samsung's Response to Tivo's Motion to Compel Defendants to Produce Technical Documents and to Respond to Interrogatory No. 2 filed Jul. 18, 2016.
2:15-cv-01503 *TiVo Inc.v. Samsung Electronics Co., Ltd. et al.*, (128) Tivo Inc.'S Reply in Support of Its Motion for Judgment on the Pleadings That Claim 1 of U.S. Pat. No. 5,978,043 and Claims 1, 2, 7, and 19 of U.S. Pat. No. 6,181,333 Do Not Claim Patent-Eligible Subject Matter and Are Invalid filed Jul. 21, 2016.
2:15-cv-01503 *TiVo Inc.v. Samsung Electronics Co., Ltd. et al.*, (129) Order filed Jul. 22, 2016.

(56) References Cited

OTHER PUBLICATIONS

2:15-cv-01503 *TiVo Inc.v. Samsung Electronics Co., Ltd. et al.*, (137) Motion to Expedite Briefing and Set Hearing on Tivo's Motion to Amend Infringement Contentions filed Jul. 29, 2016.
2:15-cv-01503 *TiVo Inc.v. Samsung Electronics Co., Ltd. et al.*, (138) Samsung's Partial Opposition to Tivo's Motion to Expedite Briefing and Set Hearing on Tivo's Motion to Amend Infringement Contentions filed Jul. 29, 2016.
2:15-cv-01503 *TiVo Inc.v. Samsung Electronics Co., Ltd. et al.*, (139) Reply on Motion to Expedite Briefing and Set Hearing on Tivo's Motion to Amend Infringement Contentions filed Jul. 31, 2016.
2:15-cv-01503 *TiVo Inc.v. Samsung Electronics Co., Ltd. et al.*, (141) Samsung's Sur-Reply to Tivo's Motion for Judgment on the Pleadings for Invalidity filed Aug. 1, 2016.
2:15-cv-01503 *TiVo Inc.v. Samsung Electronics Co., Ltd. et al.*, (149) Samsung's Third Amended Answer, Affirmative Defenses, and Counterclaims to Tivo Inc.'s First Amended Complaint for Patent Infringement filed Aug. 8, 2016.
2:15-cv-01503 *TiVo Inc.v. Samsung Electronics Co., Ltd. et al.*, (154) Joint 4-3 Claim Construction and Prehearing Statement filed Aug. 10, 2016.
2:15-cv-01503 *TiVo Inc.v. Samsung Electronics Co., Ltd. et al.*, (158) Notice of Corrected Exhibit C filed Aug. 12, 2016.
2:15-cv-01503 *TiVo Inc.v. Samsung Electronics Co., Ltd. et al.*, (164) Motion Hearing filed Aug. 25, 2016.
2:15-cv-01503 *TiVo Inc.v. Samsung Electronics Co., Ltd. et al.*, (169) Motion to Dismiss Samsung's Counterclaim Count Seven and Strike Samsung's Ninth Affirmative Defense Alleging Inequitable Conduct filed Aug. 29, 2016.
2:15-cv-01503 *TiVo Inc.v. Samsung Electronics Co., Ltd. et al.*, (170) Order Granting Samsung's Unopposed Motion for Leave to File Samsung's Corrected Third Amended Answer, Affirmative Defenses, and Counterclaims to Tivo Inc.'s First Amended Complaint for Patent Infringement filed Aug. 30, 2016.
2:15-cv-01503 *TiVo Inc.v. Samsung Electronics Co., Ltd. et al.*, (177) Samsung's Opening Claim Construction Brief filed Sep. 12, 2016 (2 parts).
2:15-cv-01503 *TiVo Inc.v. Samsung Electronics Co., Ltd. et al.*, (181) TiVo's P.R. 4-5(A) Opening Claim Construction Brief filed Sep. 12, 2016 (2 parts).
2:15-cv-01503 *TiVo Inc.v. Samsung Electronics Co., Ltd. et al.*, (182) Samsung's Corrected Third Amended Answer, Affirmative Defenses, and Counterclaims to Tivo Inc.'S First Amended Complaint for Patent Infringement filed Sep. 14, 2016.
2:15-cv-01503 *TiVo Inc.v. Samsung Electronics Co., Ltd. et al.*, (188) TiVo's P.R. 4-5(B) Response to Samsung's Opening Claim Construction Brief filed Sep. 26, 2016.
2:15-cv-01503 *TiVo Inc.v. Samsung Electronics Co., Ltd. et al.*, (192) Samsung's Reply Claim Construction Brief filed Oct. 3, 2016.
2:15-cv-01503 *TiVo Inc.v. Samsung Electronics Co., Ltd. et al.*, (194) Reply in Support of Motion to Dismiss Samsung's Counterclaim Count Seven and Strike Samsung's Ninth Affirmative Defense Alleging Inequitable Conduct filed Oct. 3, 2016.
2:15-cv-01503 *TiVo Inc.v. Samsung Electronics Co., Ltd. et al.*, (195) TiVo's P.R. 4-5(C) Reply Claim Construction Brief filed Oct. 3, 2016.
2:15-cv-01503 *TiVo Inc.v. Samsung Electronics Co., Ltd. et al.*, (204) Joint P. R. 4-5(D) Claim Construction Chart filed Oct. 10, 2016.
2:15-cv-01503 *TiVo Inc.v. Samsung Electronics Co., Ltd. et al.*, (206) Samsung's Sur-Reply in Opposition to TiVo's Motion to Dismiss Samsung's Counterclaim Count Seven and Strike Samsung's Ninth Affirmative Defense Alleging Inequitable Conduct filed Oct. 17, 2016.
2:15-cv-01503 *TiVo Inc.v. Samsung Electronics Co., Ltd. et al.*, (216) Order Dismissing Action filed Jan. 11, 2017.
*Cisco Systems, Inc.v. TiVo Inc.*in the U.S. District Court for the Eastern District of Texas under case No. 2:12-cv-00434 terminated U.S. Pat. No. 6,233,389 U.S. Pat. No. 7,529,465.
*TiVo Inc.v. Cisco Systems, Inc.*in the U.S. District Court for the Eastern District of Texas under Case No. 2:12-cv-00311 terminated U.S. Pat. No. 6,233,389 U.S. Pat. No. 7,529,465.
*TiVo Inc.v. Verizon Communications, Inc.*in the U.S. District Court for the Eastern District of Texas under Case No. 2:09-cv-00257 terminated U.S. Pat. No. 6,233,389 U.S. Pat. No. 7,529,465.
*Cisco Systems, Inc.v. TiVo Inc.*in the U.S. District Court for the Northern District of California under Case No. 3:12-cv-02766 U.S. Pat. No. 6,233,389 U.S. Pat. No. 7,529,465
*TiVo Inc.v. AT&T Inc*in the U.S. District Court for the Eastern District of Texas under Case No. 2:09-cv-00259 terminated U.S. Pat. No. 6,233,389 U.S. Pat. No. 7,529,465.
*TiVo Inc.v. Samsung Electronics Co., LTD., et al.* , in the U.S. District Court for the Eastern District of Texas under Case No. 2:15-cv-01503 terminated U.S. Pat. No. 6,233,389 U.S. Pat. No. 7,558,472 U.S. Pat. No. 8,457,476.
*Motorola Mobility, Inc. et al v. TiVo Inc.*in the U.S. District Court for the Eastern District of Texas under Case No. 5:11-cv-00053 terminated U.S. Pat. No. 6,233,389 U.S. Pat. No. 7,529,465.
*TIVO Incv. Echostar Comm et al*in the U.S. District Court for the Eastern District of Texas under Case No. 2:04-cv-00001 terminated U.S. Pat. No. 6,233,389.
*Dish Netwrok Corporation et al v. TiVo Inc.*in the U.S. District Court for the Eastern District of Texas under Case No. 2:09-cv-00171 terminated U.S. Pat. No. 6,233,389.
*Dish Network Corporation et al v. TiVo Inc.*in the U.S. District Court for the District of Delaware under Case No. 1:08-cv-00327 terminated U.S. Pat. No. 6,233,389.

* cited by examiner

MULTIPLE OUTLET DIGITAL VIDEO RECORDING SYSTEM

CROSS-REFERENCE TO RELATED APPLICATIONS; BENEFIT CLAIM

This application claims benefit as a Continuation of application Ser. No. 14/017,165, filed Sep. 3, 2013, now U.S. Pat. No. 8,948,569, issued Feb. 3, 2015, which claims benefit as a Continuation of application Ser. No. 12/430,781, filed Apr. 24, 2009, now U.S. Pat. No. 8,526,781, Sep. 3, 2013, which claims benefit as a Continuation of application Ser. No. 10/081,776, filed Feb. 20, 2002, now U.S. Pat. No. 7,529,465, issued May 5, 2009, which claims benefit as a Divisional of application Ser. No. 09/827,029, filed Apr. 5, 2001, which claims benefit as a Continuation of application Ser. No. 09/126,071, filed Jul. 30, 1998, now U.S. Pat. No. 6,233,389, issued May 15, 2001, the entire contents of the aforementioned are hereby incorporated by reference as if fully set forth herein under 35 U.S.C. §120. The applicants hereby rescind any disclaimer of claim scope in the parent applications or the prosecution history thereof and advise the USPTO that the claims in this application may be broader than any claim in the parent applications.

The applicants hereby rescind any disclaimer of claim scope in the parent applications or the prosecution history thereof and advise the USPTO that the claims in this application may be broader than any claim in the parent applications.

BACKGROUND

1. Technical Field

The invention relates to the time shifting of television broadcast signals. More particularly, the invention relates to the real time capture, storage, and display of television broadcast signals.

2. Description of the Prior Art

The Video Cassette Recorder (VCR) has changed the lives of television (TV) viewers throughout the world. The VCR has offered viewers the flexibility to time-shift TV programs to match their lifestyles.

The viewer stores TV programs onto magnetic tape using the VCR. The VCR gives the viewer the ability to play, rewind, fast forward and pause the stored program material. These functions enable the viewer to pause the program playback whenever he desires, fast forward through unwanted program material or commercials, and to replay favorite scenes. However, a VCR cannot both capture and play back information at the same time.

One approach to solving this problem is to use several VCRs. For example, if two video tape recorders are available, it might be possible to Ping-Pong between the two. In this case, the first recorder is started at the beginning of the program of interest. If the viewer wishes to rewind the broadcast, the second recorder begins recording, while the first recorder is halted, rewound to the appropriate place, and playback initiated. However, at least a third video tape recorder is required if the viewer wishes to fast forward to some point in time after the initial rewind was requested. In this case, the third recorder starts recording the broadcast stream while the second is halted and rewound to the appropriate position. Continuing this exercise, one can quickly see that the equipment becomes unwieldy, unreliable, expensive, and hard to operate, while never supporting all desired functions. In addition, tapes are of finite length, and may potentially end at inconvenient times, drastically lowering the value of the solution.

The use of digital computer systems to solve this problem has been suggested. U.S. Pat. No. 5,371,551 issued to Logan et al., on 6 Dec. 1994, teaches a method for concurrent video recording and playback. It presents a microprocessor controlled broadcast and playback device. Said device compresses and stores video data onto a hard disk. However, this approach is difficult to implement because the processor requirements for keeping up with the high video rates makes the device expensive and problematic. The microprocessor must be extremely fast to keep up with the incoming and outgoing video data.

It would be advantageous to provide a multimedia time warping system that gives the user the ability to simultaneously record and play back TV broadcast programs. It would further be advantageous to provide a multimedia time warping system that utilizes an approach that decouples the microprocessor from the high video data rates, thereby reducing the microprocessor and system requirements which are at a premium.

SUMMARY OF THE INVENTION

An embodiment of the invention provides a multimedia time warping system. The embodiment utilizes an easily manipulated, low cost multimedia storage and display system that allows the user to view a television broadcast program with the option of instantly reviewing previous scenes within the program. In addition, an embodiment allows the user to store selected television broadcast programs while the user is simultaneously watching or reviewing another program.

An embodiment of the invention accepts television (TV) input streams in a multitude of forms, for example, analog forms such as National Television Standards Committee (NTSC) or PAL broadcast, and digital forms such as Digital Satellite System (DSS), Digital Broadcast Services (DBS), or Advanced Television Standards Committee (ATSC). Analog TV streams are converted into a digital formatted stream for internal transfer and manipulation, while pre-formatted MPEG streams are extracted from the digital TV signal and manipulated as digital streams.

The system parses the resulting digital stream and generates identifying information associated with at least one video segment of the digital stream. Events are recorded that indicate the type of segment that has been found, where it is located, and when it occurred. The program logic is notified that an event has occurred and the video segment is extracted from buffers.

A parser and event buffer decouple the CPU from having to parse the digital stream and from the real time nature of the data streams. This decoupling allows for slower CPU and bus speeds which translate to lower system costs.

The video segments are stored on a storage device. When a program is requested for display, its video segments are extracted from the storage device and reassembled into an digital stream. The digital stream is sent to a decoder. The decoder converts the digital stream into display output signals and delivers the display output signals to a display.

User control commands are accepted and sent through the system. These commands affect the flow of the digital stream and allow the user to view stored programs with at least the following functions: reverse, fast forward, play, pause, index, fast/slow reverse play, and fast/slow play.

Other aspects and advantages of the invention will become apparent from the following detailed description in

DETAILED DESCRIPTION OF THE INVENTION

An embodiment of the invention provides a multimedia time warping system. A system according to an embodiment of the invention provides a multimedia storage and display system that allows the user to view a television broadcast program with the option of instantly reviewing previous scenes within the program. The embodiment additionally provides the user with the ability to store selected television broadcast programs while simultaneously watching or reviewing another program and to view stored programs with at least the following functions: reverse, fast forward, play, pause, index, fast/slow reverse play, and fast/slow play.

Figure 1:
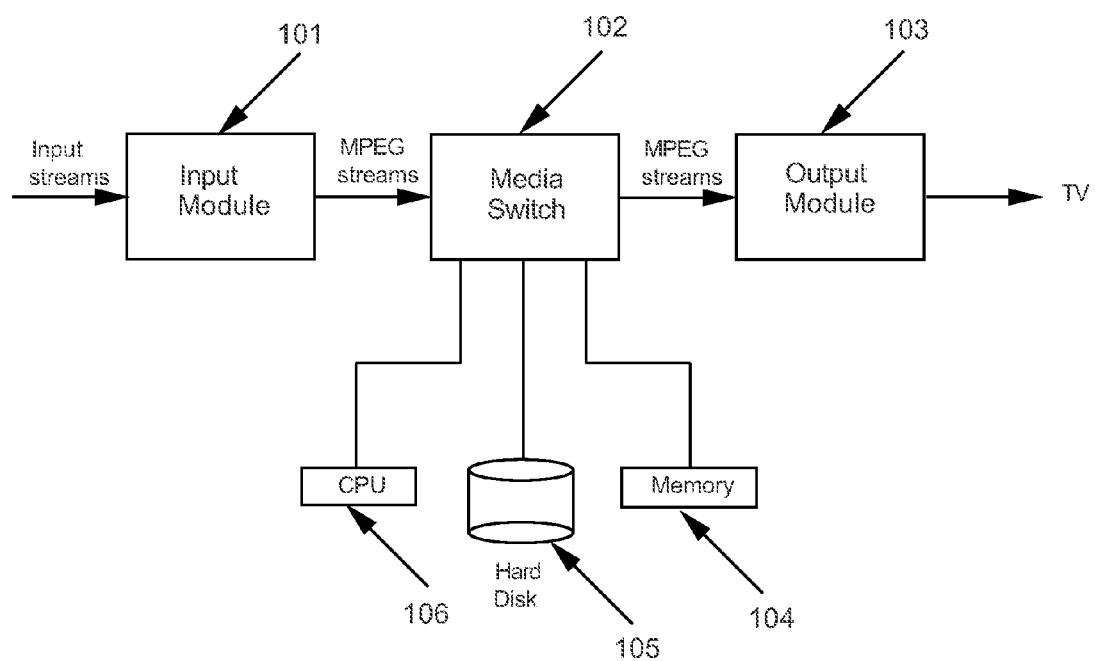
FIG. 1 is a block schematic diagram of a high level view of an embodiment of the invention according to the invention.

Referring to FIG. 1, an embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other sections as if they were delivered via an MPEG2 private data channel.

The Media Switch 102 mediates between a microprocessor CPU 106, hard disk or storage device 105, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 contains an MPEG decoder, On-Screen Display (OSD) generator, analog TV encoder and audio logic. The OSD generator allows the program logic to supply images which will be overlayed on top of the resulting analog TV signal. Additionally, the Output Section can modulate information supplied by the program logic onto the VBI of the output signal in a number of standard formats, including NABTS, CC and EDS.

Figure 2:
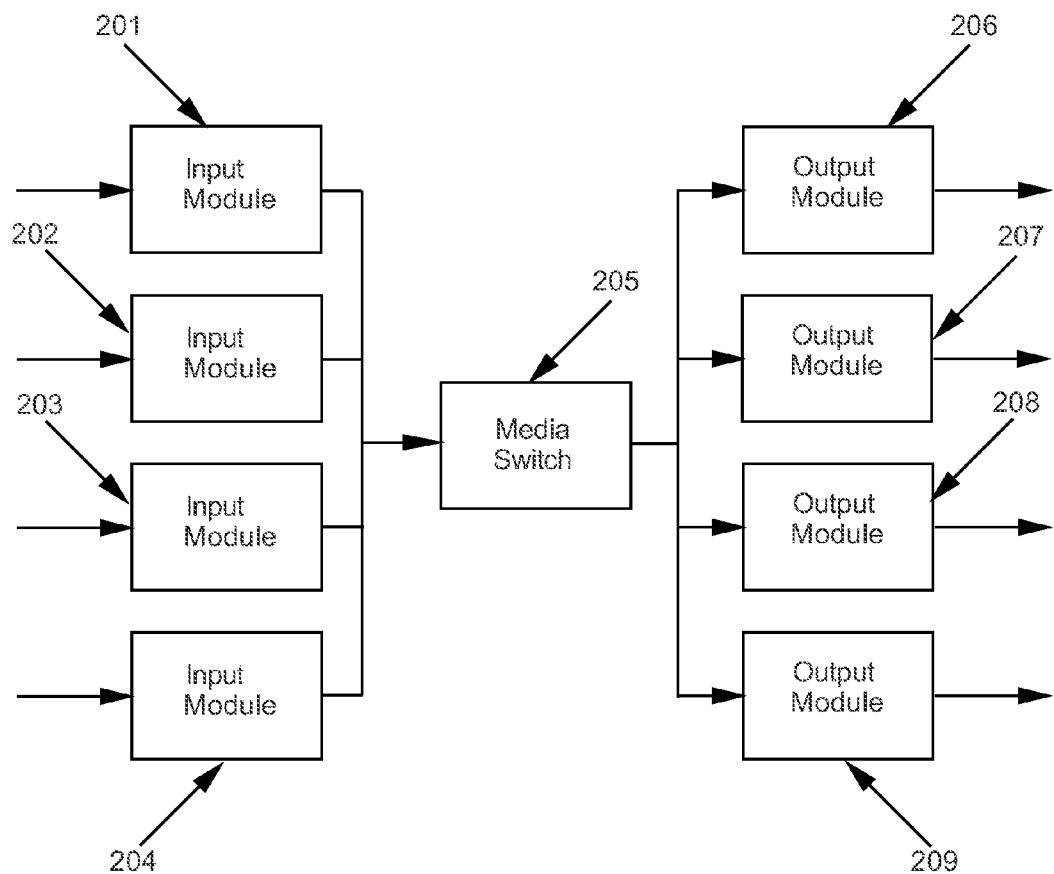
FIG. 2 is a block schematic diagram of an embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
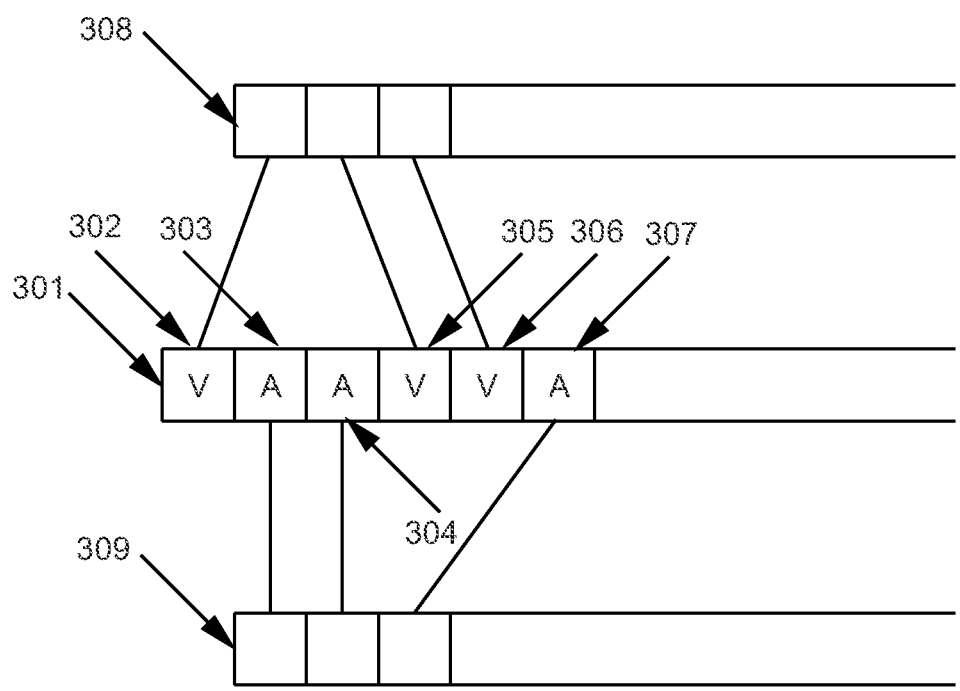
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform time stamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
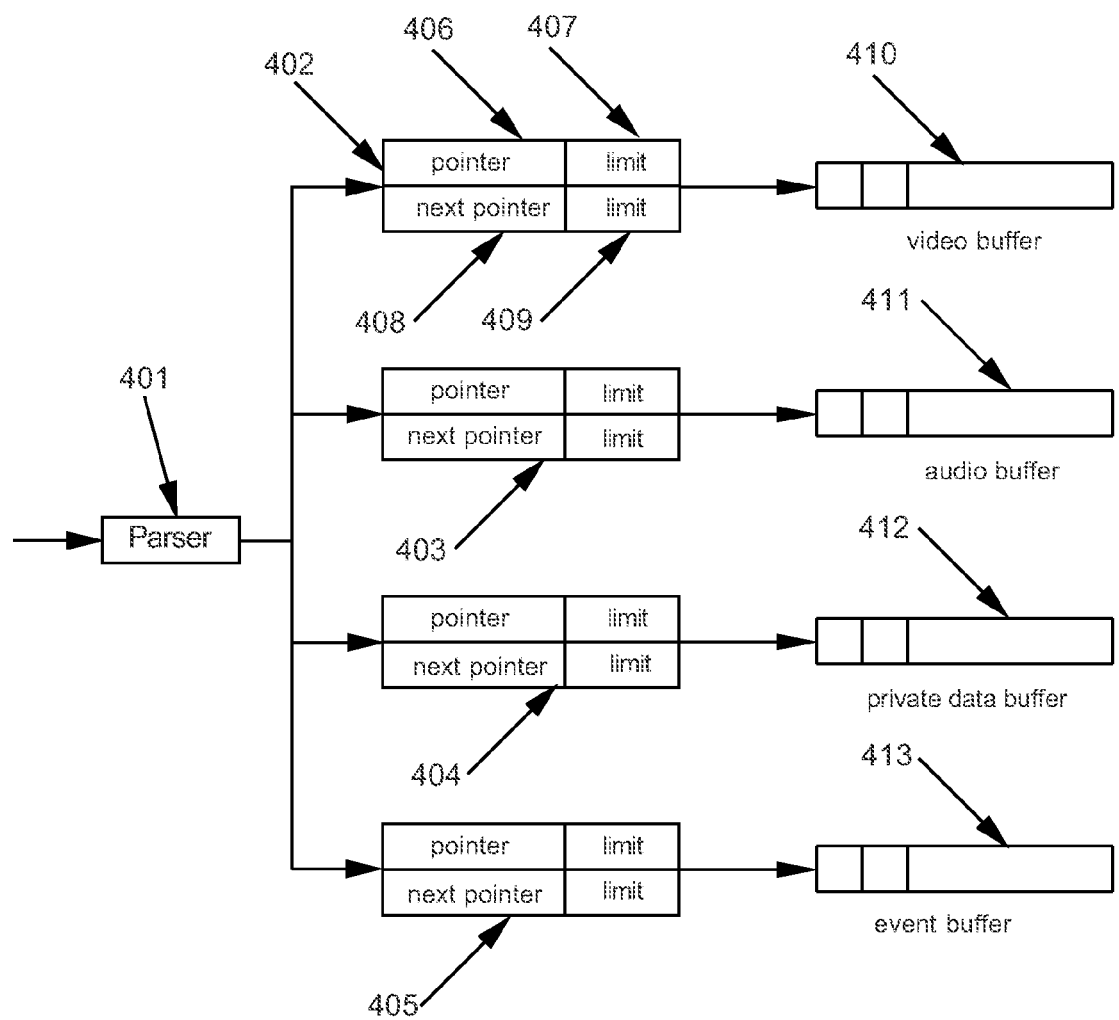
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
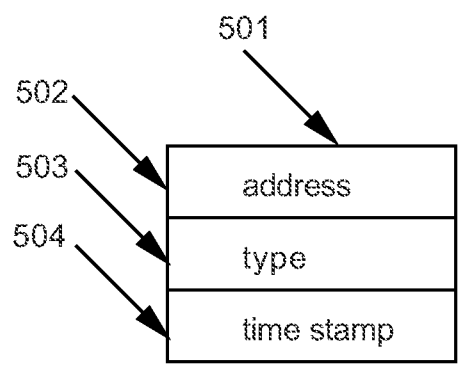
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
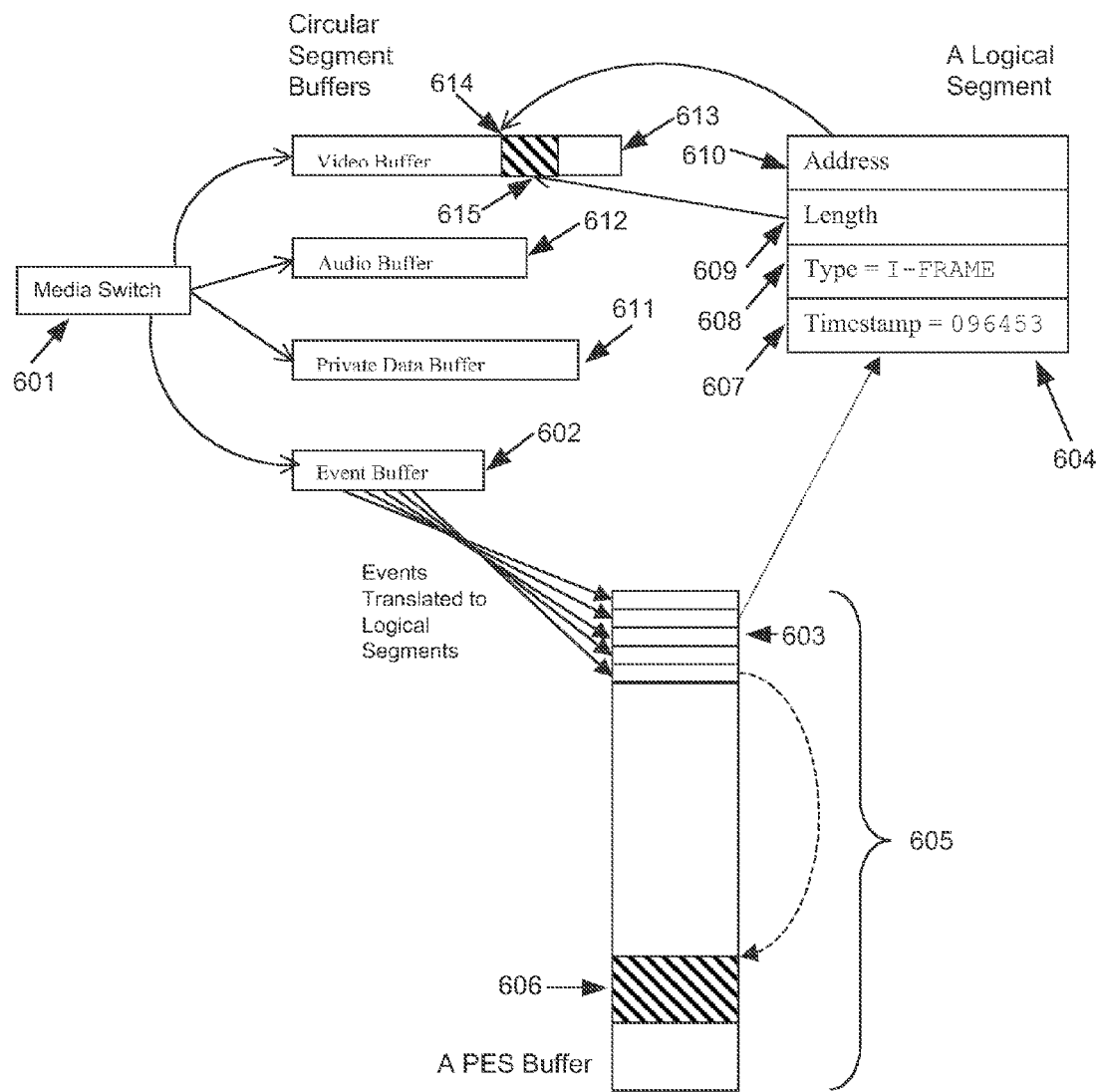
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment timestamp 607. In the case of a digital TV stream, PTS values are already encoded in the stream. The program logic extracts this information and places it in the logical segment timestamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk, and extracting video and audio data from the disk on a low cost platform. Generally, the Media Switch runs asynchronously and autonomously with the microprocessor CPU, using its DMA capabilities to move large quantities of information with minimal intervention by the CPU.

Figure 7:
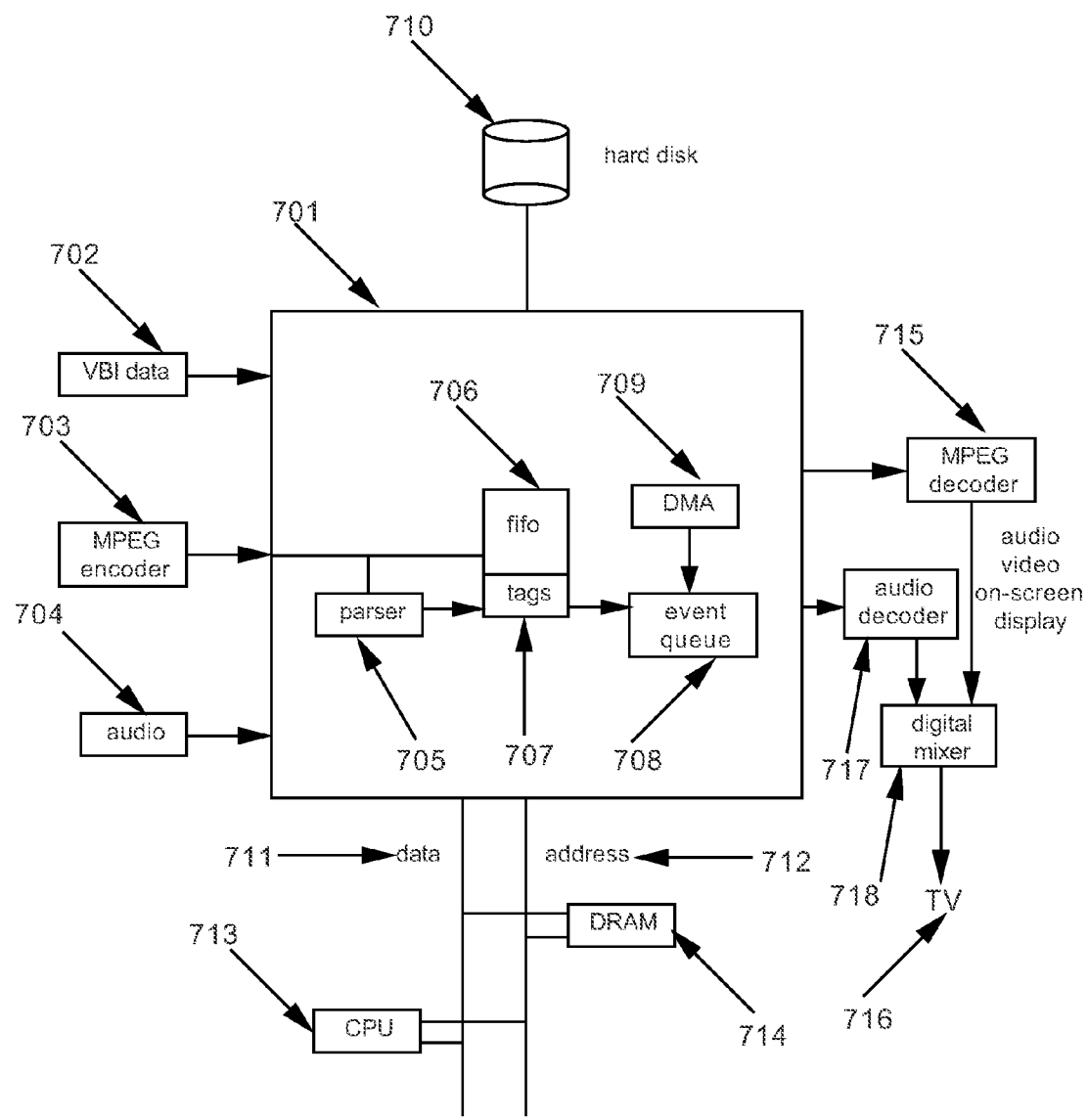
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence headers—all of the pieces of information that the program logic needs to know about in order to both properly play back and perform special effects on the stream, e.g. fast forward, reverse, play, pause, fast/slow play, indexing, and fast/slow reverse play.

The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on-screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower clock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal, however sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

Figure 8:
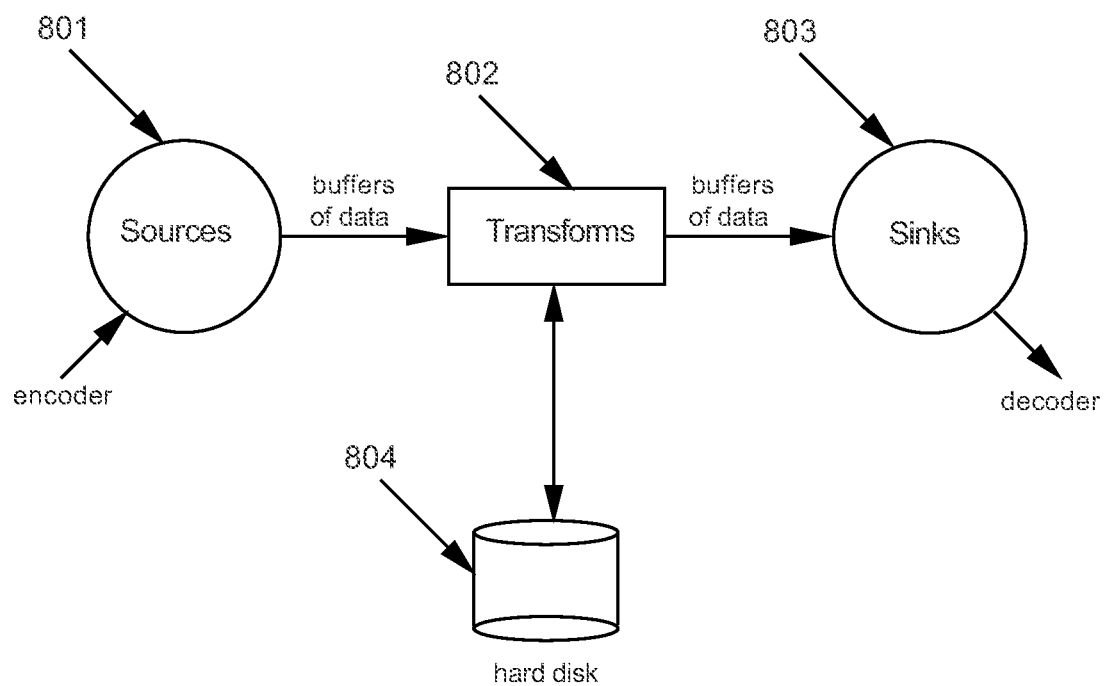
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

Figure 9:
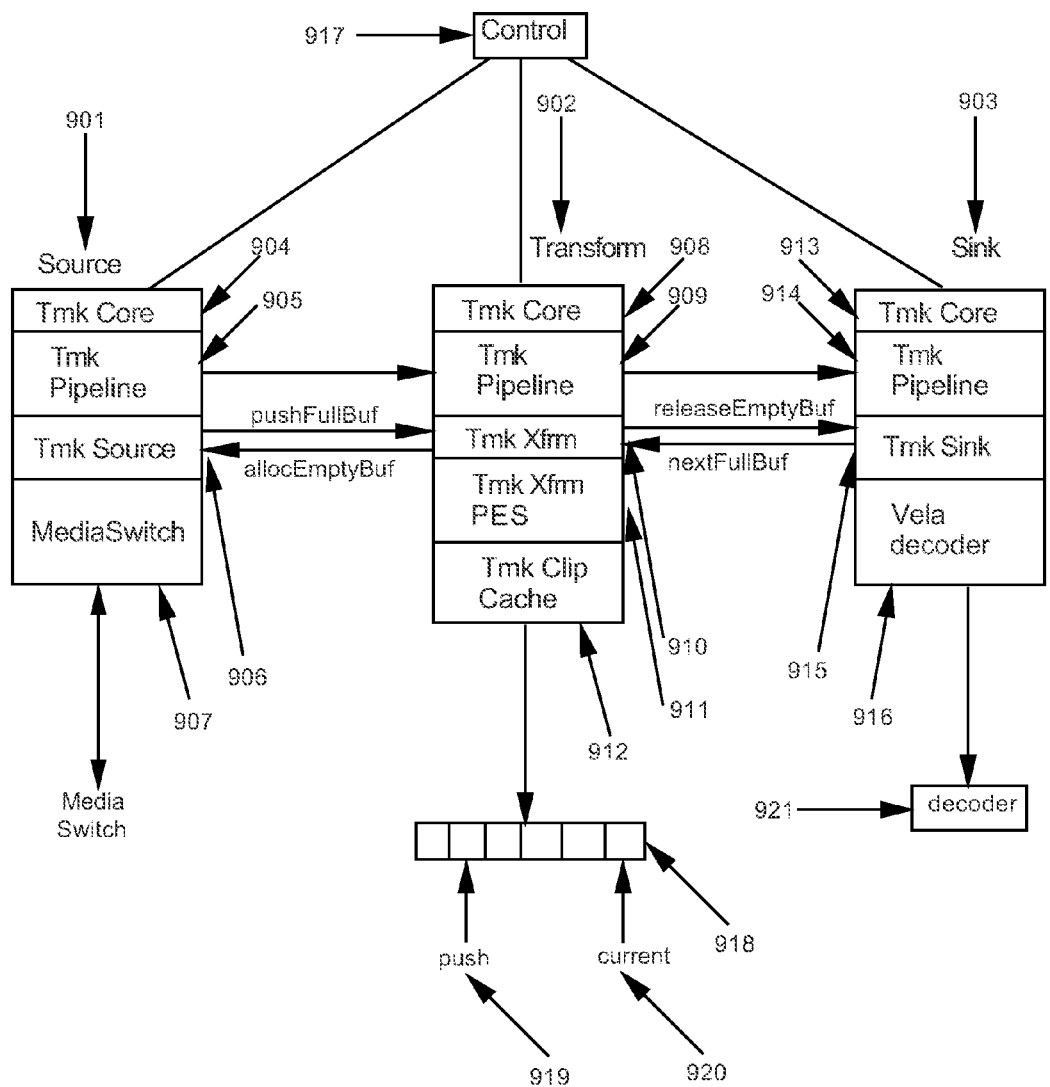
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXfrm 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it. It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902 that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
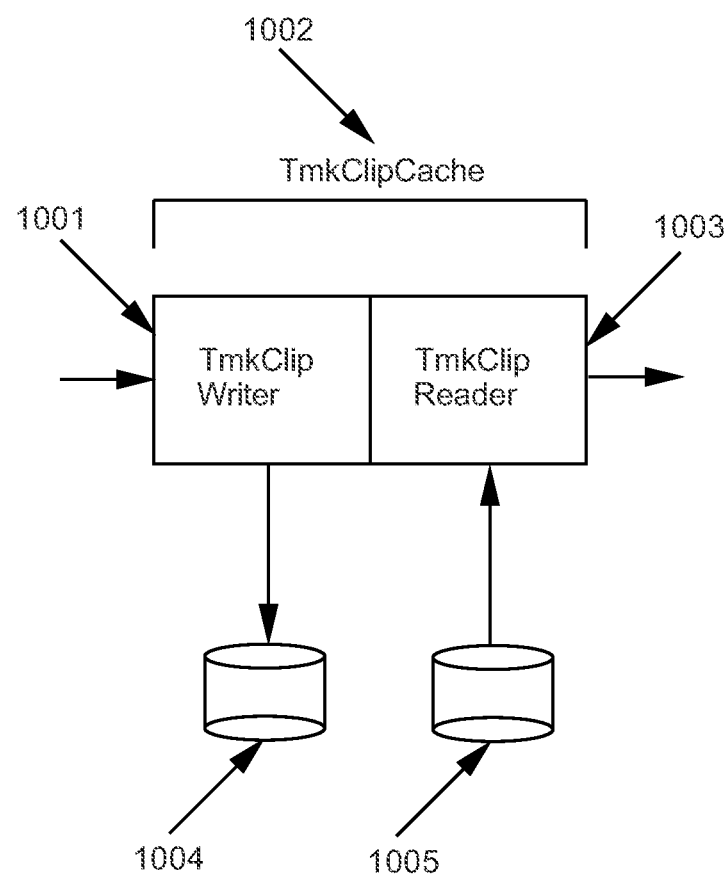
FIG. 10 is a block schematic diagram of an embodiment of the clip cache component of the invention according to the invention.

With respect to FIG. 10, two other objects derived from the TmkXfrm class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
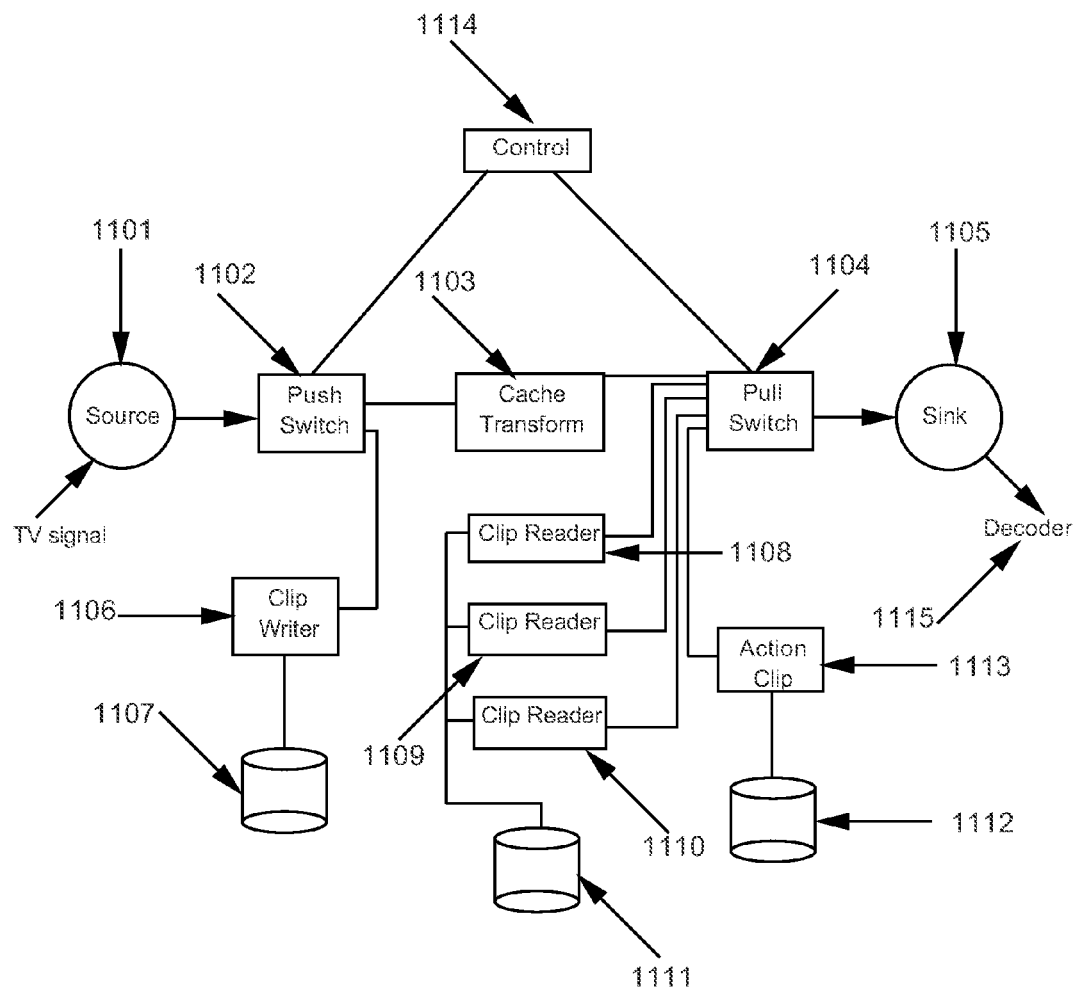
FIG. 11 is a block schematic diagram of an embodiment of the invention that emulates a broadcast studio video mixer according to the invention.

Referring to FIG. 11, an embodiment that accomplishes multiple functions is shown. A source 1101 has a TV signal input. The source sends data to a PushSwitch 1102 which is a transform derived from TmkXfrm. The PushSwitch 1102 has multiple outputs that can be switched by the control object 1114. This means that one part of the pipeline can be stopped and another can be started at the user's whim. The user can switch to different storage devices. The PushSwitch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time. This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
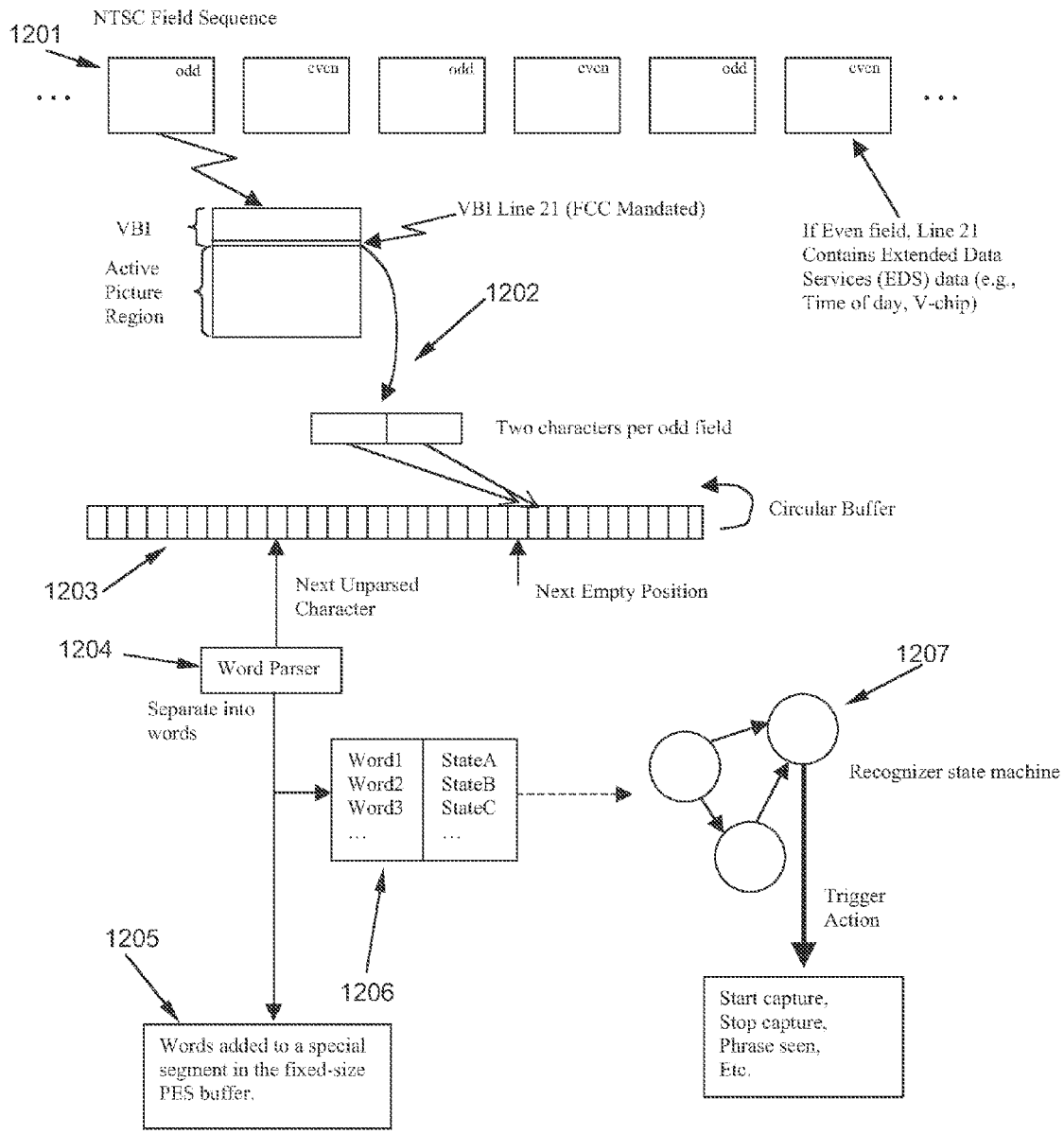
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105. The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkXfrm object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
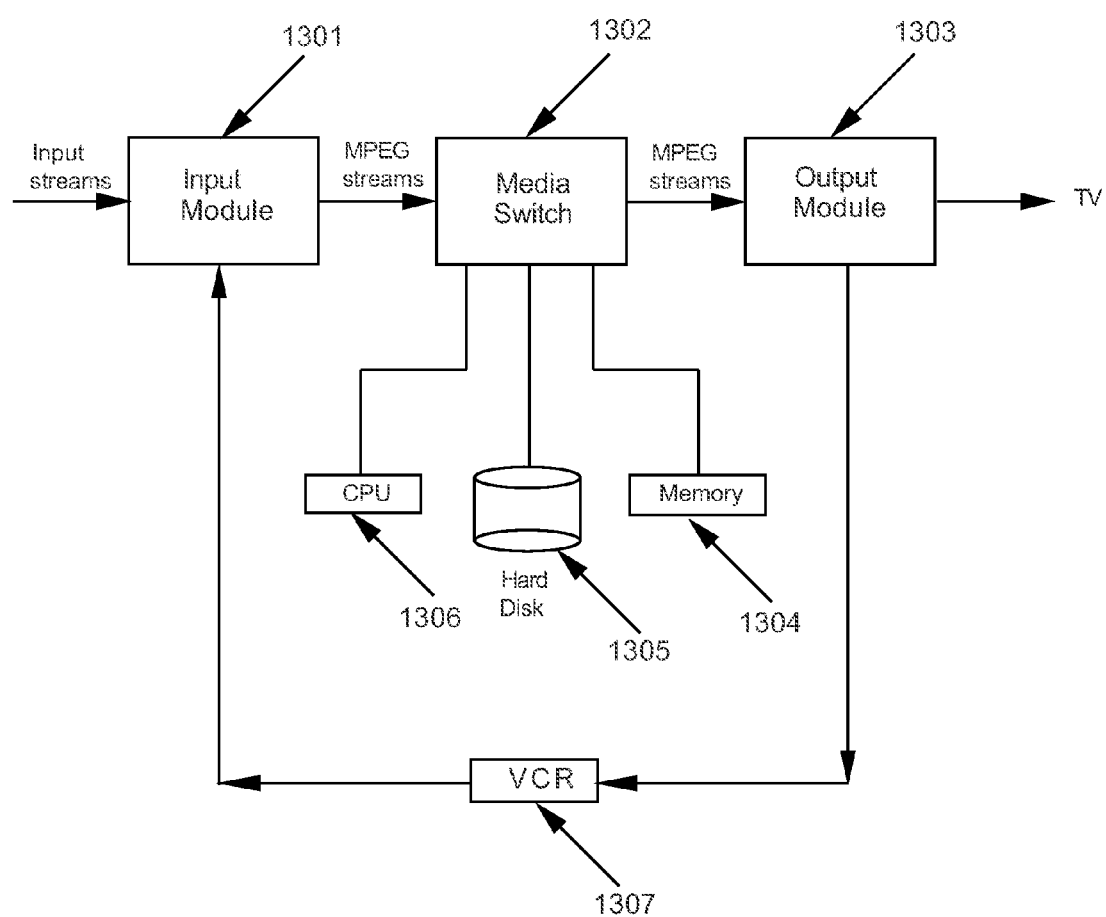
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

One skilled in the art will readily appreciate that such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, one skilled in the art will readily appreciate that although a VCR is specifically mentioned above any multimedia recording device (e.g., a Digital Video Disk-Random Access Memory (DVD-RAM) recorder) is easily substituted in its place.

Although the invention is described herein with reference to the preferred embodiment, one skilled in the art will readily appreciate that other applications may be substituted for those set forth herein without departing from the spirit and scope of the present invention. For example, the invention can be used in the detection of gambling casino crime. The input section of the invention is connected to the casino's video surveillance system. Recorded video is cached and simultaneously output to external VCRs. The user can switch to any video feed and examine (i.e., rewind, play, slow play, fast forward, etc.) a specific segment of the recorded video while the external VCRs are being loaded with the real-time input video. Accordingly, the invention should only be limited by the Claims included below.

The invention claimed is:

1. A method for a digital video recorder, comprising:
   receiving a first multimedia program from a first input tuner and a second multimedia program from a second input tuner;
   as the first multimedia program and second multimedia program are being received, storing the first multimedia program and the second multimedia program in digital form on at least one storage device;
   simultaneously retrieving for play back a video segment from the first multimedia program whose storage is in progress and the second multimedia program whose storage is in progress using video segment identifying information generated by the digital video recorder for at least one video segment in the first multimedia program whose storage is in progress and video segment identifying information generated by the digital video recorder for at least one video segment in the second multimedia program whose storage is in progress to cause delivery of selected video segments to an output subsystem, the digital video recorder automatically generating video segment identifying information for specific video segments in multimedia programs; and wherein the simultaneously retrieving for play back step allows playback rate and direction of each multimedia program to be controlled individually and simultaneously to perform at least one of: fast forward, rewind, pause, or play functions.

2. The method of claim 1, wherein the output subsystem converts video segments for the first multimedia program whose storage is in progress and the second multimedia program whose storage is in progress into display output signals.

3. The method of claim 2, further comprising:
inserting on-screen displays into a display output signal.

4. The method of claim 1, wherein playback rate and direction of a multimedia program commands are received from a remote control.

5. The method of claim 1, wherein the output subsystem sends any combination of the first multimedia program or the second multimedia program to a multimedia device.

6. The method of claim 1, further comprising:
creating custom sequences of video and/or audio output; and
wherein the creating step allows any number of video and/or audio segments of multimedia programs to be lined up and combined and stored on the at least one storage device.

7. The method of claim 1, further comprising the step of:
receiving digital multimedia program signals using a plurality of input tuners; and
wherein each of the input tuners among the plurality of input tuners individually receives a specific multimedia program.

8. The method of claim 7, further comprising the step of:
synchronizing video and audio components of a multimedia program for proper playback.

9. The method of claim 1, wherein an input tuner receives at least one of: software updates or data.

10. The method of claim 1, wherein the simultaneously retrieving for play back step plays back the first multimedia program whose storage is in progress and the second multimedia program whose storage is in progress in a picture in a picture format to a display device.

11. The method of claim 1, wherein an input tuner receives a specific multimedia program in response to a command received from a remote control.

12. A non-transitory computer-readable medium storing one or more sequences of instructions for a digital video recorder, which instructions, when executed by one or more processors, cause the one or more processors to perform:
receiving a first multimedia program from a first input tuner and a second multimedia program from a second input tuner;
as the first multimedia program and second multimedia program are being received, storing the first multimedia program and the second multimedia program in digital form on at least one storage device;
simultaneously retrieving for play back a video segment from the first multimedia program whose storage is in progress and the second multimedia program whose storage is in progress using video segment identifying information generated by the digital video recorder for at least one video segment in the first multimedia program whose storage is in progress and video segment identifying information generated by the digital video recorder for at least one video segment in the second multimedia program whose storage is in progress to cause delivery of selected video segments to an output subsystem, the digital video recorder automatically generating video segment identifying information for specific video segments in multimedia programs; and wherein the simultaneously retrieving for play back step allows playback rate and direction of each multimedia program to be controlled individually and simultaneously to perform at least one of: fast forward, rewind, pause, or play functions.

13. The non-transitory computer-readable medium of claim 12, wherein the output subsystem converts video segments for the first multimedia program whose storage is in progress and the second multimedia program whose storage is in progress into display output signals.

14. The non-transitory computer-readable medium of claim 13, further comprising:
inserting on-screen displays into a display output signal.

15. The non-transitory computer-readable medium of claim 12, wherein playback rate and direction of a multimedia program commands are received from a remote control.

16. The non-transitory computer-readable medium of claim 12, wherein the output subsystem sends any combination of the first multimedia program or the second multimedia program to a multimedia device.

17. The non-transitory computer-readable medium of claim 12, further comprising:
creating custom sequences of video and/or audio output; and
wherein the creating step allows any number of video and/or audio segments of multimedia programs to be lined up and combined and stored on the at least one storage device.

18. The non-transitory computer-readable medium of claim 12, further comprising:
receiving digital multimedia program signals using a plurality of input tuners; and
wherein each of the input tuners among the plurality of input tuners individually receives a specific multimedia program.

19. The non-transitory computer-readable medium of claim 18, further comprising:
synchronizing video and audio components of a multimedia program for proper playback.

20. The non-transitory computer-readable medium of claim 12, wherein at least one input tuner receives at least one of: software updates or data.

21. The non-transitory computer-readable medium of claim 12, wherein the simultaneously retrieving for play back step plays back the first multimedia program whose storage is in progress and the second multimedia program whose storage is in progress in a picture in a picture format to a display device.

22. The non-transitory computer-readable medium of claim 12, wherein an input tuner receives a specific multimedia program in response to a command received from a remote control.

23. A digital video recorder, comprising:
a first input tuner;
a second input tuner;
wherein a first multimedia program is received from the first input tuner and a second multimedia program is received from the second input tuner;
storing logic, implemented at least partially in hardware, that, as the first multimedia program and second multimedia program are being received, stores the first multimedia program and the second multimedia program in digital form on at least one storage device;
content retrieval logic, implemented at least partially in hardware, that simultaneously retrieves for play back a video segment from the first multimedia program whose storage is in progress and the second multimedia program whose storage is in progress using video segment identifying information generated by the digital video recorder for at least one video segment in the first multimedia program whose storage is in progress and video segment identifying information generated by the digital video recorder for at least one video segment in the second multimedia program whose storage is in progress to cause delivery of selected video segments to an output subsystem, the digital video recorder automatically generates video segment identifying information for specific video segments in multimedia programs; and
wherein the content retrieval logic allows playback rate and direction of each multimedia program to be controlled individually and simultaneously to perform at least one of: fast forward, rewind, pause, or play functions.

24. The apparatus of claim 23, wherein the output subsystem converts video segments for the first multimedia program whose storage is in progress and the second multimedia program whose storage is in progress into display output signals.

25. The apparatus of claim 24, further comprising:
logic, implemented at least partially in hardware, that inserting on-screen displays into a display output signal.

26. The apparatus of claim 23, wherein playback rate and direction of a multimedia program commands are received from a remote control.

27. The apparatus of claim 23, wherein the output subsystem sends any combination of the first multimedia program or the second multimedia program to a multimedia device.

28. The apparatus of claim 23, further comprising:
sequence creation logic, implemented at least partially in hardware, that creates custom sequences of video and/or audio output; and
wherein the sequence creation logic allows any number of video and/or audio segments of multimedia programs to be lined up and combined and stored on the at least one storage device.

29. The apparatus of claim 23, further comprising:
a plurality of input tuners that receive digital multimedia program signals; and
wherein each of the input tuners among the plurality of input tuners individually receives a specific multimedia program.

30. The apparatus of claim 29, further comprising:
logic, implemented at least partially in hardware, that synchronizes video and audio components of a multimedia program for proper playback.

31. The apparatus of claim 23, wherein an input tuner receives at least one of:
software updates or data.

32. The apparatus of claim 23, wherein the content retrieval logic plays back the first multimedia program whose storage is in progress and the second multimedia program whose storage is in progress in a picture in a picture format to a display device.

33. The apparatus of claim 23, wherein an input tuner receives a specific multimedia program in response to a command received from a remote control.

* * * * *